(12) United States Patent
Amanai

(10) Patent No.: US 6,954,311 B2
(45) Date of Patent: Oct. 11, 2005

(54) IMAGE PICKUP LENS UNIT AND IMAGE PICKUP DEVICE

(75) Inventor: Takahiro Amanai, Sagamihara (JP)

(73) Assignee: Olympus Corporation, Tokyo (JP)

( * ) Notice: Subject to any disclaimer, the term of this patent is extended or adjusted under 35 U.S.C. 154(b) by 8 days.

(21) Appl. No.: 10/601,910

(22) Filed: Jun. 24, 2003

(65) Prior Publication Data

US 2004/0047274 A1 Mar. 11, 2004

(30) Foreign Application Priority Data

Jun. 27, 2002 (JP) .................................... P2002-188300
Nov. 28, 2002 (JP) .................................... P2002-345449

(51) Int. Cl.$^7$ .......................... G02B 27/10; G02B 7/02; G03B 17/26; G03B 21/14; F21V 17/00
(52) U.S. Cl. ...................... 359/621; 359/619; 359/819; 353/100; 362/455; 396/526
(58) Field of Search ................................ 359/819, 811, 359/619, 621, 823, 824, 814; 353/100; 362/455; 396/526

(56) References Cited

U.S. PATENT DOCUMENTS 4,733,096 A * 3/1988 Horiguchi .................... 358/482
6,324,010 B1 * 11/2001 Bowen et al. ............... 359/622
6,373,635 B1 * 4/2002 Fujimoto et al. ............ 359/619
6,381,072 B1 * 4/2002 Burger ........................ 359/622
6,587,276 B2   7/2003 Daniell
6,707,613 B2 * 3/2004 Fujimoto et al. ............ 359/622
2003/0048739 A1  3/2003 Yamada et al. ......... 369/112.26

FOREIGN PATENT DOCUMENTS

JP        2002-243912         8/2002

* cited by examiner

Primary Examiner—Hung Xuan Dang
Assistant Examiner—Joseph Martinez
(74) Attorney, Agent, or Firm—Kenyon & Kenyon

(57) ABSTRACT

Lenses 1, 2, and 4 as an optical element having a power are cemented together in an optical axis direction. An optical filter 3 is sandwiched between the lenses 2 and 4. Optical elements neighboring each other are cemented together such that a positioning section which is disposed on a side surface of the optical element disposes an appropriate space in an optical axis direction and optical axes of optical elements align in a direction orthogonal to the optical axis. The cemented optical element arrays are cemented together and cut at a line in a cutting operation. By doing this, it is possible to manufacture a small image pickup lens unit, which can be used in an image pickup device, by mass-production and at a low cost.

15 Claims, 38 Drawing Sheets

FIG. 1A
FIG. 1B
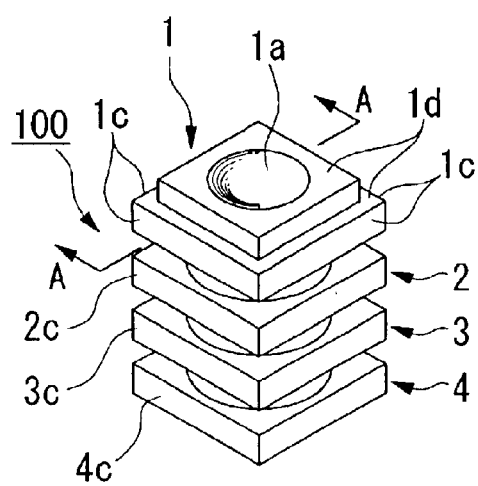
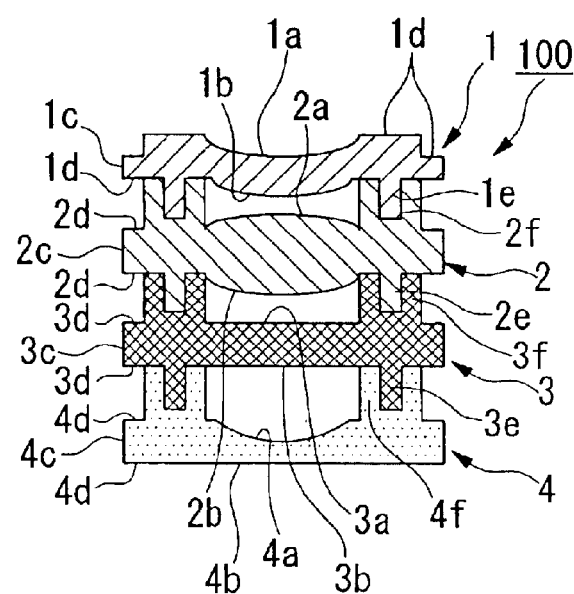
FIG. 2
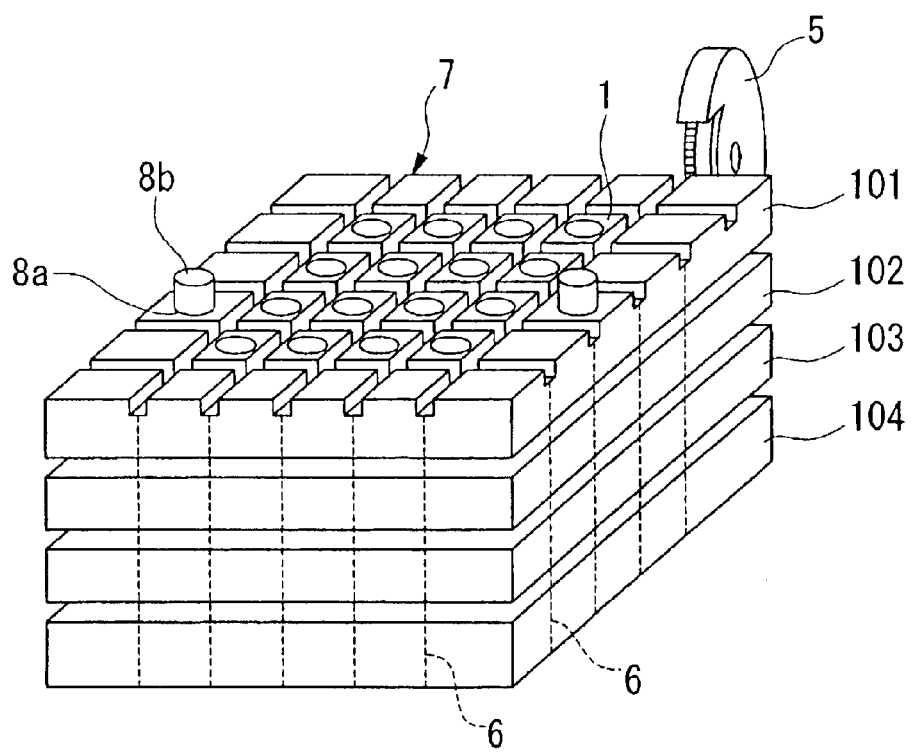

FIG. 3A
FIG. 3B
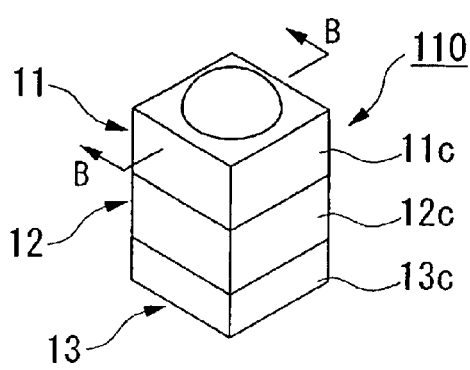
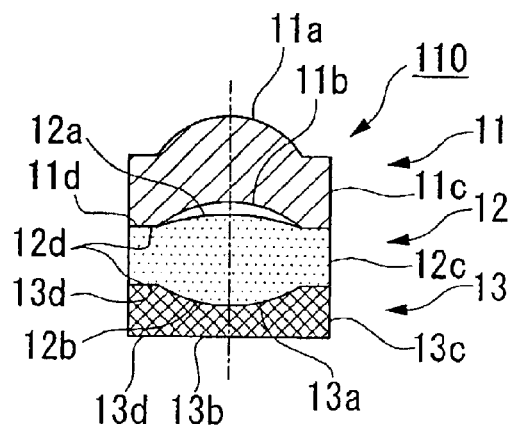
FIG. 3C
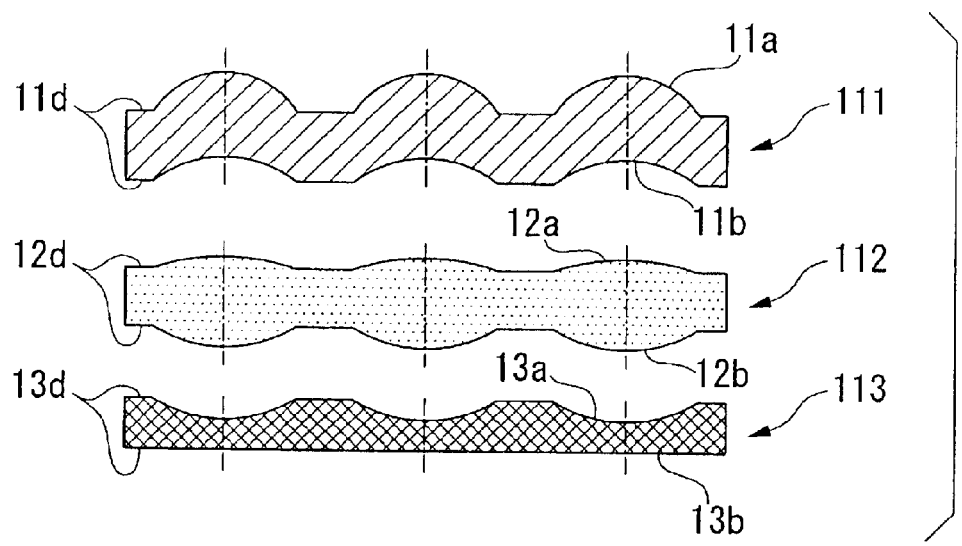
FIG. 3D
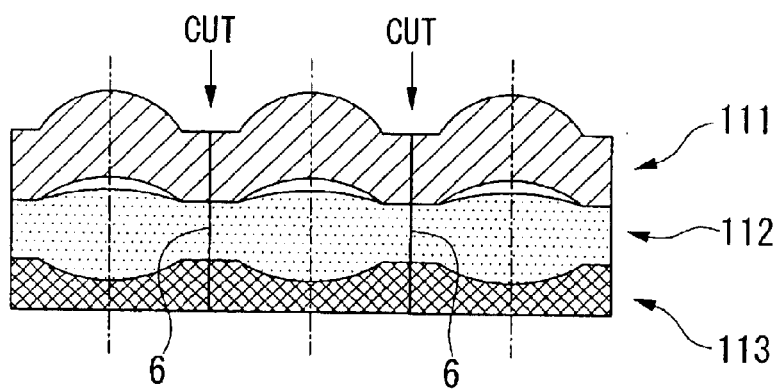

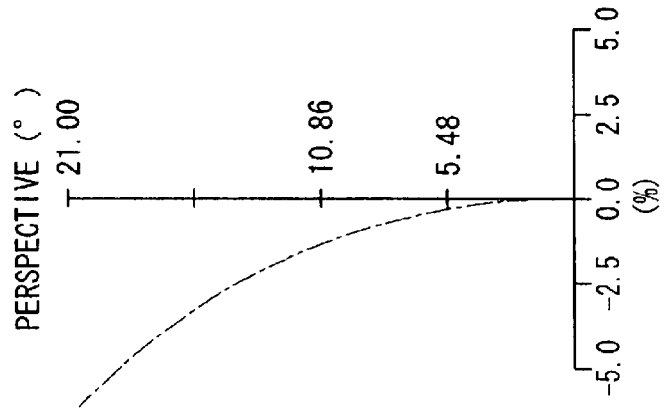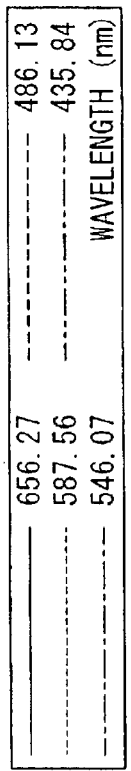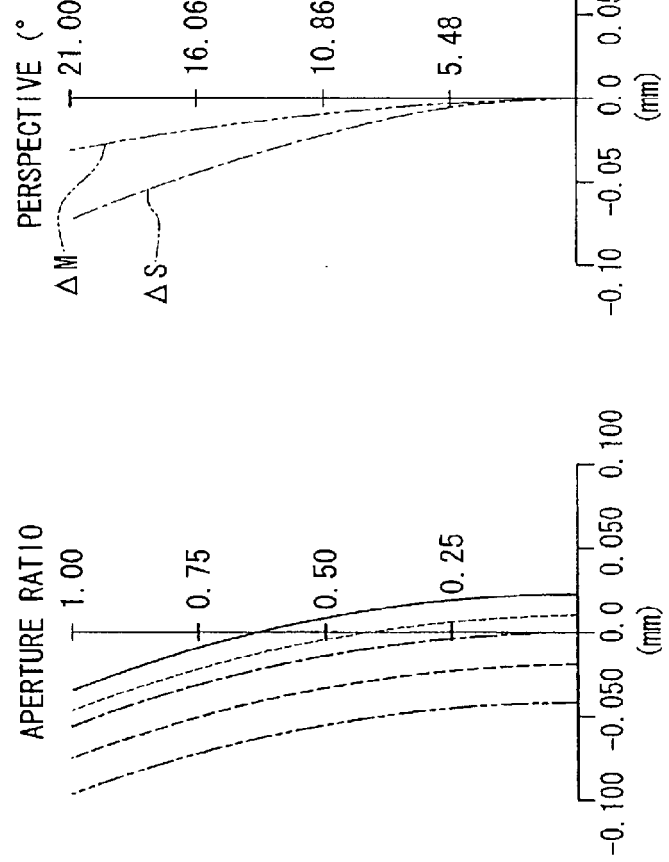
FIG. 10A SPHERICAL ABERRATION  FIG. 10B ASTIGMATISM  FIG. 10C DISTORTION

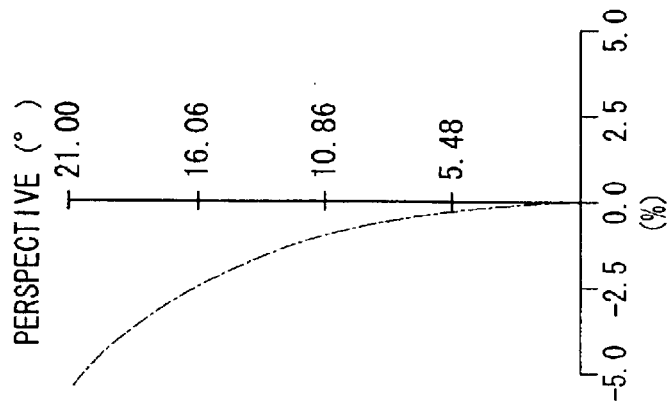
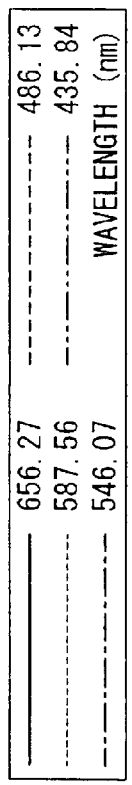
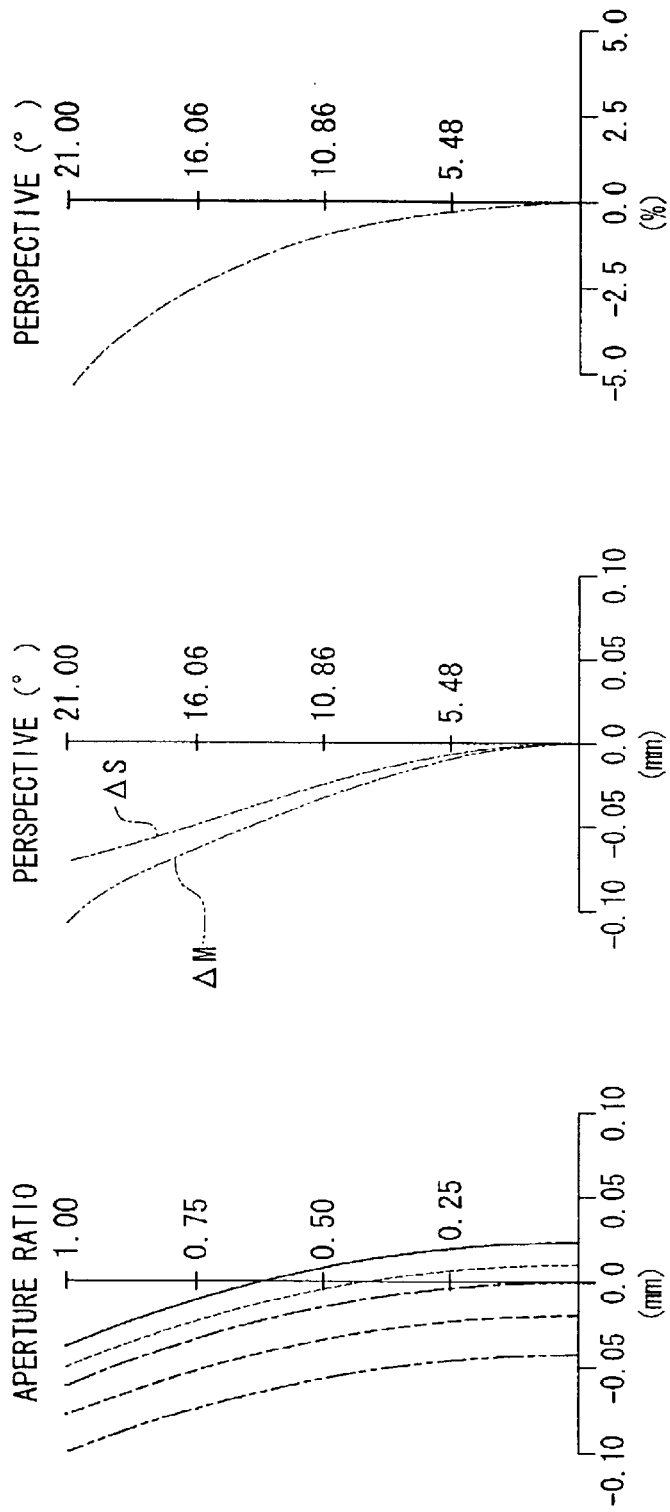
FIG. 13A SPHERICAL ABERRATION   FIG. 13B ASTIGMATISM   FIG. 13C DISTORTION

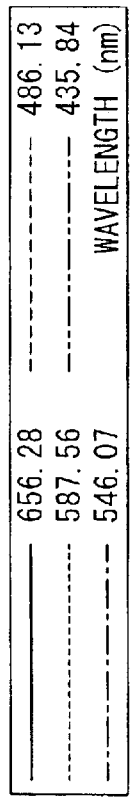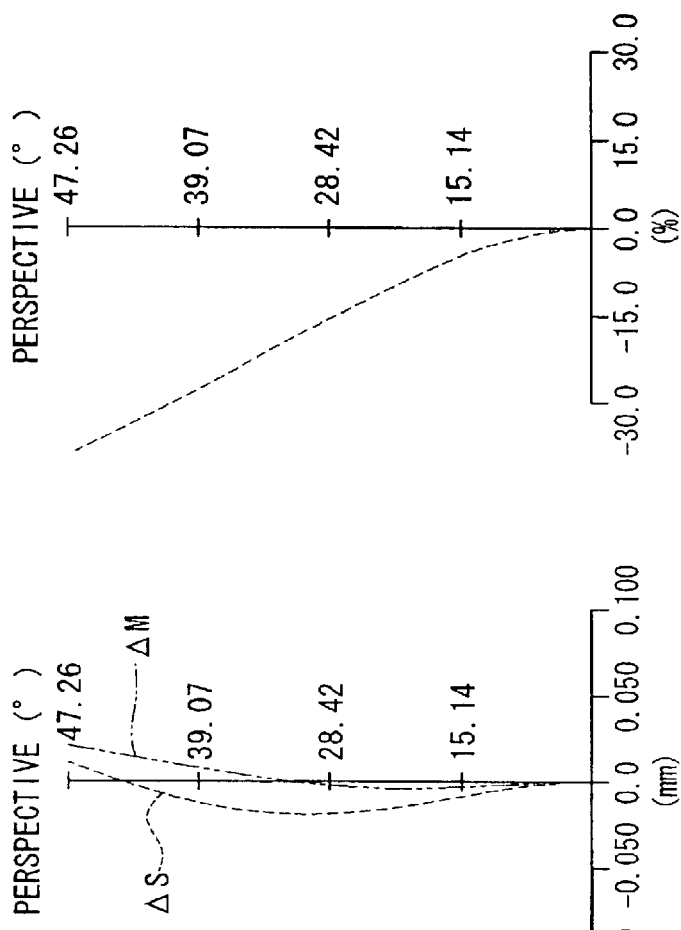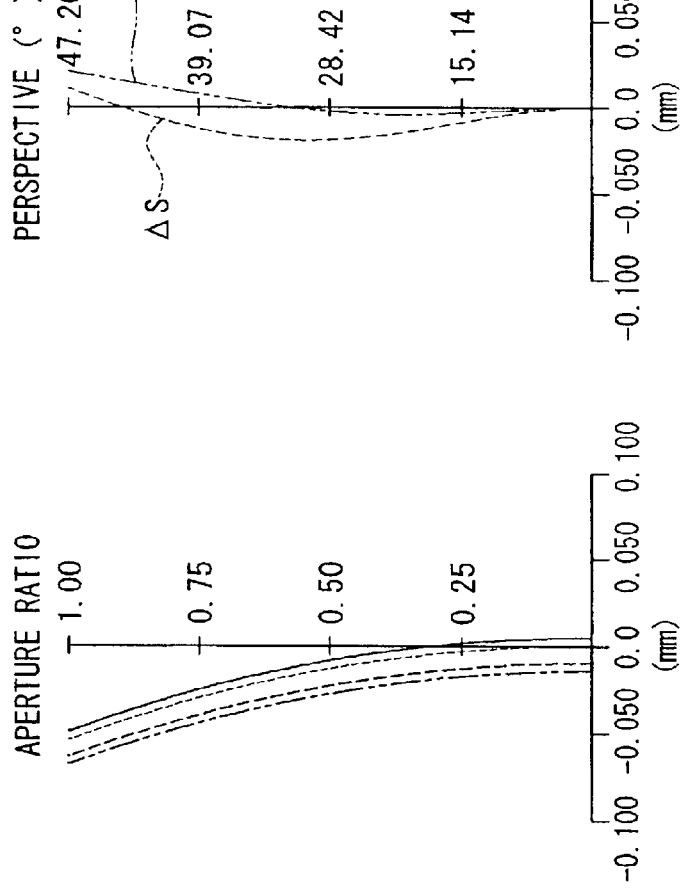
FIG. 15A SPHERICAL ABERRATION  FIG. 15B ASTIGMATISM  FIG. 15C DISTORTION

FIG. 17A SPHERICAL ABERRATION    FIG. 17B ASTIGMATISM    FIG. 17C DISTORTION

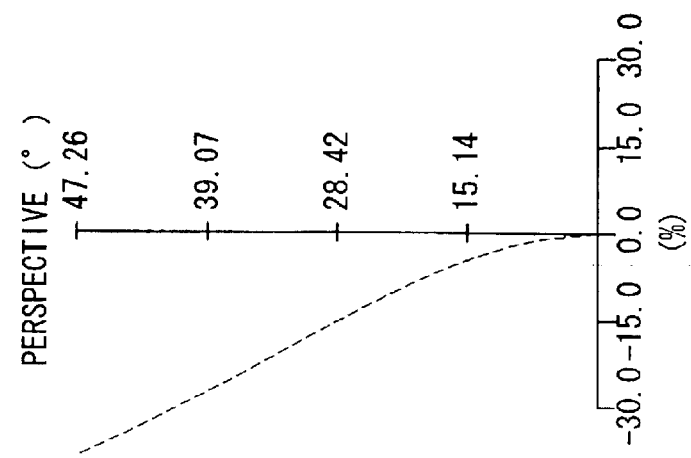
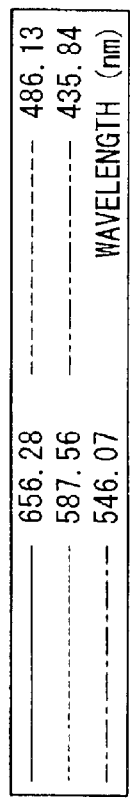
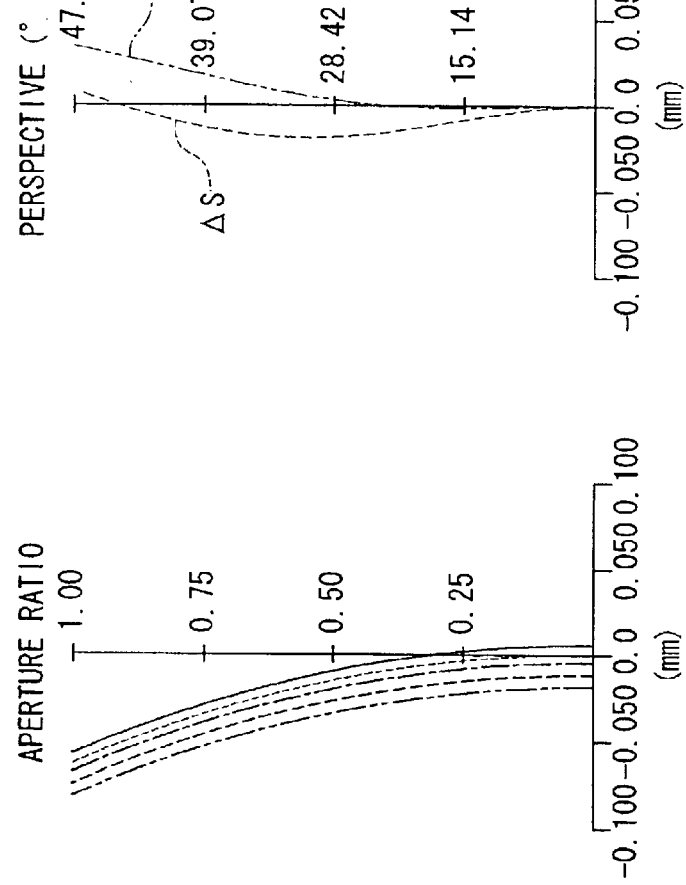
FIG. 19A SPHERICAL ABERRATION  FIG. 19B ASTIGMATISM  FIG. 19C DISTORTION

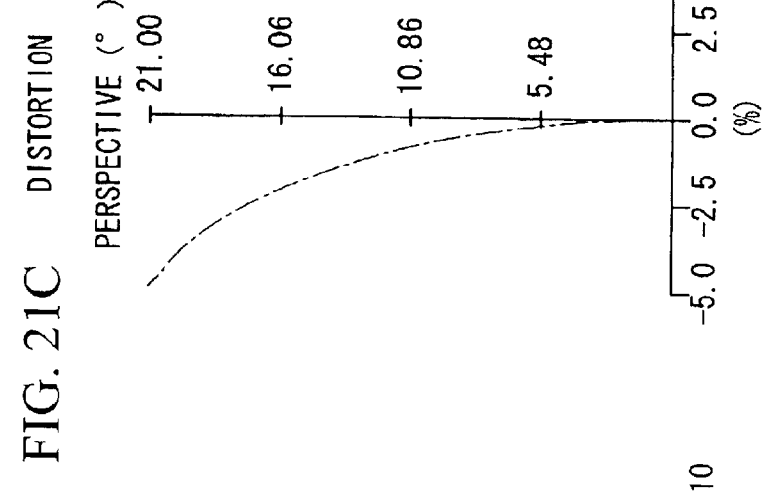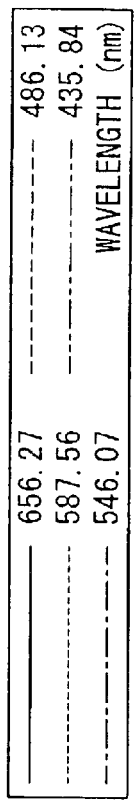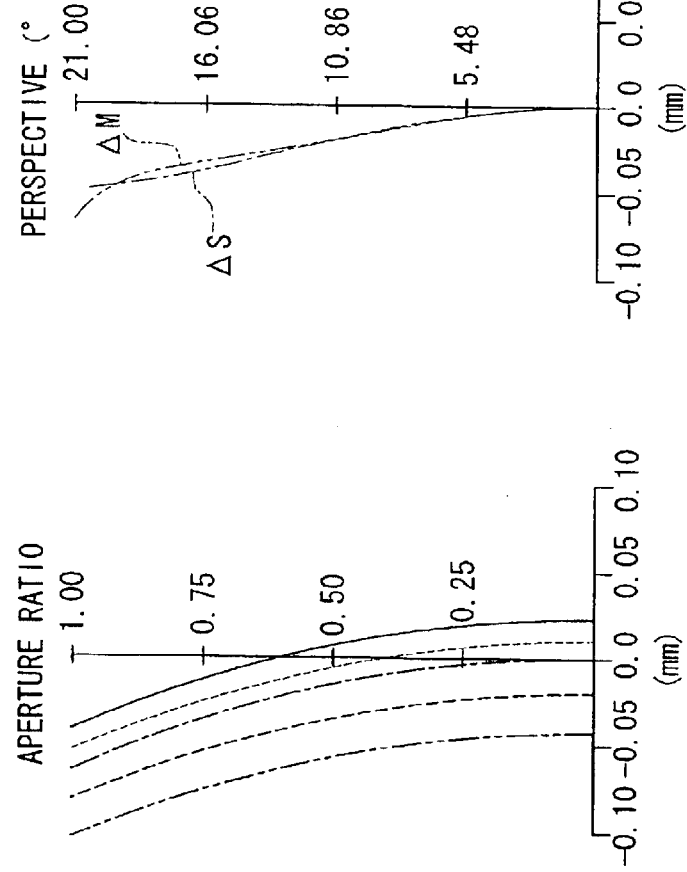
FIG. 21A SPHERICAL ABERRATION    FIG. 21B ASTIGMATISM    FIG. 21C DISTORTION

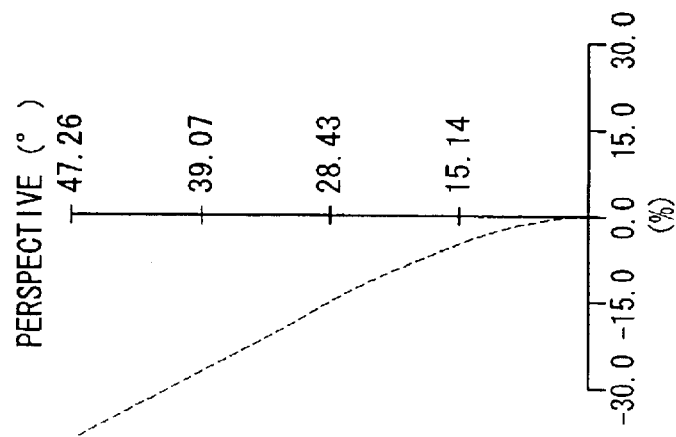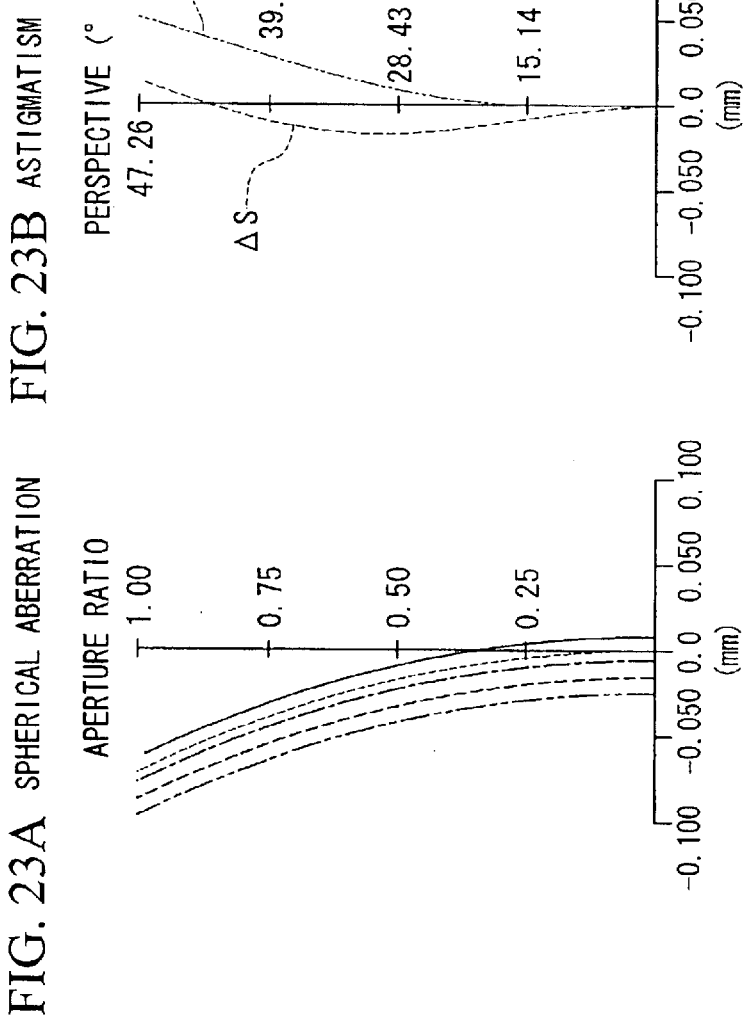
FIG. 23A SPHERICAL ABERRATION   FIG. 23B ASTIGMATISM   FIG. 23C DISTORTION

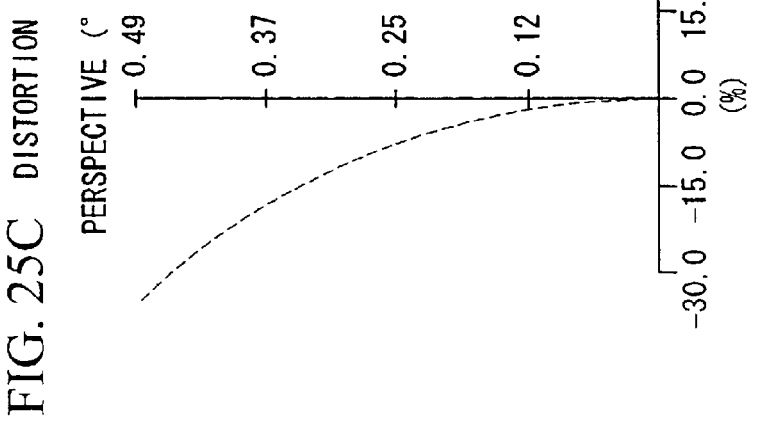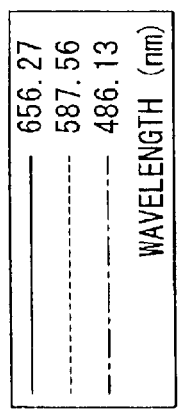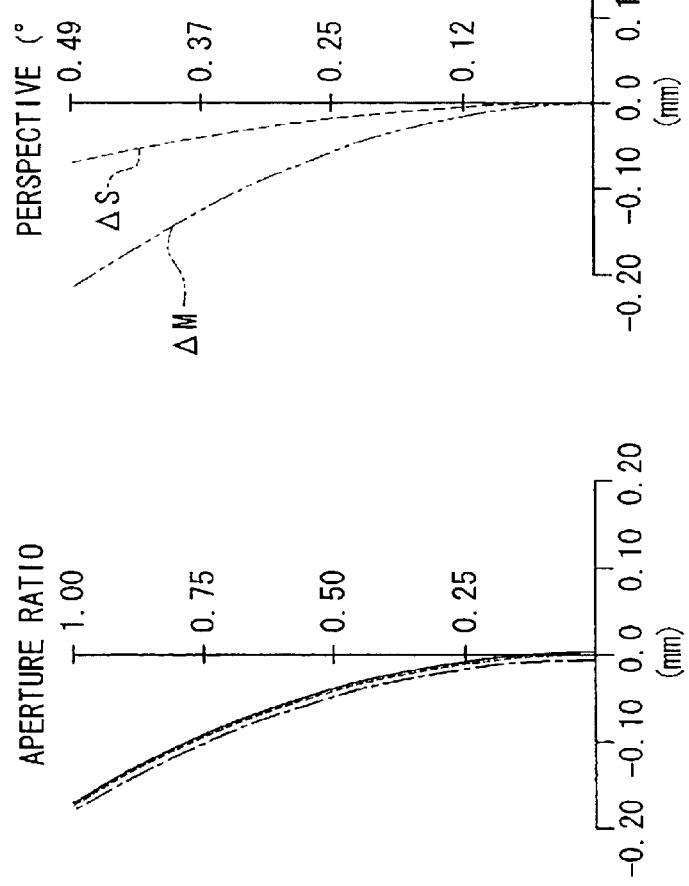

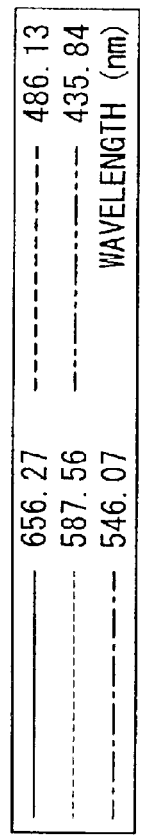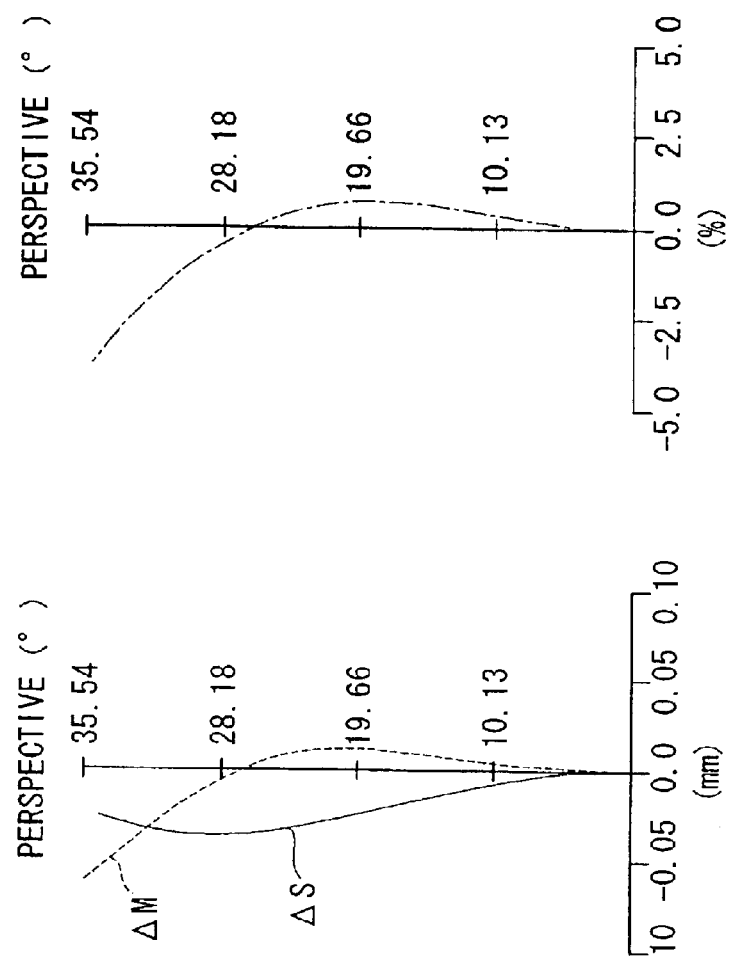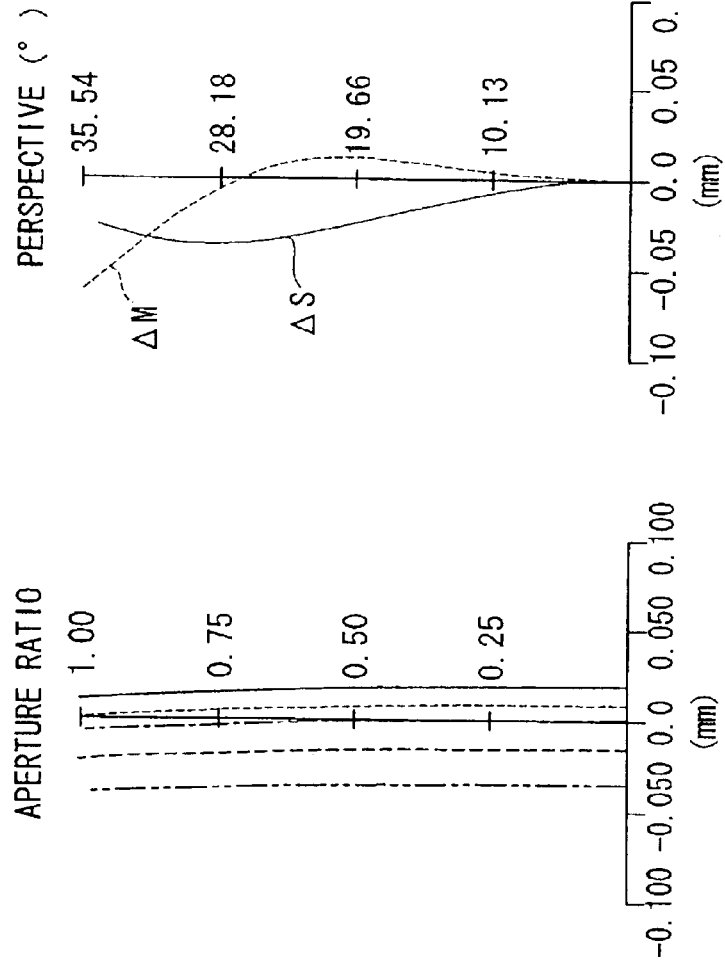
FIG. 27A SPHERICAL ABERRATION
FIG. 27B ASTIGMATISM
FIG. 27C DISTORTION

FIG. 29A SPHERICAL ABERRATION  FIG. 29B ASTIGMATISM  FIG. 29C DISTORTION

FIG. 31A SPHERICAL ABERRATION
FIG. 31B ASTIGMATISM
FIG. 31C DISTORTION

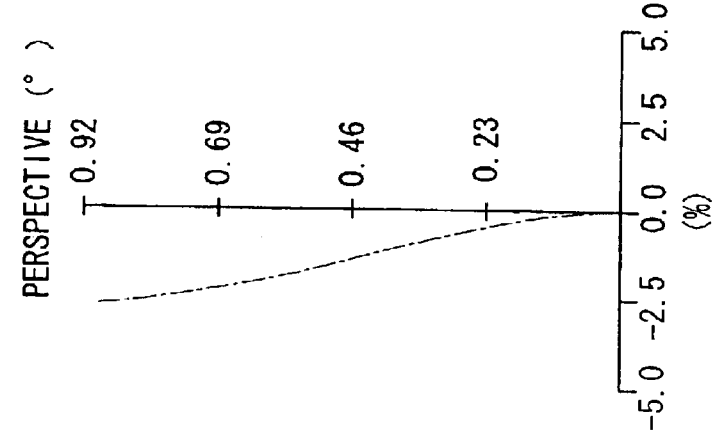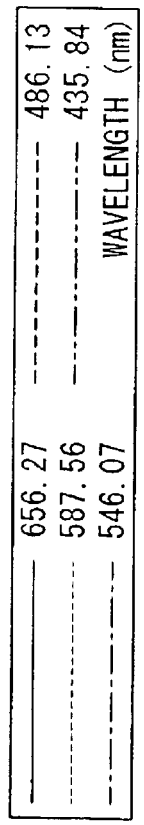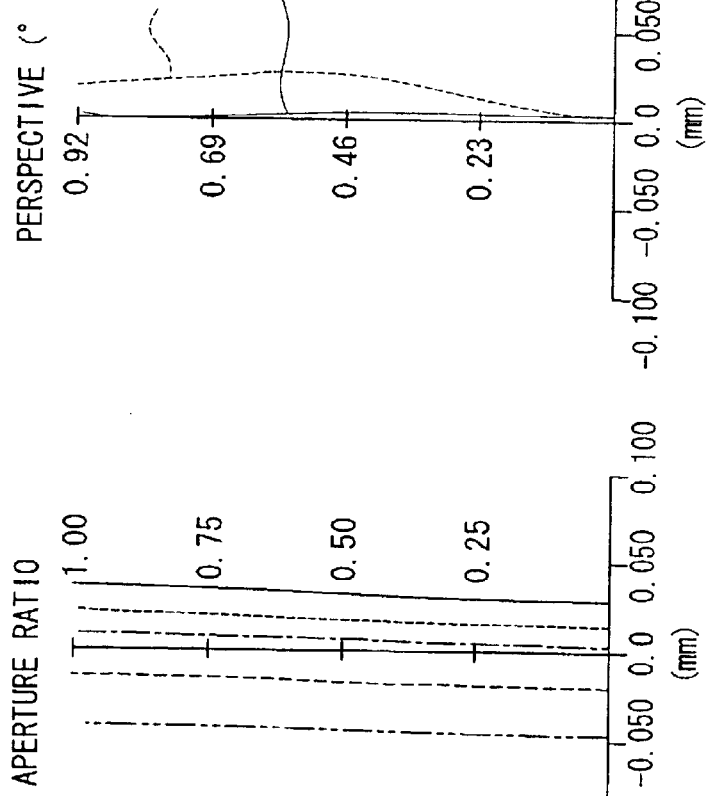
FIG. 34A SPHERICAL ABERRATION    FIG. 34B ASTIGMATISM    FIG. 34C DISTORTION

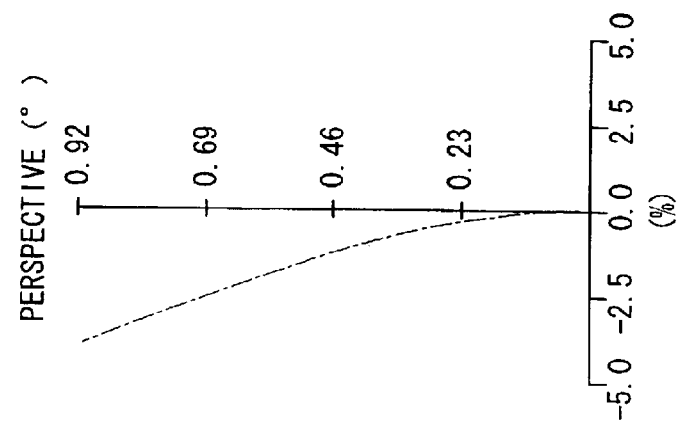
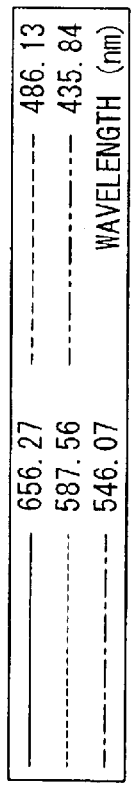
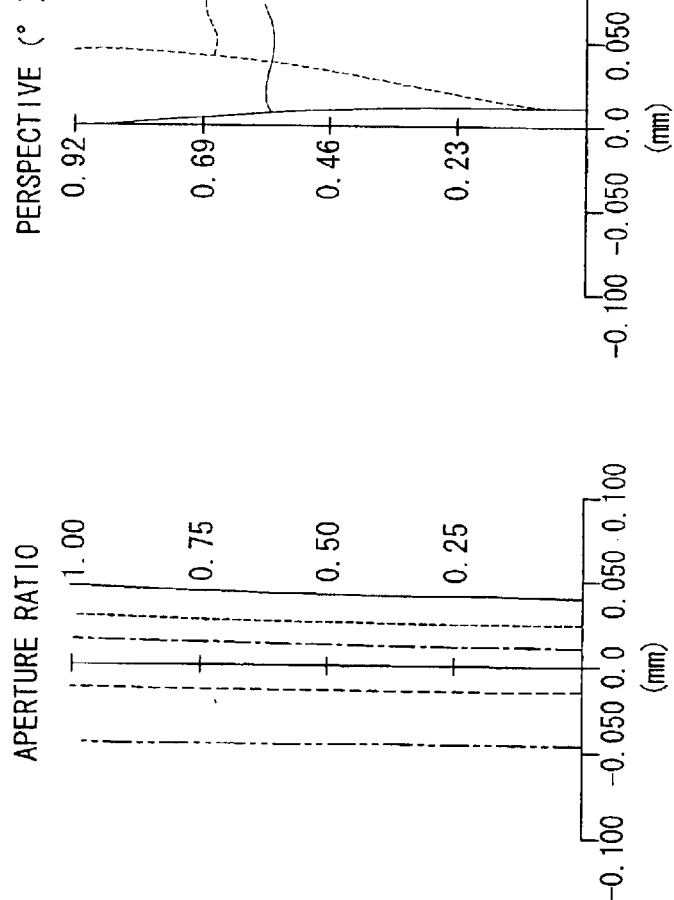
FIG. 35A SPHERICAL ABERRATION    FIG. 35B ASTIGMATISM    FIG. 35C DISTORTION

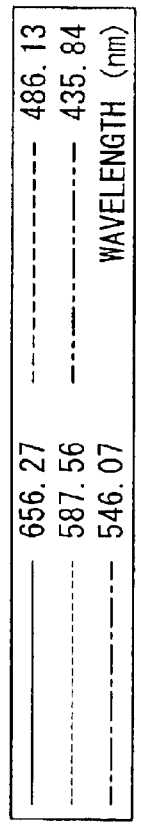
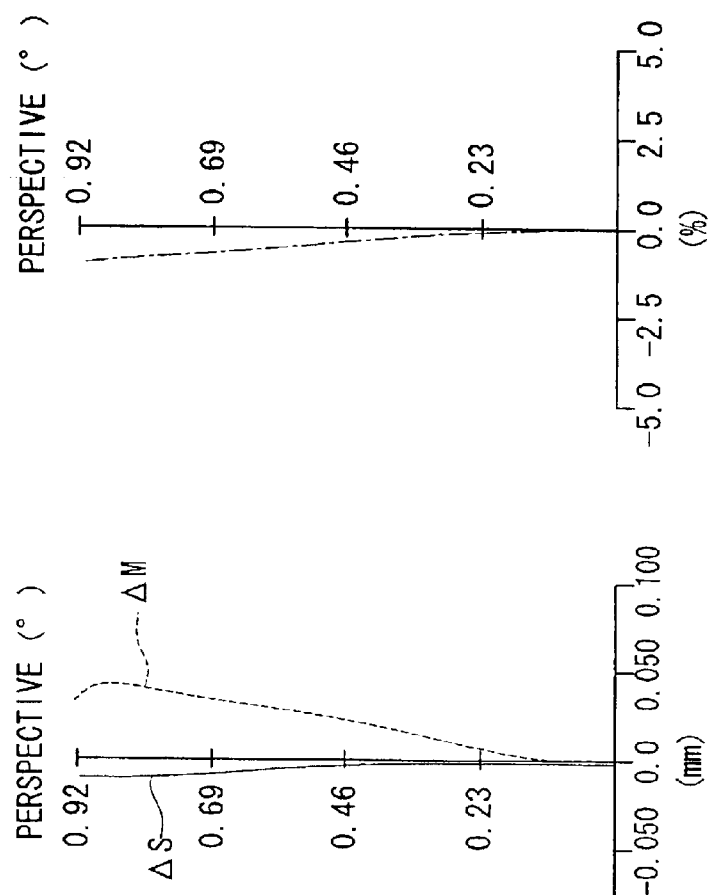
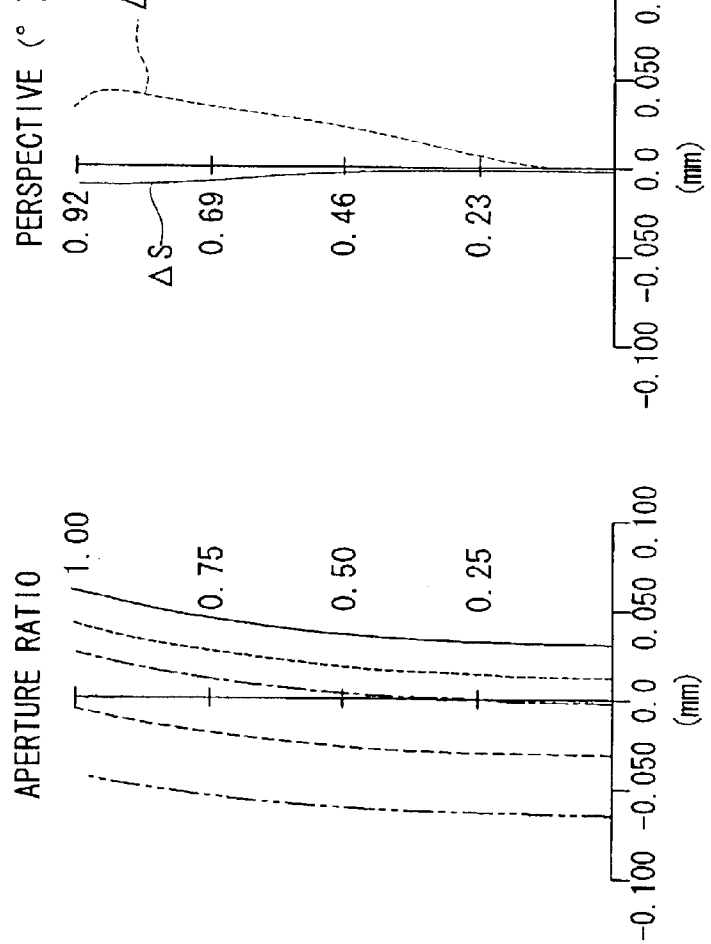

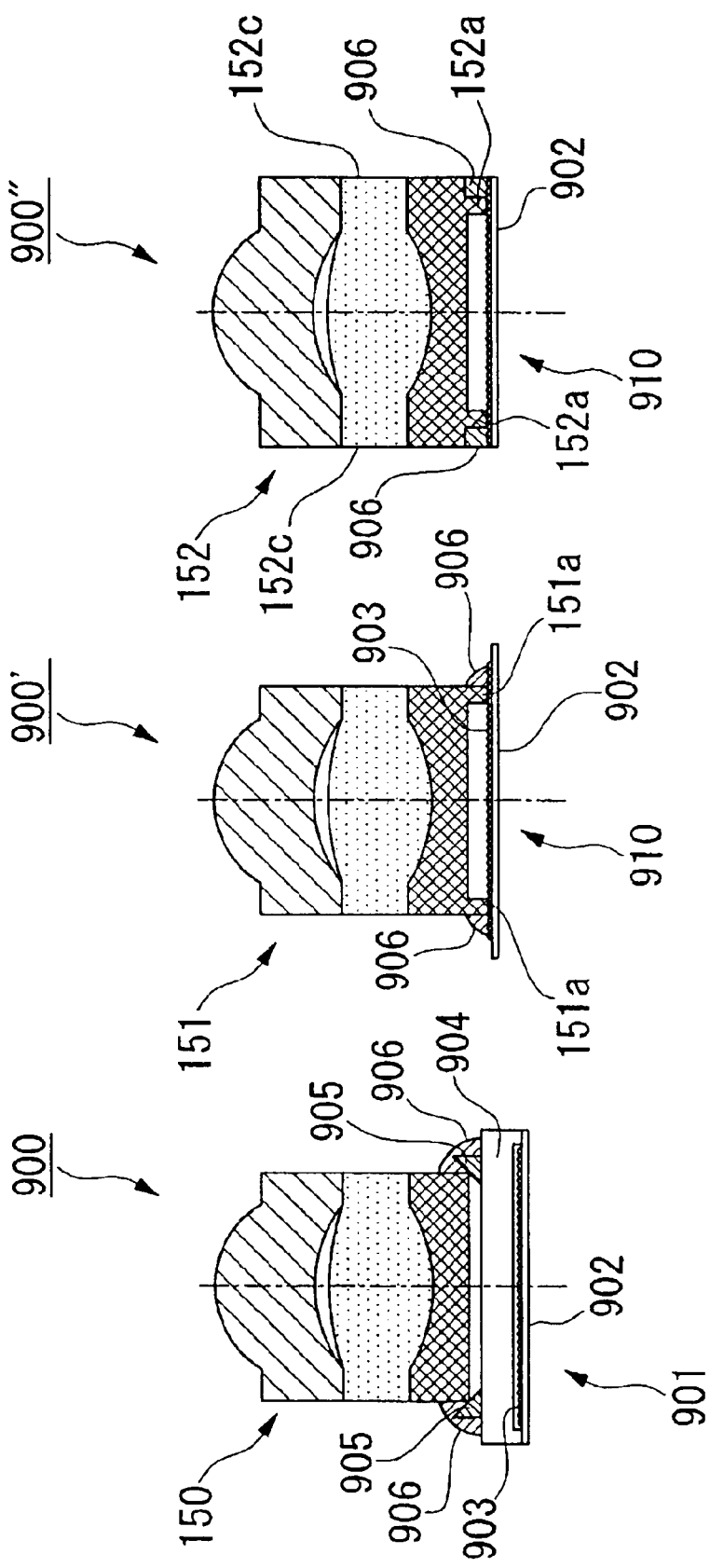

US 6,954,311 B2

IMAGE PICKUP LENS UNIT AND IMAGE PICKUP DEVICE

INCORPORATED BY REFERENCE

The present application is based on patent application No. 2002-345449 filed in Japan, the content of which is incorporated herein by reference.

BACKGROUND OF THE INVENTION

1. Field of the Invention

The present invention relates to an image pickup lens unit and an image pickup device.

2. Description of Related Art

Conventionally, in an image pickup lens unit using a plurality of lenses such as lenses in a camera, lenses are ground or formed and the lenses are disposed in a lens housing made of, for example, a metal member which is precisely formed. After that, the alignment of the lenses is adjusted mutually so as to be fixed. The lens unit which is unitarily formed with the lens housing is cemented to an image pickup device which is provided with an image pickup element.

Also, in a patent document (Japanese Unexamined Patent Application, First Publication No. 2002-243912 (pages 1 to 10, FIGS. 1, 2, 8, 10, and 12)), a combined use of lenses is disclosed in which two lenses having a flat surface on either surfaces of a light incident surface on a lens base member and a light emitting surface on a lens base member are cemented together so as to be used for an objective lens in an optical pickup and an optical disk device.

SUMMARY OF THE INVENTION

In a first aspect of the present invention, a plurality of optical elements of which optical axes are aligned are cemented each other in an image pickup lens unit, and a side surface of each optical element is disposed in a surface which expands in a direction of the optical axes of a plurality of the optical elements linearly.

In a second aspect of the present invention, an image pickup lens unit is produced by cementing a plurality of optical element arrays mutually which are provided with a plurality of optical elements of which optical axes are aligned such that optical axes of a plurality of the optical element arrays are aligned with the optical axes of a plurality of the optical elements and cutting the cemented optical element arrays in a direction of the optical axes of a plurality of the optical elements between the optical elements.

In a third aspect of the present invention, a formula such as 1.0<MD/ED<4.0 is effective under condition that a maximum outermost diameter of the image pickup lens unit in a cross section which crosses orthogonally to the optical axes is defined as an MD and a maximum beam effective diameter in an optical system which is formed by a plurality of the optical elements is defined as an ED.

In a fourth aspect of the present invention, a formula such as TT<20 mm is satisfied under condition that a total cutting length in a direction of optical axes of a plurality of the optical elements is defined as a distance TT.

In a fifth aspect of the present invention, the side surfaces of the optical elements are approximately parallel with the optical axes.

BRIEF DESCRIPTION OF THE DRAWINGS

FIG. 1A is a perspective view of an image pickup lens unit according to a first embodiment of the present invention.
FIG. 1B is a cross section viewed in a line A—A in FIG. 1A.

FIG. 2 is a perspective view showing approximately an example of a method for producing the image pickup lens unit according to the first embodiment in the present invention.

FIG. 3A is a perspective view of a first modification example. FIG. 3B is a cross section in line B—B in FIG. 3A. FIGS. 3C and 3D are cross sections of an example for a method for producing the above modification example in an optical axis direction.

FIGS. 10A to 10C show aberration in a first numeral data embodiment.

FIGS. 13A to 13C show aberration in a second numeral data embodiment.

FIGS. 15A to 15C show aberration in a third numeral data embodiment.

FIGS. 19A to 19C show aberration in a fifth numeral data embodiment.

FIGS. 21A to 21C show aberration in a sixth numeral data embodiment.

FIGS. 23A to 23C show aberration in a seventh numeral data embodiment.

FIGS. 25A to 25C show aberration in an eighth numeral data embodiment.

FIGS. 27A to 27C show aberration in a ninth numeral data embodiment.

FIGS. 34A to 34C show aberrations (W) in the twelfth numeral embodiment.

FIGS. 35A to 35C show aberrations (S) in the twelfth numeral embodiment.

FIGS. 36A to 36C show aberrations (T) in the twelfth numeral embodiment.

FIGS. 38A to 38C are cross sections in an optical axis direction for showing a general structure of an image pickup unit which is a main part of an image pickup device which is other example of an image pickup device according to the second embodiment of the present invention.

DETAILED DESCRIPTION OF THE INVENTION

Figure 4A:
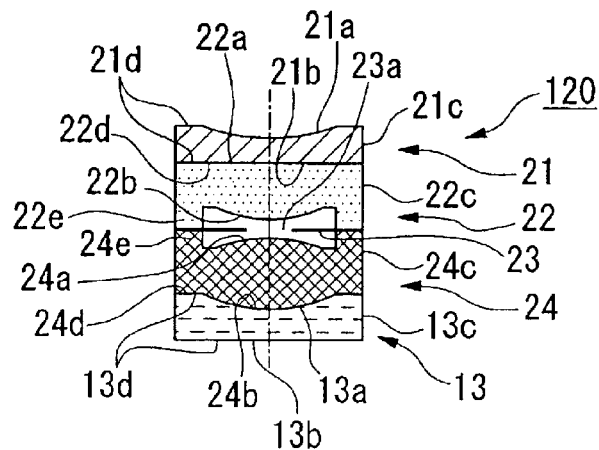
FIG. 4A is a cross section of a second modification example.

An image pickup lens unit and an image pickup device according to embodiments in the present invention are explained with reference to the attached drawings as follows.

First Embodiment

First, an image pickup lens unit according to a first embodiment in the present invention is explained. FIG. 1A is a perspective view for explaining a general structure of an image pickup lens unit 100 according to the present embodiment. FIG. 1B is a cross section viewed in a line A—A in FIG. 1A.

In an image pickup lens unit, a plurality of optical elements are cemented mutually of which optical axes are aligned, and a side surfaces of the optical elements are disposed in a certain surface. This certain surface expands in a direction of the optical axes linearly.

According to the present invention, the optical elements are cemented murually. Therefore, it is possible to manufacture an image pickup lens unit without using a lens housing for fixing the optical elements. Also, it is possible to provide an image pickup lens unit which can maintain and fix the optical elements stably by making use of side surfaces of the optical elements which are disposed in the certain surface.

The image pickup lens unit 100 has three lenses such as a lens 1, 2, and 4 and an optical filter 3. The three lenses 1, 2, and 4 are disposed so as to overlap each other such that the optical axes of these lenses are aligned. The optical filter 3 has a filter surface which does not have an optical power. An optical filter 3 (optical filter member) is disposed between the lenses 2 and 4 as an optical element. These optical elements, lenses and optical filter are formed unitarily. In this case, an optical element is cemented with adjacent optical element in the optical axis direction.

In a central part of the lens 1, a lens surface 1a and a lens surface 1b which is formed in a convex surface are provided. A flange section 1d is disposed on an outer periphery of the lens 1. This flange section expands in a direction orthogonal to optical axes of the lens surfaces 1a and 1b. An outer periphery of the flange section 1d is formed in an approximate square in a plan view. The flange section 1d is provided with a flange side surface 1c (side surface) which is approximately parallel with an optical axis. Also, a plurality of cylindrical positioning protruding sections are disposed on a surface of the flange section 1d which faces to the lens 2. The position protruding section 1e is a cylindrical shape and has a rectangular cross section.

The lens 2, the optical filter 3, and the lens 4 are provided with flange sections 2d, 3d, and 4d respectively similarly with the lens 1. The lens 2, the optical filter 3, and the lens 4 are provided with four flange side surfaces 2c, 3c, and 4c (side surfaces) respectively. Each surface of the flange side surfaces 1c, 2c, 3c, and 4c are disposed in the same direction. And the flange side surfaces 1c, 2c, 3c, and 4c are disposed (contacted) in the same flat surface in the optical axis direction respectively. Here, outer peripheries of the flange sections 1d, 2d, 3d, and 4d are formed to have spaces therebetween in the optical axes under condition that the flange sections are disposed so as to overlap each other.

Also, the lens 2, the optical filter 3, and the lens 4 are provided with optical surfaces. The lens 2 has a lens surfaces 2a and 2b. The optical filter 3 has a filter surfaces 3a and 3b of which surfaces are treated so as to work as optical filters. The lens 4 has a concave lens surface 4a and a flat lens surface 4b. Therefore, the lenses 1 and 2 are positive lenses which have a positive power. The lens 4 is a negative lens which has a negative power.

Also, the positioning grooves 2f which are formed in a concave groove are disposed on the flange section 2d which faces to the lens 1. The number of positioning grooves 2f is equal that of positioning protruding section 1e. A positioning section is formed by these positioning protruding sections 1e and the positioning grooves 2f. The positioning protruding sections 1e and the positioning grooves 2f are formed so as to fit each other without clearance in a direction orthogonal to the optical axis where the optical axis of the lens 1 and the optical axis of the lens 2 coincides.

Also, a surface on a tip of the positioning groove 2f in the optical axis direction is formed so as to contact the flange section 1d. By doing this, the lens 1 and the lens 2 are positioned precisely in the optical axis direction under condition that an air interval is formed between the lens surface 1b and the lens surface 2a. This air interval is formed between the lens surfaces 1b and 2a which have power; thus, this air interval works as an air lens which has a power.

Similarly, positioning sections such as a positioning protruding section 2e, a positioning groove 3f, a positioning protruding section 3e, and a positioning groove 4f are formed on the flange section 2d which faces to the lens 3, on the flange section 3d which faces to the lens 2, on the flange section 3d which faces to the lens 4, and on the flange section 4d which faces to the optical filter 3 respectively. These positioning sections are disposed such that optical axes of them are aligned and appropriate air intervals are formed among the optical surfaces of the optical elements.

Here, examples of shape of the positioning sections are illustrated in FIGS 1A to 1B. In FIGS. 1A and 1B, the shape was illustrated in a deformed manner so as to help understanding of the structure of the present invention. However, the size and shape of the positioning sections in the present invention are not limited in such a structure as long as it is possible to regulate the position of these positioning sections in an optical axis direction and in a direction orthogonal to the optical axis. For example, it is in a form of a V-shape protruding section and a V-shape groove, in a form of a pin and a pinhole, or in a form of a ball and a ball hole. Positioning sections having a fitting structure may be other than a positioning protruding section 1e and a positioning groove 2f shown in FIG. 1B. Also, it may be possible that a protruding sections having reference surfaces in a positioning direction are formed. By doing this, it is possible to position by pushing the reference surfaces each other.

For a method for cementing the lenses 1 and 2, the optical filter 3, and the lens 4, it is possible to use various methods preferably. For example, a method using a bonding agent such as an UV (ultra-violet) ray-curable resin and a method using a laser melting theory can be used.

The optical elements can be manufactured by forming a glass material or a synthetic resin in a mold. In particular, it is preferable to use a glass material because more stable optical characteristics and small size advantage are necessary in the optical element having an optical power. It is because a glass material has a greater refractive index with superior optical characteristics such as flatness, uniformity, and stability to a change in temperature.

An image pickup lens unit according to the present invention may be produced by cementing a plurality of optical element arrays mutually which are provided with a plurality of optical elements of which optical axes are aligned such that optical axes of a plurality of the optical element arrays are aligned with the optical axes of a plurality of the optical elements and cutting the cemented optical element arrays in a direction of the optical axes of a plurality of the optical elements between the optical elements.

According to the present invention, axes of a plurality of optical elements are aligned impartibly; thus, it is possible to shorten a positioning process. Also, optical elements are positioned and cemented together under condition of relatively large optical element arrays; thus, it is easy to handle these optical elements and it is possible to improve efficiency in the manufacturing process for the optical elements. Also, the cemented optical element arrays are cut; thus, it is possible to manufacture a great amount of small size image pickup lens units.

The image pickup lens unit 100 is manufactured as follows. First, preparing arrays 101, 102, 103 and 104 (optical element arrays). The arrays 101, 102, 103, 1 and 104 have the lens 1, the lens 2, the optical filter 3, and the lens 4 respectively. So those arrays have a same kind optical element. And in each array, optical elements are disposed in like a two dimensional lattice. And, neighboring optical elements have a same pitch. Simultaneously, a positioning protrusion and a positioning groove are formed. Next, these arrays are piled up so that the optical axes of these arrays are aligned and the arrays are positioned so as to be cemented together. As shown in FIG. 2, under such a condition, the arrays are cut along a cutting line 6 by a cutting device such as a cutter. In such a case, shapes of the flange side surfaces 1c, 2c, 3,c and 4c are formed along the cutting line 6. Therefore, the flange side surfaces 1c, 2c, 3c, and 4c are disposed in a same surface (contacting in a same surface). Such a surface expands in a direction of the optical axis linearly. In the present embodiment, the surface is in parallel with the optical axis. However, there is a case in which the surface is not parallel with the optical axis occasionally. Here it may be possible that the surface finish of the flange side surfaces 1c, 2c, 3c, and 4c are performed by, for example, a lapping process after cutting according to necessity.

By doing this, it is possible to form the flange side surfaces; thus, the manufacturing process becomes easy and fast.

Here, the arrays 101, 102, 103, and 104 are positioned in a direction orthogonal to the optical axis by disposing at least two positioning holes 8a and putting positioning pins 8b therethrough. Also, for example, the arrays 101, 102, 103, and 104 may be positioned by using a fixture which can retain the arrays 101, 102, 103, and 104 movably in a direction orthogonal to the optical axis.

Here, it is preferable that light absorbing sections are disposed on non-optical surfaces in the image pickup lens unit 100. For example, non-optical surface is the flange sections 1d, 2d, 2d, and 4d and the flange side surfaces 1c, 2c, 3c, and 4c. The light absorbing section is formed by a method such as painting method and a vapor disposition method. In particular, it may be possible that light absorbing sections are disposed on the flange side surfaces 1c, 2c, 3c, and 4c by rolling a film member having a light-absorbing characteristics on these surfaces and fix there. In such a case, it may be possible to dispose and fix a non-contractive film member such as a rubber member or a thermally-contracting tube thereon. Also, it may be possible to roll and fix a non-contractive film member such as a paper and a synthetic resin on the flange surfaces 1c, 2c, 3c, and 4c by using a bonding agent or an adhesive member.

Next, function of the image pickup lens unit 100 according to the present embodiment is explained.

In the image pickup lens unit 100 according to the present embodiment, optical elements such as lenses 1, 2, and 4, and an optical filter 3 are positioned and cemented with neighboring optical elements in an optical axis direction. Therefore, members for cementing and retaining the optical elements such as a lens cylinder lens barrel are not necessary. As a result, it is possible to reduce a the number of such members; thus, it is possible to reduce the production cost.

Simultaneously, there is an advantage in that it is possible to make the image pickup lens unit 100 in a lighter weight and smaller size. Also, according to the present invention, it is possible to form an optical filter member unitarily with the image pickup lens unit; thus, it is possible to improve the function of the image pickup lens unit and make the image pickup lens unit in a smaller size. Also, it is possible to cement the optical filter member with the other optical members by similar manufacturing processes; thus, it is possible to simplify the manufacturing processes and improve the productivity.

Also, in the present embodiment, a positioning section in the optical axis direction is disposed on the flange sections 1d, 2d, 3d, and 4d as an outer periphery section of the optical surface unitarily; therefore, it is possible to form inaccuracy caused by cementing a plurality of members; thus, it is possible to dispose the air intervals highly accurately. Also, a refractive surfaces having the air surfaces have a larger power than in the cemented surface of the cemented lens having less refractive index difference; thus, if the number of optical elements are equal, it is possible to realize higher optical characteristics by forming the large air intervals than in a case (including a case in which there is no air interval) that an air interval is narrow.

Also, in the present embodiment, the optical elements are disposed on the flange sections 1d, 2d, 3d, and 4d in a peripheral section of the optical surface; therefore, it is possible to form positioning sections on the flange sections 1d, 2d, 3d, and 4d. Also, it is possible to use the flange sections as cementing surfaces. By doing this, there is no concern that the optical surfaces are damaged or polluted; therefore, there is an advantage in that production efficiency improves.

Also, protruding sections are formed on outer peripheral sections of the flange sections 1d, 2d, 3d, and 4d so as to be disposed toward thereoutside. The protruding sections is formed such that spaces are formed in an optical axis direction when other optical elements are disposed on the protruding sections. By doing this, it is possible to use such spaces as a relief for the bonding agent or cutting tip which is produced in a metal-cutting operation.

Also, in the present embodiment, the optical element arrays are disposed in a two dimensional arrangement. Therefore, it is possible to align optical axes easily, even if many optical elements are used. Also, it is possible to form the side surfaces in one cutting operation even if many optical elements are used; thus, it is possible to improve the cutting efficiency. As a result, it is possible to improve the productivity; therefore, the present embodiment is suitable for a mass-production.

As explained above, the image pickup lens unit 100 according to the present embodiment is provided with the flange side surfaces 1c, 2c, 3c, and 4c which are disposed on the flange sections 1d, 2d, 3d, and 4d in the peripheral sections of the optical elements. The flange side surfaces 1c, 2c, 3c, and 4c are aligned on surfaces of a prismatic column which is approximately parallel with the optical axis. Therefore, it is possible to use the flange surfaces for a cementing surface. Also, as explained above, the image pickup lens unit 100 according to the present embodiment is produced by piling up the optical element arrays and cutting the cemented optical element arrays by a cutter 5. By doing this, the positioning and cemented process of the optical element arrays which include a lot of optical elements are performed in one time. As a result, it is easy to fix the positioning relationship. Therefore, there is an advantage in that it is possible to improve the productivity greatly than in a case in which a lot of optical elements are positioned and cemented independently. Such an advantage is more conspicuous when optical elements are small; thus, it is suitable for a mass production of a small image pickup lens unit.

Here, in the present embodiment, a case in which three optical elements which have power is explained. More importantly, it is possible to improve the optical characteristics by increasing the optical elements. In such a case, it is possible to correct the aberrations by providing at least one positive lens and at least on negative lens there.

Also, it is preferable that no more than 10 optical elements having a power are disposed. By doing this, it is possible to prevent excessive alignment error which is caused in machining process for the positioning section and an assembling processes for the optical elements. Also, it is more preferable that no more than eight optical elements having a power are disposed. It is further preferable that no more than seven optical elements having a power are disposed. It is possible to determine the number of the optical elements according to a relationship of a required characteristics for the image pickup lens unit 100 and the production cost.

Here, in the above explanation, there is no limitation for an air interval. However, it is preferable to limit the air intervals. By limiting the air intervals in an appropriate distance, the length of the positioning section in the optical axis direction becomes short; thus, it is possible to perform a machining operation in superior accuracy easily. As a result, it is possible to prevent inaccurate alignment.

More specifically, it is preferable that the image pickup lens unit can satisfy following conditions such as ST/TD<0.7 (formula 1) and MT/TD<0.5 (formula 2) where TD is defined as a surface interval (total length of the optical system) on the optical axis from a first surface of the optical system which is formed by the optical elements are cemented together to the last surface of the optical system, ST is defined as a total length of the air intervals on the optical axis (total air intervals), and MT is defined as a maximum value of the length of the air intervals on the optical axis (maximum air interval). At the above conditions, value of ST/TD or MT/TD exceed the uper limit, the air interval or the total length of the optical system become longer; thus, alignment error becomes larger. As a result, it is difficult to realize a sufficient optical characteristics.

Also, it is preferable that following conditions 3 and 4 are satisfied instead of the formulae 1 and 2 if it is satisfied, it is possible to further improve the accuracy in assembly and machining operation for the optical elements.

$$ST/TD<0.6 \qquad \text{(condition 3)}$$

$$MT/TD<0.4 \qquad \text{(condition 4)}$$

In order to further improve the accuracy in assembly and machining operation for the optical elements, it is preferable that following conditions 5 and 6 are satisficedinstead of the conditions 1 and 2.

$$ST/TD<0.5 \qquad \text{(condition 5)}$$

$$MT/TD<0.3 \qquad \text{(condition 6)}$$

Furthermore, in the above embodiment, explanation was made for a case in which eight air surfaces for the optical elements are disposed. However, it is possible that the air surfaces are limited. By doing this, it is possible to reduce a stray light which easily occurs on the air surfaces. As a result, it is possible to prevent a ghost image and a flare; thus, it is possible to improve the quality of the image. Also, it is possible to remove the optical surfaces which must be coated so as to be anti-reflection or reduce such optical surfaces. Thus, it is possible to realize low production cost.

Therefore, it is preferable that the air surfaces be no more than ten optical surfaces.

By doing this, it is possible to reduce a ghost image and a flare caused by a reflected light on the air surfaces. As a result, superior image quality can be realized even if less anti-reflection coating processes are performed to the optical elements; thus, it is possible to reduce a production cost without degrading the image quality.

For the purpose of reducing more stray lights, it is preferable that no more than eight air surfaces are provided. It is further preferable that no more than six air surfaces are provided for that purpose.

Also, the above embodiment is explained by a case in which there is no particular limitation on a shape of the optical surface. However, it is preferable that curvature of the optical element is limited such that the inclination of the curvature should not be steep. By doing this, it is possible to perform a measuring operation by using a contacting shape measuring device such as a FORM TALYSURF (Trademark registered by TAYLOR HOBSON LTD.). By using the contacting shape measuring device, it is possible to measure the error in shape directly. Therefore, it is possible to determine whether or not the product is defect without measuring the optical characteristics. Also, it is possible to improve the manufacturing processes by the obtained measurement result. Also, it is possible to measure the shape of the optical surface quickly. As a result, there is an advantage in that it is possible to improve the manufacturing efficiency for an optical surface having a power according to the present embodiment.

More specifically, it is preferable that an inclination angle $\theta$ on the optical surfaces of the optical elements should be no more than 60 degrees. The inclination angle $\theta$ is defined as an angle made between the optical axis in an optical surface in the optical element and a normal in an effective diameter of the optical surface. If the maximum inclination angle is no more than 55 degrees, it is possible to enhance the measuring accuracy even in a case in which inaccuracy in shape is large; therefore, it is preferable because it is possible to form accurate optical surfaces easily. It is further preferable if the maximum inclination angle is no more than 50 degrees.

Next, modified examples according to the present embodiment are explained. In any modified examples, differences from the above embodiment are explained. In the explanation for the modified examples, same reference numerals are added to the same members as those in the first embodiment so as to omit duplication in the explanation.

First, a first modified example is explained. FIG. 3A is a perspective view for explaining a first modified example of the present embodiment. FIG. 3B is a cross section in line B—B in FIG. 3A. FIGS. 3C and 3D are cross sections of an example for a method for producing the above modification example in an optical axis direction.

As shown in FIGS. 3A and 3B, an image pickup lens unit 110 according to the present modified example is provided with lenses 11, 12 and 13. Optical axes of these lenses are aligned. These lenses are cemented together respectively by flange sections 11d, 12d, 13d which expand in a direction orthogonal to the optical axis. The flange sections 11d, 12d, 13d are different from the image pickup lens unit 100 shown in FIGS. 1A and 1B so that a positioning protruding section and a positioning groove are not disposed on the flange sections 11d, 12d, 13d. Shape of these flange sections are approximate square in a plan view. These flange sections are provided flange side surfaces 11c, 12c, 13c (side surfaces) which are disposed in arrays on four flat surfaces which are approximately parallel with the optical axes. As shown in FIG. 3A, the flange side surfaces 11c, 12c, and 13c which are disposed in the same direction on the same flat surface along the optical axes.

A lens 11 is a positive lens which is provided with a convex lens surface 11a and a concave lens surface 11b. A lens 12 is a positive lens which is provided with convex lens surfaces 12a and 12b. A lens 13 is a negative lens which is provided with a concave lens surface 13a and a flat lens surface 13b.

A flange section 11d on the lens surface 11b and the flange section 12d on the lens surface 12 contact each other. Here, the radius of curvatures in the lens surface 11b and the lens surface 12a are different; therefore, an air interval is formed between the lens surface 11b and the lens surface 12a.

Also, the lens surface 12b and the lens surface 13a have the same radius of the curvature. The lens surface 12b and the lens surface 13a are cemented together by a bonding agent for the lenses therebetween. In such a case, a power $\phi$ in the lens surfaces 12b and 13a as cementing surfaces should satisfy a following condition such as $0<|\phi/\phi_A|<0.5$ (Formula 7). $\phi_A$ is defined as a power in an entire optical system in the image pickup lens unit 110. Here, $|a|$ indicates an absolute value of "a".

The present modified example is different from a case of the image pickup lens unit 100 in that a positioning section in a direction orthogonal to an optical axis of the optical element is not provided. Thus, when an image pickup lens unit 110 is manufactured by using the lenses 11, 12, and 13 independently, a positioning operation in a direction orthogonal to the optical axis is performed by clamping the optical elements by an appropriate fixture and moving the lenses to a position where the optical axes of the optical elements are aligned. Also, the positioning operation may be performed by producing the flange side surfaces 11c, 12c, and 13c on the optical elements such that a distance from the optical axes are accurately uniform and disposing the flange side surfaces 11c, 12c, and 13c on an appropriate reference surface. Also, it may be acceptable if the image pickup lens unit 110 is not manufactured by using the lenses 11, 12, and 13 independently. That is, as shown in FIGS. 3C and 3D, arrays 111, 112, and 113 (optical element arrays) on which the lens surfaces 11a, 11b, 12a, 12b, 13a, and 13b are disposed are manufactured and the positioning operation is performed by moving optical element arrays respectively so as to cement together and cut therefor. Here, FIGS. 3C and 3D are views for explaining a general idea for a manufacturing process in which such a method is employed to the present modified example. For a member used for an cementing operation and a cutting operation, it is possible to use equivalent members which are used in the first embodiment.

In the present modified example, a lens unit is produced by three optical elements such that a pair of optical surfaces are cemented together. Therefore, it is possible to correct a chromatic aberration by selecting refractive indices of the optical elements which are cemented together appropriately. As a result, it is possible to realize a high quality image pickup lens unit having less chromatic aberration.

Also, the power $\phi$ in the cemented surface satisfies a condition 7; therefore, it is not necessary to make a radius of curvature in the cemented surface excessively small. Therefore, it is possible to form the cemented surface easily. As a result, it is possible to manufacture optical surfaces which is used for an cemented surface by a low cost.

Here, the present modified example was a case in which a pair of lens surfaces are cemented together. For a purpose of improving the correction of the chromatic aberration, it may be possible that the number of the cemented surfaces should increase. In such a case, φ in the formula 7 should be understood to be a maximum of a power in these cemented surfaces.

In order to improve a formability in the cemented surfaces, it is preferable to satisfy a following condition $0<|\phi/\phi_A|<0.4$ (condition 8) instead of the condition 7. If it is satisfied, it is possible to increase the radius of curvature.

In order to further improve a formability in the cemented surfaces, it is preferable to satisfy a following condition such as $0<|\phi/\phi_A|<0.3$ (condition 9) instead of the condition 8.

Figure 4B:
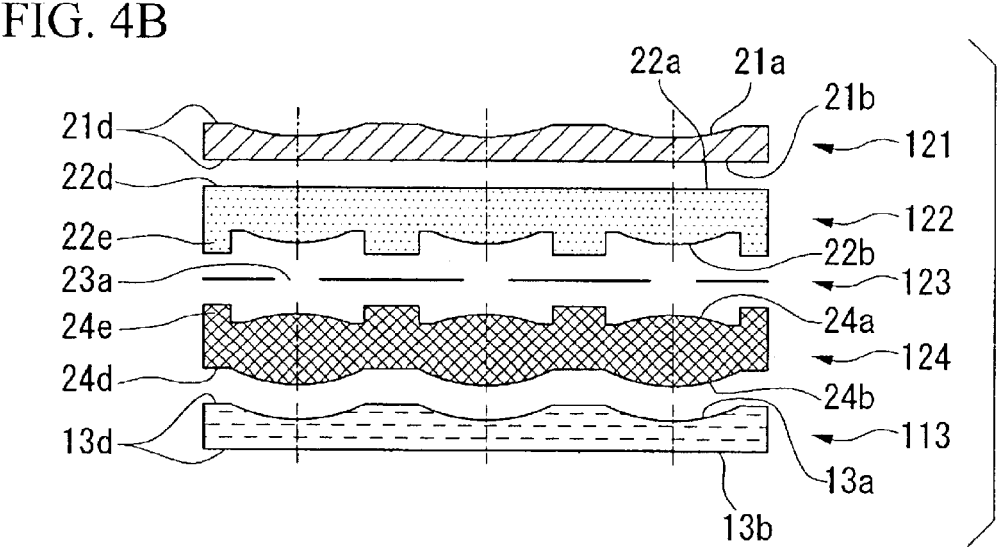
FIGS. 4B and 4C are cross sections showing a general structure of an example for a method for producing the above modification example in an optical axis direction.
Figure 4C:
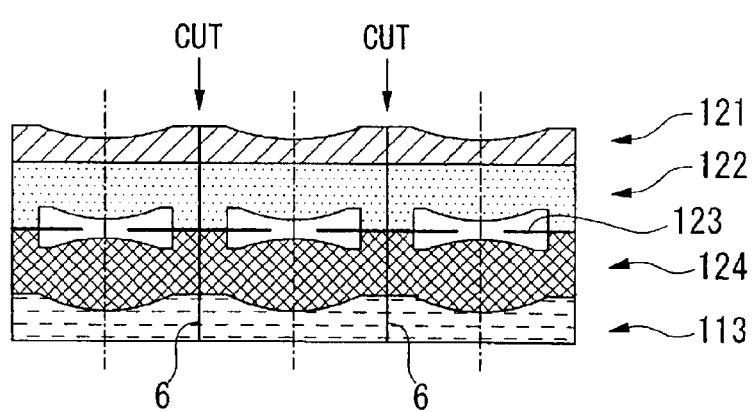

Next, a second modified example is explained. FIG. 4A is a cross section of a second modification example in an optical axis direction. FIGS. 4B and 4C are cross sections showing a general structure of the second modified example for a method for producing the above modification example in an optical axis direction.

As shown in FIG. 4A, an image pickup lens unit 120 according to the present modified example is provides with four optical elements such as lenses 21, 22, 24, and 13. An aperture stop 23 (retaining member) for restricting a beam in a predetermined shape is disposed between the lenses 22 and 24. Each optical element is provided with the flange side surfaces 21c, 22c, 24c, and 13c (side surfaces). The flange side surfaces which are disposed in the same direction on the same flat surface along the optical axes.

A lens 21 is a flat-concave lens. A lens 22 is a flat-convex lens. The lenses 21 and 22 are cemented together on flat lens surfaces 21b and 22a respectively. In the lens 22, a positioning protruding section 22e which protrudes in an optical axis direction is formed on the flange section 22d which faces to the convex lens surface 22b.

An aperture stop 23 is made of a synthetic resin member or a metal member of which surface absorbs a light. The aperture stop 23 is provided with an end surface which coincides a surface on which the flange side surfaces 21c, 22c, 24c, and 13c on the optical elements are disposed in arrays.

A lens 24 is a positive lens having convex surfaces on both sides. A lens surface 24b is cemented with a concave surface of the lens surface 13a. A positioning protruding section 24e which protrudes in an optical axis direction is formed on the lens surface 24a side of the flange section 24d.

The positioning protruding sections 22e and 24e face each other so as to be cemented together such that the aperture stop 23 is sandwiched therebetween. An air interval is formed between the lens surfaces 22b and 24a.

The image pickup lens unit 120 can be manufactured by cementing the arrays 121, 122, and 124 (optical element arrays) on which the lens surfaces 21a, 21b, 22a, 22b, 24a, and 24b are disposed in arrays and an array 113 together and cutting the cemented optical element arrays. In such a case, the aperture stop 23 is formed by cementing the aperture stop sheet 123 having an aperture section which coincides a disposition pitch of the optical elements is sandwiched and cemented between the arrays 122 and 124. Here, for a member for forming the aperture stop sheet 123, a synthetic resin member or a metal member can be used.

According to the present modified example, it is possible to form an air interval having a predetermined distance between the lens surface 22b and the lens surface 24b by the facing positioning protruding sections 22e and 24e. Also, the optical elements are cemented at the flange sections; therefore, it is possible to simplify a shape of the optical elements which are formed unitarily. As a result, there is an advantage in that a formability of the optical elements improves and it is possible to improve the productivitiy simultaneously with realizing the accuracy in the molding operation.

Also, according to the present modified example, it is possible to form the aperture stop 23 in the image pickup lens unit 120 unitarily. In such a case, it is possible to perform the positioning operation and the cementing operation for the optical elements by equivalent processes by using the aperture stop sheet 123; therefore, there is an advantage in that it is possible to assemble the image pickup lens unit very accurately easily.

Figure 5A:
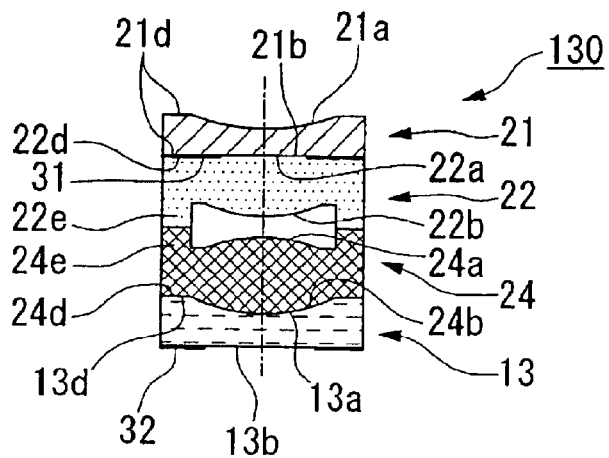
FIG. 5A is a cross section of a third modification example.
Figure 5B:
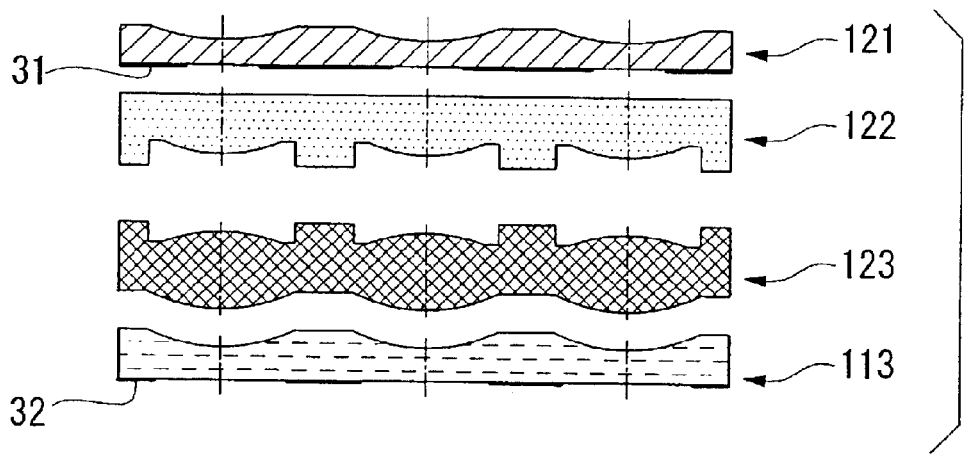
FIGS. 5B and 5C are cross sections showing a general structure of an example for a method for producing the above modification example in an optical axis direction.
Figure 5C:
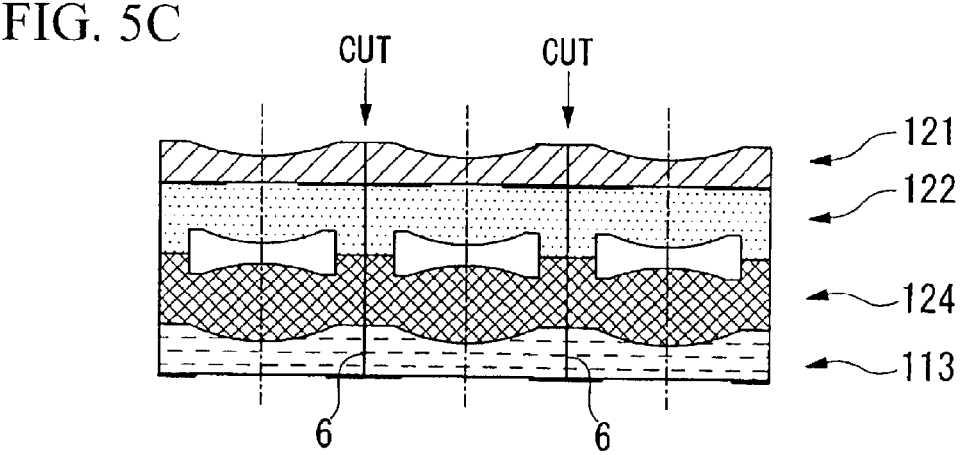

Next, a third modified example is explained. FIG. 5A is a cross section in an optical axis direction for explaining the third modification example according to the present embodiment. FIGS. 5B and 5C are cross sections showing a general structure of an example for a method for producing the above modification example in an optical axis direction.

As shown in FIG. 5A, an image pickup lens unit 130 according to the present modified example is provided with the lenses 21, 22, 24, and 13 which are same construction of the second modified example. The flange side sections 21c, 22c, 24c, and 13c are disposed in the same direction on the same flat surface in the optical axis direction respectively.

Here, an aperture stop coating 31 as a shielding layer (film) is formed on a lens surface 21b on the lens 21. A beam having a predetermined distance is incident to the lens 21 through the aperture stop coating 31. Also, a flare stop coating 32 as a shiedling layer is formed on a lens surface 13b on the lens 13. It is possible to prevent a light from being incident from a section except an effective lens diameter by the flare stop coating 32. That is, the flare stop coating 32 is provided with a flare preventing function.

The aperture stop coating 31 and the flare stop coating 32 can be formed by applying a light-absorbing material or performing a vapor deposition operation. When the aperture stop coating 31 and the flare stop coating 32 are produced by using the optical element array, the aperture stop coating 31 and the flare stop coating 32 are formed in the arrays 121 and 113 respectively so as to be cemented together as shown in FIGS. 5B and 5C.

According to the present modified example, the aperture stop coating 31 and the flare stop coating 32 are formed in the optical elements respectively; therefore, it is not necessary to form the apertures by using different members for forming the apertures. Therefore, it is possible to omit a process for positioning the optical elements when the optical elements are cemented together; thus, it is possible to reduce the number of the members for forming the image pickup lens unit. As a result, it is possible to improve the productivity; thus, it is possible to reduce the production cost. Also, according to the present invention, a reflected light on a surface except the optical surfaces of the optical elements are absorbed; therefore, it is possible to restrict the ghost image and the flare. As a result, it is possible to improve the image quality.

Figure 6A:
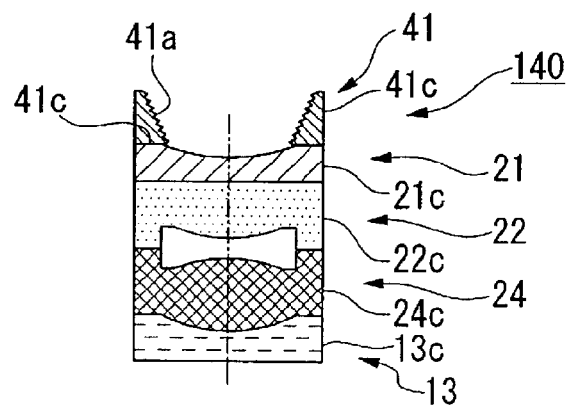
FIG. 6A is a cross section of a fourth modification example.
Figure 6B:
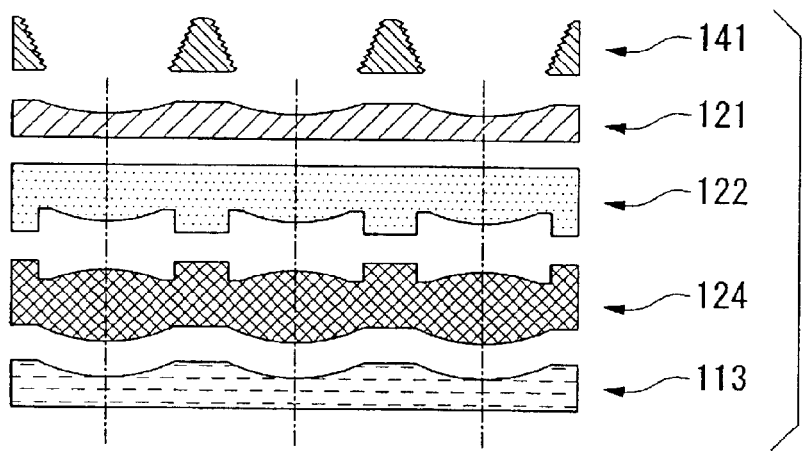
FIGS. 6B and 6C are cross sections showing a general structure of an example for a method for producing the above modification example in an optical axis direction.
Figure 6C:
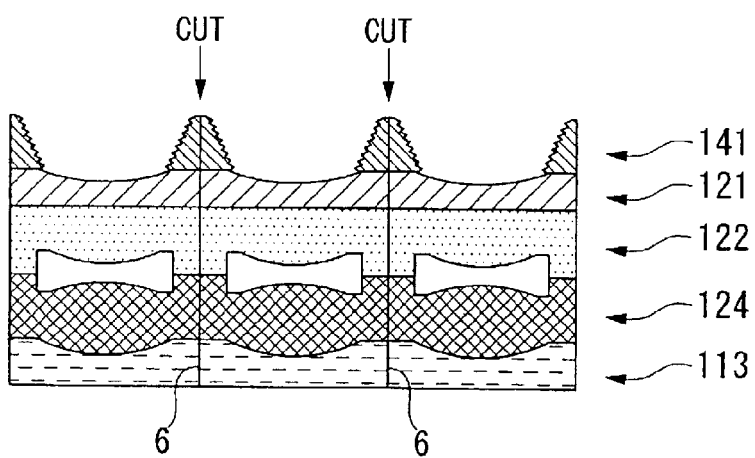

Next, a fourth modified example is explained. FIG. 6A is a cross section in an optical axis direction for explaining a fourth modification example according to the present invention. FIGS. 6B and 6C are cross sections showing a general structure of an example for a method for producing the above modification example in an optical axis direction.

As shown in FIG. 6A, an image pickup lens unit 140 according to the present modified example is provided with the lenses 21, 22, 24, and 13 which are the same construction of the second modified example. The flange side sections 21c, 22c, 24c, and 13c are disposed in the same direction on the same flat surface in the optical axis direction respectively.

In the present modified example, a hood member 41 is cemented to the lens 21. The hood member 41 is made of a synthetic resin member of which surface is at least processed to absorb a light. The hood member 41 is a wall member which has an inclined internal surface 41a. The internal surface 41a expands in an optical axis direction so as to surround the effective lens diameter of the lens 21 under condition that the diameter of the inner surface 41a enlarges gradually. According to such a structure, the hood member 41 has a function for restricting an external light which is incident to the lens 21. An outer peripheral surface 41c is disposed in array on the flange side surfaces 21c, 22c, 24c, and 13c.

In the present modified example, it is possible to employ a manufacturing method in which a hood array member 141 is produced such that the hood member 41 is formed under an array condition, and the hood array member 141 and the optical element array are cemented together so as to be cut.

According to the present modified example, the hood member 41 and the optical elements are cemented together unitarily; therefore, an external light is hardly incident. Thus, it is possible to produce an image pickup lens unit having an improved image quality in which the external light is hardly incident easily and low cost.

That is, according to the present invention, it is possible to restrict the ghost image and the flare caused by the external light by using the hood member; therefore, it is possible to improve the image quality. Also, it is possible to cement the hood member and different optical elements together by an equivalent assembly operation; therefore, it is possible to simplify the assembly processes and improve the productivity.

Figure 7A:
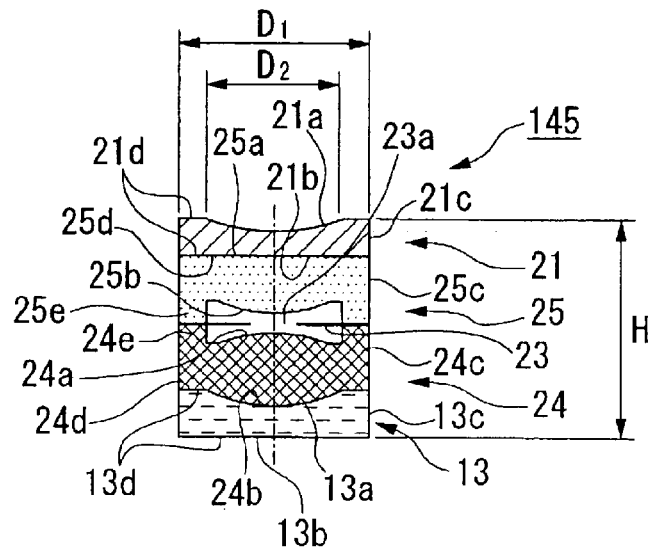
FIG. 7A is a cross section of a fifth modification example.
Figure 7B:
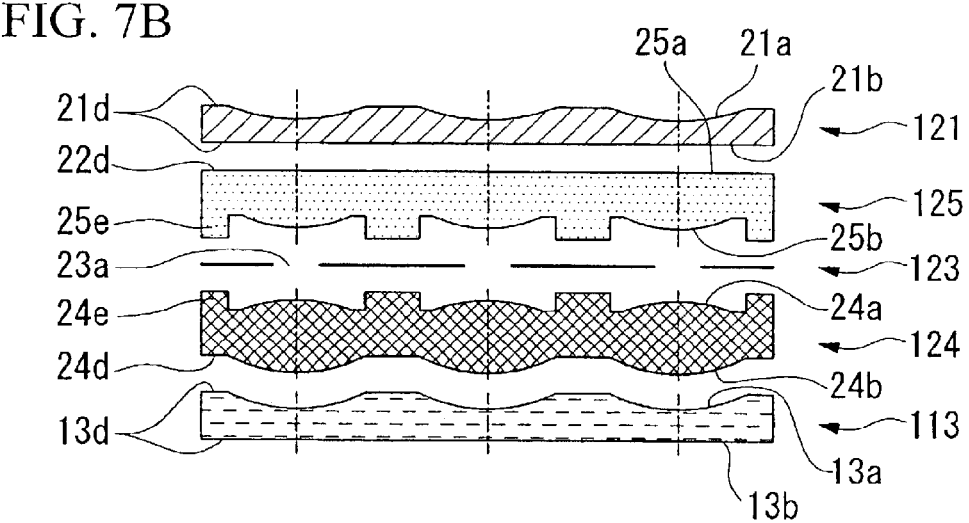
FIGS. 7B and 7C are cross sections showing a general structure of an example for a method for producing the above modification example in an optical axis direction.
Figure 7C:
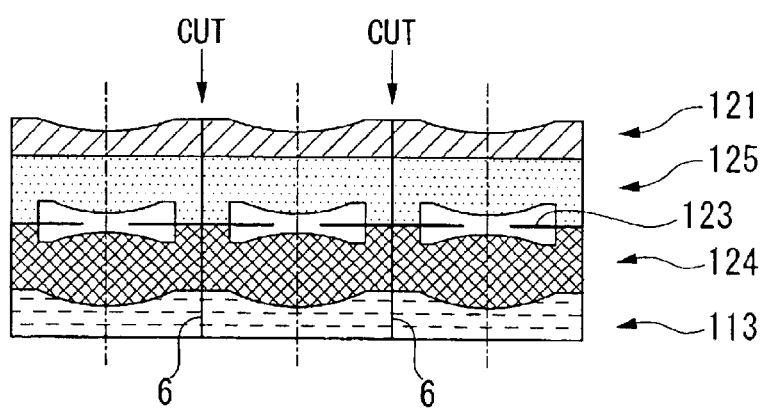

Next, a fifth modified example is explained. FIG. 7A is a cross section in an optical axis direction for explaining the fifth modification example. FIGS. 7B and 7C are cross sections showing a general structure of an example for a method for producing the above modification example in an optical axis direction.

As shown in FIG. 7A, an image pickup lens unit 145 according to the present modified example is provided with a light condensing lens 25 instead of the lens 22 in the image pickup lens unit 120 according to the second modified example.

The lens 25 is provided with a lens surfaces 25a and 25b (optical surfaces). These lens surfaces 25a and 25b are cemented together among the aperture stop 23, the flange section 25d, and the positioning protruding section 25e respectively. An air interval is formed between the lens surface 25b and the lens surface 24a. The flange surface 25c (side surface) is disposed on the same flat surface as the surface on which the flange surfaces 21c, 24c, and 13c are disposed in the optical axis direction.

The lens 25 is designed such that a distance between the flange section 25d and the positioning protruding section 25e becomes minimum by changing the refractive index in a glass material for the lens 22 and shapes of the lens surface 25a and 25b appropriately. More specifically, it is possible to design the lens 25 by, for example, replacing the glass material by the glass material having larger refractive index or forming either one of the lans surfaces 25a and 25b in aspherical shape.

At such an image pickup lens unit 145 it is preferable to satisfy a following condition such as TT<20 mm (Formula 10) where TT is defined as a total cutting length in an optical axis direction (in the present modified example, the total cutting length is indicated by a distance H shown in FIG. 7A between the flange surface 21d near the lens surface 21a and the flange surface 13d near the lens surface 13b).

By doing this, the total cutting length becomes less than a predetermined upper limit; thus, it is possible to shorten a time for cutting the optical element array; therefore, the total cutting time is in a reasonable range. Therefore, it is possible to improve the productivity. Also, a heat which is generated during a cutting operation decreases; therefore, it is possible to restrict a distortion of the optical element due to the heat can be decreases in a continuous cutting operation. Therefore, it is possible to improve the productivity while maintaining the high optical performance.

According to the present modified example, the distance TT satisfies the condition 10: therefore, it is possible to form the arrays 121, 125, the aperture stop sheet 123, the arrays 124 and 113 which are cemented with the image pickup lens unit 145 by an appropriate thickness which can be cut relatively in a short period. Therefore, there is an advantage in that it is possible to improve the productivity. In addition, the heat which is generated in the cutting operation can be reduced; therefore, there is an advantage in that it is possible to prevent the optical performance from being deteriorated by the thermal distortion.

Also, it is preferable that the distance TT should be minimum so as to imiprove the productivity such that the cutting operation is performed in a shorter period. Thus, it is preferable that the distance TT should satisfy a following conditions such as TT<15 mm (condition 11).

Furthermore, it is preferable that the distance TT should satisfy a following condition such as TT<10 mm (condition 12).

In the present invention, it is preferable to satisfy a following condition such as 1.0<MD/ED<4.0 (condition 13) where MD is defined as a maximum outermost diameter of the image pickup lens unit in a cross section which crosses orthogonaly to the optical axes. ED is defined as maximum beam effective diameter in an optical system which is formed by a plurality of the optical elements.

By doing this, a maximum limit is set for a value of MD/ED and a size of a part to which a light beam is not incident is limited. Therefore, it is possible to increase the number of the optical elements which are disposed on an optical element array. In addition, it is possible to set the number of products according to a portion in one cutting operation for the cemented optical element arrays. Furthermore, it is possible to save a cost for members for producing the optical elements; thus, it is possible to reduce the production cost. Also, it is not necessary to use a large size metal mold for molding an optical element arrays; thus, it is possible to form the optical elements greatly accurately.

Here, the outermost diameter of the image pickup lens unit in a cross section which is orthogonal to the optical axis is defined as a diameter of a cylinder having a center as an optical axis which has the smallest diameter among virtual cylinders including the image pickup lens unit thereinside. For example, if the image pickup lens unit is cut into a cylinder, the outermost diameter is a diameter of the cylinder. If the image pickup lens unit is cut into a polygonal column, the outermost diameter is a diameter of a cylinder which contacts the polygonal column externally.

In the present modified example, the MD is a diameter of the outermost diameter of the image pickup lens unit 145 such as a cylinder which has the smallest diameter around an optical axis among virtual cylinders including the image pickup lens unit 145. Also, the FD is a maximum light beam effective diameter of the image pickup lens unit 145.

In the present modified example, the image pickup lens unit 145 is cut into a square column. In FIG. 7A, a cross section which includes a prismatic ridge line in the optical axis direction which faces the optical axis. Therefore, $D_1$ in the drawing is a diameter of the cylinder which contacts the square column externally such as the above MD. D2 in the drawing is a maximum light beam effective diameter of the lens surface 21a such as the above ED.

Also, according to the present modified example, MD/ED satisfies the condition 13. Therefore, it is possible to set a size of a part to which the light beam is not incident in a rational range. Thus, it is possible to dispose a rational amount of optical elements on the optical array element from a production point of view. As a result, it is possible to increase the production amount of the image pickup lens unit per one cutting portion; therefore, there is an advantage in that it is possible to improve the productivity. Also, it is preferable that the MD/ED should be smaller so as to improve the productivity by increasing the product yield of the image pickup lens unit per one optical element array. Therefore, it is preferable to satisfy a following condition such as 1.0<MD/ED<3.0 (condition 14).

Furthermore, it is preferable to satisfy a following condition such as 1.0<MD/ED<2.0 (condition 15).

Here, the explanation for the fifth modified example was made for a case in which the distance TT is set within a range indicated by the condition 10 by reducing the thickness of the lens 25. More importantly, it should be understood that any optical elements can be manufactured in thin thickness as long as the distance TT satisfies the condition 10.

Also, in the present modified example, the distance TT is equal to the thickness in the cemented part. However, it may be acceptable that the distance TT can be any random distance as long as the distance TT is equal to a total length which can be cut actually. For example, in examples shown in FIGS. 1A and 1B, a cutting section and an cemented section are different each other, and the cutting section is shorter than the cemented section.

Also, in an example shown in FIG. 2, a guide groove 7 is disposed on a cutting line 6, and a thickness in the cutting section is reduced.

Here, in the first embodiment, the explanation was made for a case in which the side surfaces of the optical elements are disposed in arrays on surfaces of a prismatic column having approximate square cross section. However, it should be understood that the present invention is not limited to such a case in which prismatic column surface is used. It is possible to use various shapes according to factors such as production efficiency for the image pickup lens unit and accommodation in the assembly operation and a handling operation.

Figure 8A:
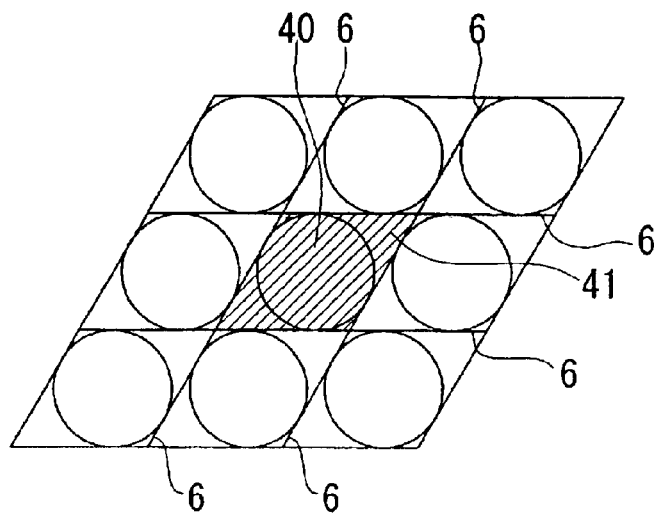
FIGS. 8A to 8C are views for showing cross sections for an optical elements in the first embodiment according to the present invention.
Figure 8B:
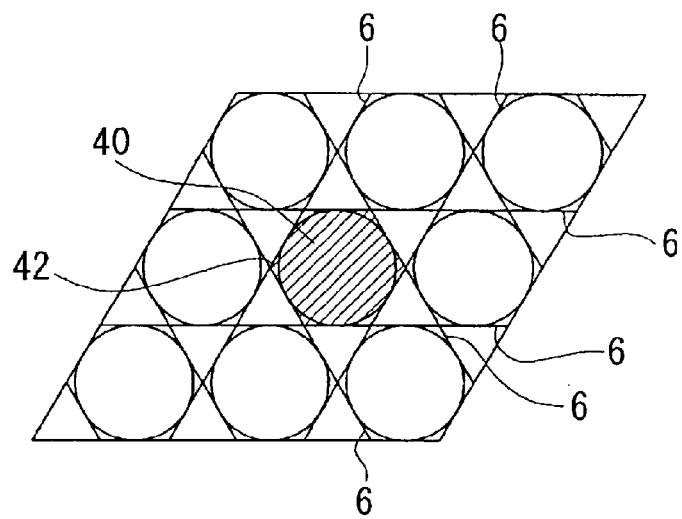

For example, it is easy to cut the optical element under a linear cutting condition in the production process. Therefore, it is possible to reduce the production processes particularly when the optical element array is cut. Thus, it is efficient in the production processes by using the above cutting method. Also, an outer shape of the image pickup lens unit is not necessary to be in a square cross section in the cutting operation. For example, the outer shape of the image pickup lens unit may be in a prismatic diamond cross section as shown in FIG. 8A. In such a case, it is different from a case of a square cross section in that the outer peripheral sections of the optical surface 40 do not contact each other when the optical surfaces 40 are disposed most densely so as to be cut. Therefore, there is an advantage in that it is possible to mold the optical surfaces accurately. Also, in FIG. 8B, an example of a hexagonal cross section is shown. In such a case, there is an advantage in that it is possible to produce a light weight image pickup lens unit because the flange section 41 is small.

Figure 8C:
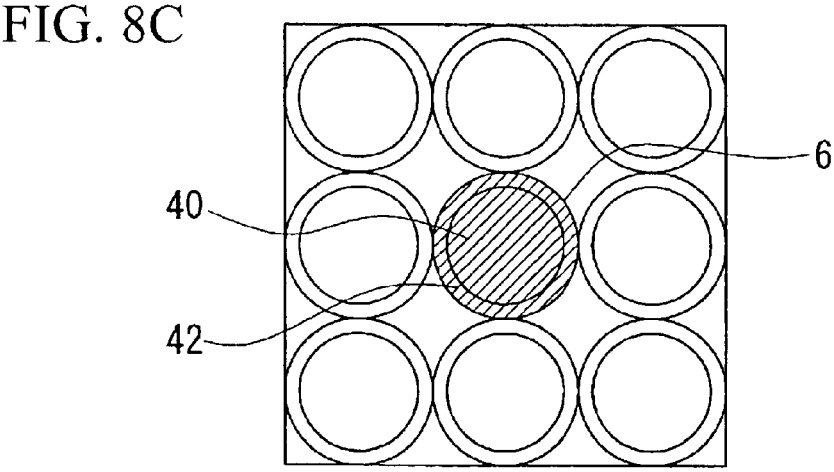

Also, by using a cutting method in which a laser or a water jet are used, it is possible to form a flat surface/curvature surface which expand linearly in an optical axis direction. Therefore, it may be possible to cut in an circular cross section as shown in FIG. 8C. Such an image pickup lens unit which is disposed in arrays in a cylindrical surface can be cemented quite easily when it is used for a reference surface for cementing an array surface because there is no directivity around the optical axis.

Also, the above explanation was made for a case in which the side surfaces of the optical elements are approximately parallel with the optical axis. However, it may be acceptable that the side surfaces of the optical elements are inclined according to the optical axis. For example, it may be acceptable if the inclination occurs because of inaccurate cutting operation. Also, it may be acceptable if the inclination is disposed so as to dispose on a predetermined surface.

Also, the above explanation was made for a case in which the optical elements are provided with the flange side surfaces 1c, 2c, 3c, 4c, 11c, 12c, 13c, 21c, 22c, 24c, 25c, and 152c which are disposed on the flange sections 1d, 2d, 3d, 4d, 11d, 12d, 13d, 21d, 22d, 24d, and 25d for side surfaces. However, it may be acceptable if an edge of the optical element is used for the surface of the optical element.

Also, the above explanation was made for a case in which the side surfaces of the optical elements are disposed to be aligned as a preferable example for production processes. However, it is not necessary that the side surfaces of the optical elements be disposed to be aligned for a purpose of forming an image pickup lens unit in which a mirror cylinder member is simply omitted. This is because the optical elements can be cemented together on surfaces of the optical axis of the flange sections 1d, 2d, 3d, 4d, 11d, 12d, 13d, 21d, 22d, 24d, and 25d.

Also, the above explanation was made by showing an example in which the optical element arrays are disposed under two dimensional arrangement. However, more importantly, it should be understood that the optical element arrays are disposed under one dimensional arrangement.

Also, when the optical elements are manufactured by cutting the optical element arrays, it may be acceptable that a plurality of optical elements are cut in a disposition direction so as to form an image pickup lens unit having a plurality of parallel optical axes. In such a case, it may be acceptable that different kinds of surfaces can be used for a plurality of the optical elements in the disposition direction.

Also, it may be acceptable that the optical elements which form the last surface of the above image pickup lens unit are cemented together with an image pickup element.

By doing this, it is possible to cement the image pickup lens unit with the image pickup element without disposing a complicated cementing structure. As a result, it is possible to reduce the production cost.

Also, a positioning accuracy for the optical elements and the image pickup elements improves.

Also, it may be acceptable that the image pickup elements have edge surfaces which are disposed in the same surface as the side surfaces of the optical elements.

Specific numeral embodiments for the optical systems which can be used for an image pickup lens unit according to the first embodiment of the present invention are explained as follows. Here, following definitions are common in each embodiments. That is, ω indicates a diagonal field angle full. F indicates an effective F number. So indicates an objective distance. IH indicates an image height. It should be understood that values and definitions which are indicated by ST/TD, MT/TD, inclination angle θ, $|\phi/\phi_A|$, TT, MD/ED are the same as explained above.

Also, in TABLES for numeral data later, r indicates a curvature of radius. d indicates an intersurface interval. $n_d$ indicates a refractive index. vd indicates Abbe number. Characters such as $r_i$, $d_i$, $n_i$, $v_i$ (i is an integer) indicate a curvature of radius, an intersurface interval, a refractive index, and Abbe number of $i_{th}$ surface respectively. In drawings showing optical paths, relationship between numeral data and factors such as $r_i$, $d_i$, and $n_i$.

Embodiment 1

Figure 9:
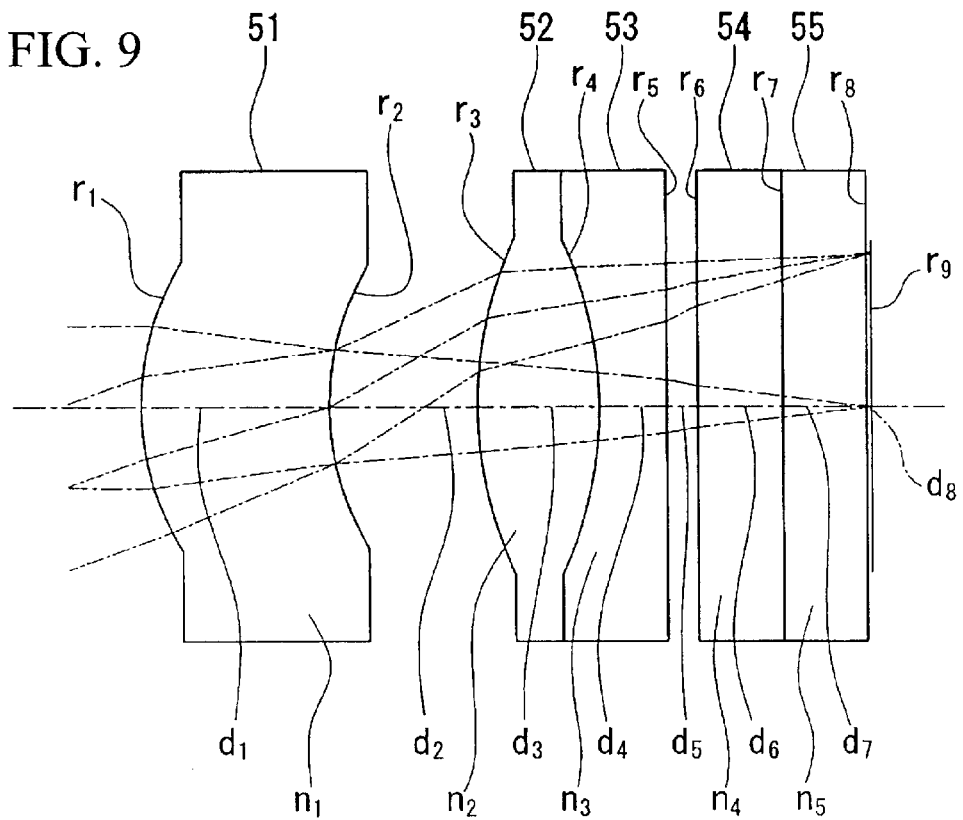
FIG. 9 shows an optical path in a first numeral data embodiment in an image pickup lens unit in the first embodiment according to the present invention.

In FIG. 9, an optical path according to a first numeral embodiment is shown. FIGS. 10A to 10C show aberration according to the present embodiment. FIG. 10A shows spherical aberration which were calculated according to wavelengths such as 656.27 nm, 587.56 nm, 546.07 nm, 486.13 nm, and 435.84 nm under condition that a horizontal axis indicates a spherical aberration (unit: mm) and a vertical axis indicates an aperture ratio. FIG. 10B shows an aberration under condition that a horizontal axis indicates an astigmatism (unit:mm) and a vertical axis indicates a perspective angle (unit:°). ΔM indicates a shift amount of a meridional image surface. ΔS indicates a shift amount of a sagital image surface. FIG. 10C shows an aberration under condition that a horizontal axis indicates a distortion (unit:%) and a vertical axis indicates a perspective angle (unit:°).

The present embodiment is provided with a first lens 51 having a positive power, a second lens 52 having a positive power, a third lens 53 having a negative power, and filter members 54, 55 in such an order from an object toward the image pickup lens unit. An air interval is disposed between the first lens 51 and the second lens 52. An optical surface of the second lens 52 and an optical surface of the third lens 53 are cemented together. Here, an aperture which is not shown in the drawing is formed near an image surface of the first lens 51.

Figure 11A:
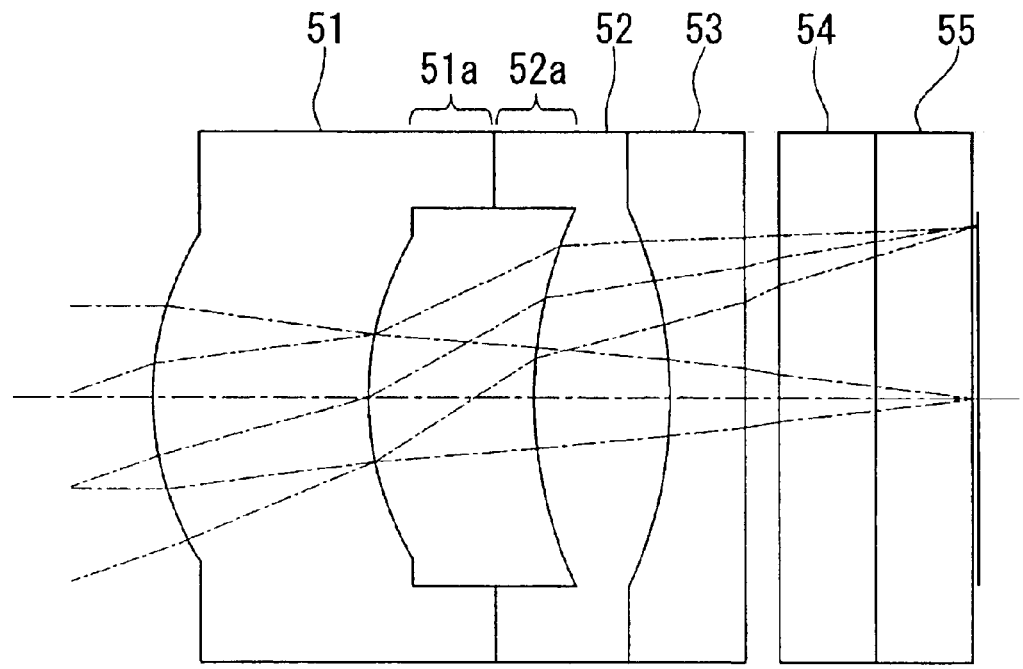
FIGS. 11A and 11B are cross sections for explaining a method for forming an air interval in the first numeral data embodiment in an optical axis direction.
Figure 11B:
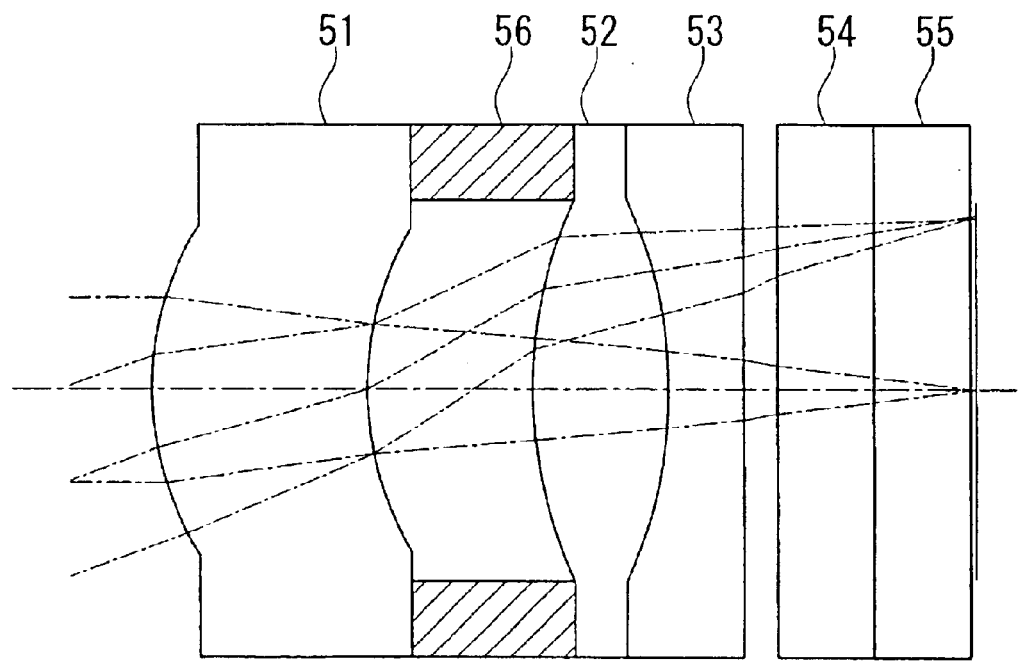

In the air interval between the first lens 51 and the second lens 52, it may be acceptable that positioning protruding sections 51a and 52a are disposed on the first lens 51 and the second lens 52 respectively shown in FIG. 11A so as to be contacted each other. Also, it may be acceptable that a spacer 56 (sandwiching member) is put between the first lens 51 and the second lens 52 as shown in FIG. 11B.

Here, all the air intervals in the rest of the numeral embodiments which are explained later can be formed according to any one of the above structures.

The present embodiment is under condition that a focal distance is under defocused condition such as an objective distance So=960 mm. Diagonal perspective angle ω is 40°. Effective F number is under condition of F2.8. Image height is under condition of IH=0.924 mm.

Also, the rest of the conditions are such that air surfaces are six surfaces, ST/TD=0.42, MT/TD=0.20, inclination angle=33°, and $|\phi/\phi_A|$=0.08. Curvature of image is corrected by disposing an air interval between the first lens 51 and the second lens 52.

| Surface | r | d | $n_d$ | $v_d$ |
|---|---|---|---|---|
| 1 | $r_1$ = 1.64 | $d_1$ = 1.11 | $n_1$ = 1.8061 | $v_1$ = 40.9 |
| 2 | $r_2$ = 1.69 | $d_2$ = 0.87 | | |
| 3 | $r_3$ = 2.38 | $d_3$ = 0.72 | $n_2$ = 1.8061 | $v_2$ = 40.9 |

-continued

| Surface | r | d | $n_d$ | $v_d$ |
|---|---|---|---|---|
| 4 | $r_4$ = −2.38 | $d_4$ = 0.40 | $n_3$ = 1.6889 | $v_3$ = 31.1 |
| 5 | $r_5$ = ∞ | $d_5$ = 0.18 | | |
| 6 | $r_6$ = ∞ | $d_6$ = 0.50 | $n_4$ = 1.5163 | $v_4$ = 64.1 |
| 7 | $r_7$ = ∞ | $d_7$ = 0.50 | $n_5$ = 1.5163 | $v_5$ = 64.1 |
| 8 | $r_8$ = ∞ | $d_8$ = 0.03 | | |
| 9 | $r_9$ = ∞(image surface) | | | |

As understood from FIGS. 10A to 10C, the image pickup lens unit according to the present embodiment has a preferable aberration correction in visible range of rays.

Embodiment 2

Figure 12:
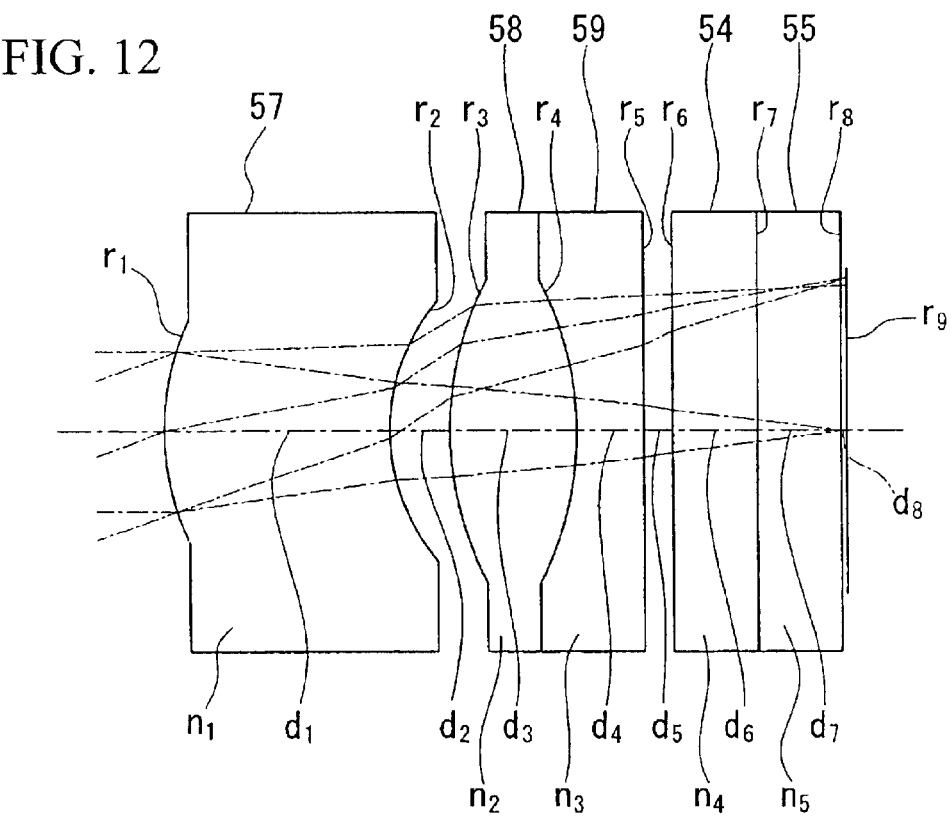
FIG. 12 shows an optical path in a second numeral data embodiment for an image pickup lens unit in the first embodiment according to the present invention.

In FIG. 12, an optical path according to a second numeral embodiment is shown. FIGS. 13A to 13C show aberrations according to the present embodiment. FIGS. 13A to 13C are described under the same condition as in FIGS. 10A to 10C; therefore, explanations for a horizontal axis and a vertical axis are omitted.

The present embodiment is provided with a first lens 57 having a positive power, a second lens 58 having a positive power, a third lens 59 having a negative power, and filter members 54, 55 in such an order from an object toward the image pickup lens unit. An air interval is disposed between the first lens 57 and the second lens 58. An optical surface of the second lens 58 and an optical surface of the third lens 59 are cemented together. Here, an aperture which is not shown in the drawing is formed near an image surface of the first lens 57.

The present embodiment is under condition that a focal distance is under defocused condition such as an objective distance So=960 mm. Diagonal perspective angle ω is 40°. Effective F number is under condition of F2.8. Image height is under condition of IH=0.924 mm.

Also, the rest of the conditions are such that air surfaces are six surfaces, ST/TD=0.14, MT/TD=0.09, inclination angle=37°, and $|\phi/\phi_A|$=0.09. Curvature of image is corrected by disposing an air interval between the first lens 57 and the second lens 58.

| Surface | r | d | $n_d$ | $v_d$ |
|---|---|---|---|---|
| 1 | $r_1$ = 1.54 | $d_1$ = 1.33 | $n_1$ = 1.8061 | $v_1$ = 40.9 |
| 2 | $r_2$ = 1.20 | $d_2$ = 0.35 | | |
| 3 | $r_3$ = 1.96 | $d_3$ = 0.75 | $n_2$ = 1.8061 | $v_2$ = 40.9 |
| 4 | $r_4$ = −1.96 | $d_4$ = 0.40 | $n_3$ = 1.6889 | $v_3$ = 31.1 |
| 5 | $r_5$ = ∞ | $d_5$ = 0.17 | | |
| 6 | $r_6$ = ∞ | $d_6$ = 0.50 | $n_4$ = 1.5163 | $v_4$ = 64.1 |
| 7 | $r_7$ = ∞ | $d_7$ = 0.50 | $n_5$ = 1.5163 | $v_5$ = 64.1 |
| 8 | $r_8$ = ∞ | $d_8$ = 0.03 | | |
| 9 | $r_9$ = ∞(image surface) | | | |

As understood from FIGS. 13A to 13C, the image pickup lens unit according to the present embodiment has a preferable aberration correction in visible range of rays.

Embodiment 3

Figure 14:
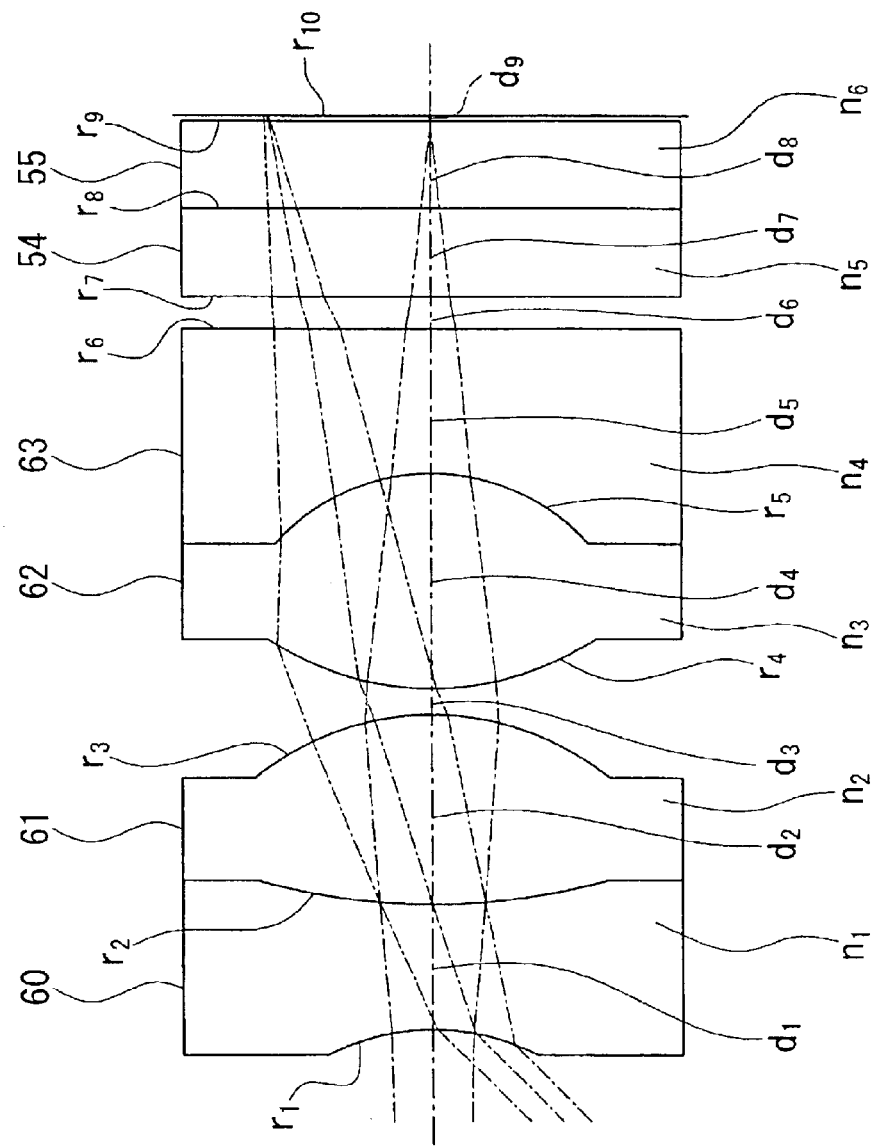
FIG. 14 shows an optical path in a third numeral data embodiment for an image pickup lens unit in the first embodiment according to the present invention.

In FIG. 14, an optical path according to a third numeral embodiment is shown. FIGS. 15A to 15C show aberrations according to the present embodiment. FIGS. 15A to 15C are described under the same condition as in FIGS. 10A to 10C; therefore, explanations for a horizontal axis and a vertical axis are omitted.

The present embodiment is provided with a first lens 60 having a negative power, a second lens 61 having a positive power, a third lens 63 having a positive power, a fourth lens 62 having a negative power, and filter members 54, 55 in such an order from an object toward the image pickup lens unit. An optical surface of the first lens 60 and an optical surface of the second lens 61 are cemented together. Also, an optical surface of the third lens 62 and an optical surface of the fourth lens 63 are cemented together. An air interval is disposed between the second lens 61 and the third lens 62. Here, an aperture which is not shown in the drawing is formed near an image surface of the first lens 65 by performing a vapor deposition.

The present embodiment is under condition that a focal distance is under condition of objective distance: So=10 mm. Diagonal perspective angle ω is 90°. Effective F number is under condition of F 3.0. Image height is under condition of IH=0.924 mm.

Also, the rest of the conditions are such that air surfaces are six surfaces, ST/TD=0.07, MT/TD=0.04, inclination angle=46°, and $|\phi/\phi_A|$=0.07. Curvature of image is corrected by disposing an air interval between the second lens 61 and the third lens 62.

| Surface | r | d | $n_d$ | $v_d$ |
|---|---|---|---|---|
| 1 | $r_1$ = −1.30 | $d_1$ = 0.71 | $n_1$ = 1.6889 | $v_1$ = 31.1 |
| 2 | $r_2$ = 3.75 | $d_2$ = 1.08 | $n_2$ = 1.8061 | $v_2$ = 40.9 |
| 3 | $r_3$ = −1.57 | $d_3$ = 0.15 | | |
| 4 | $r_4$ = 1.67 | $d_4$ = 1.22 | $n_3$ = 1.5831 | $v_3$ = 59.4 |
| 5 | $r_5$ = −1.18 | $d_5$ = 0.81 | $n_4$ = 1.6889 | $v_4$ = 31.1 |
| 6 | $r_6$ = ∞ | $d_6$ = 0.19 | | |
| 7 | $r_7$ = ∞ | $d_7$ = 0.50 | $n_5$ = 1.5163 | $v_5$ = 64.1 |
| 8 | $r_8$ = ∞ | $d_8$ = 0.50 | $n_6$ = 1.5163 | $v_6$ = 64.1 |
| 9 | $r_9$ = ∞ | $d_9$ = 0.03 | | |
| 10 | $r_{10}$ = ∞(Image surface) | | | |

As understood from FIGS. 15A to 15C, the image pickup lens unit according to the present embodiment has a preferable aberration correction in visible range of rays. In particular, it is understood from FIG. 15A that a chromatic aberration is more preferably corrected than in the cases of the first embodiment and the second embodiment because two pairs of cemented lenses are used therein. Furthermore, as shown in FIG. 15B, astigmatism is also quire preferably corrected.

Embodiment 4

Figure 16:
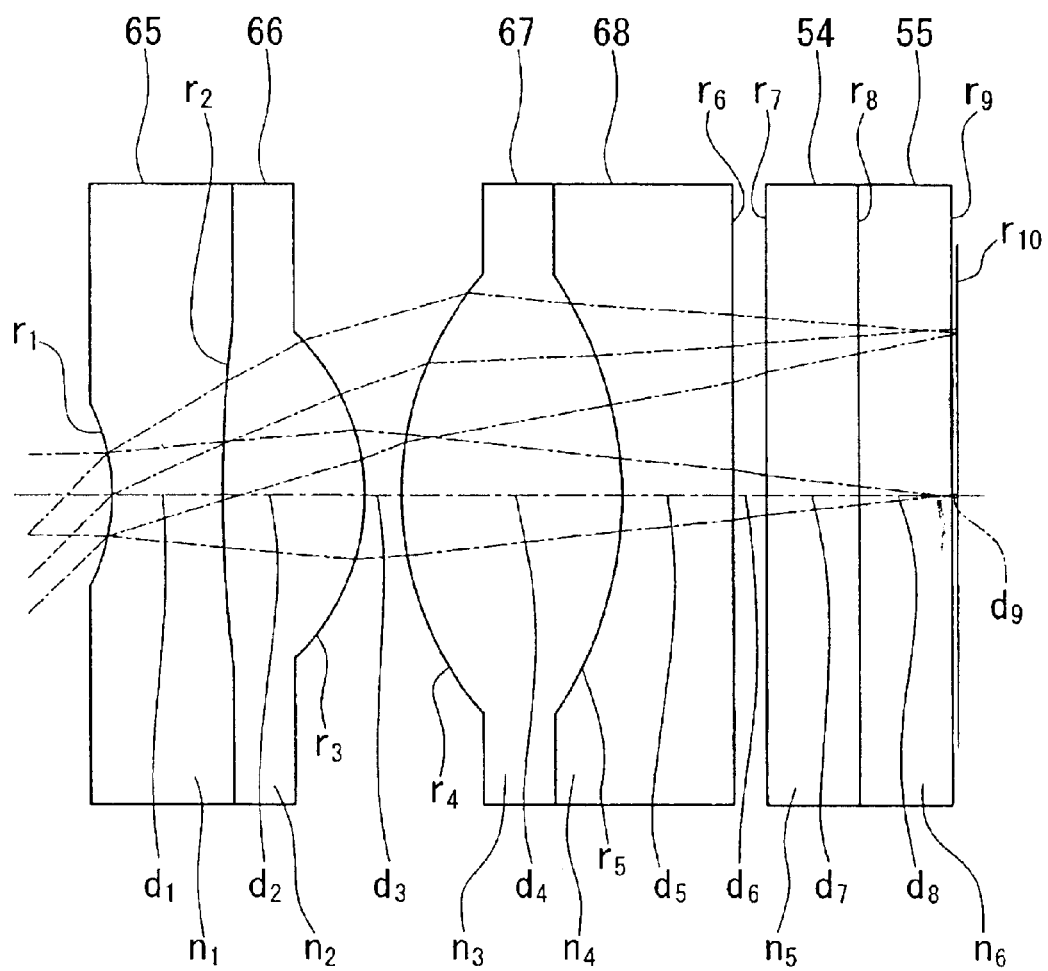
FIG. 16 shows an optical path in a fourth numeral data embodiment for an image pickup lens unit in the first embodiment according to the present invention.
Figure 17:
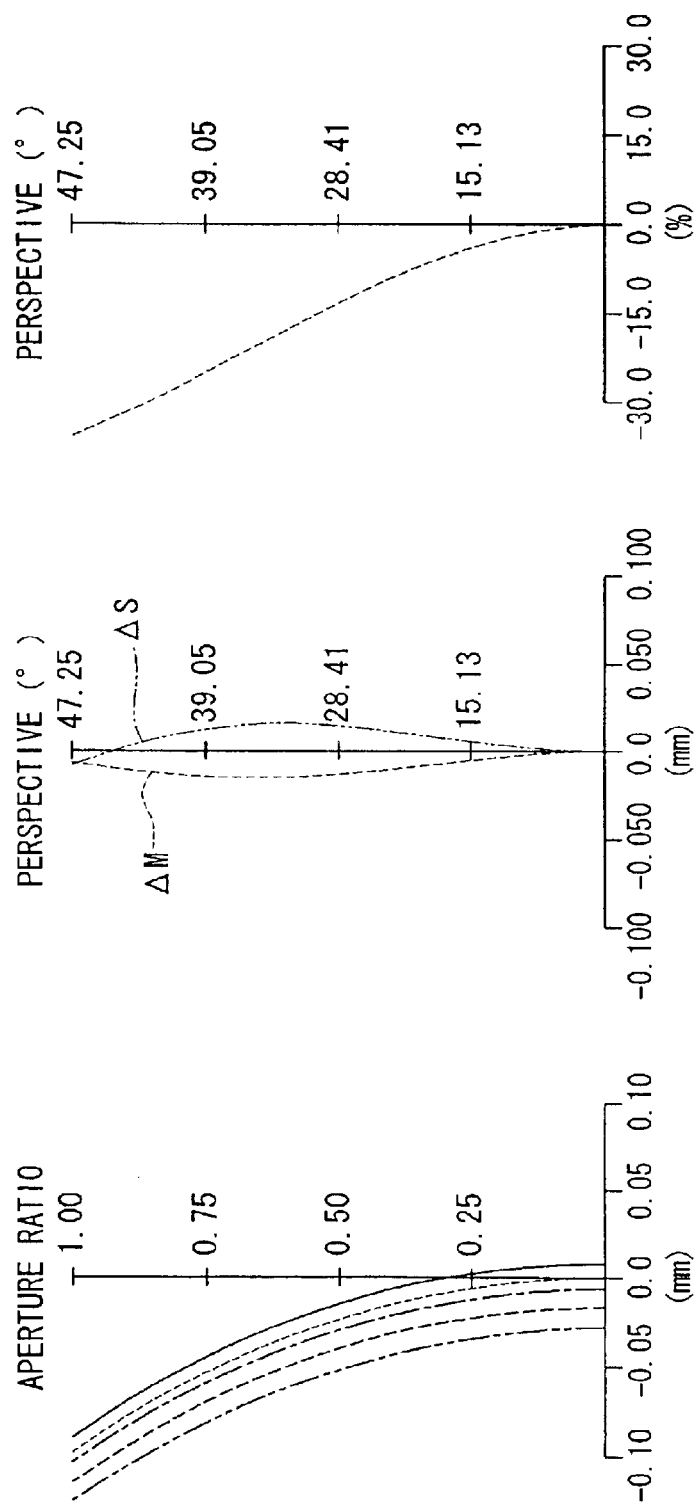
FIGS. 17A to 17C show aberration in a fourth numeral data embodiment.

In FIG. 16, an optical path according to a fourth numeral embodiment is shown. FIGS. 17A to 17C show aberrations according to the present embodiment. FIGS. 17A to 17C are described under the same condition as in FIGS. 10A to 10C; therefore, explanations for a horizontal axis and a vertical axis are omitted.

The present embodiment is provided with a first lens 65 having a negative power, a second lens 66 having a positive power, a third lens 67 having a positive power, a fourth lens 68 having a negative power, and filter members 54, 55 in such an order from an object toward the image pickup lens unit. An optical surface of the first lens 65 and an optical surface of the second lens 66 are cemented together. Also, an optical surface of the third lens 67 and an optical surface of the fourth lens 68 are cemented together. An air interval is disposed between the second lens 66 and the third lens 67. Here, an aperture which is not shown in the drawing is formed on a side surface of the first lens 65 by performing a vapor deposition.

The present embodiment is under condition that a focal distance is under condition of objective distance: So=10 mm. Diagonal perspective angle ω is 90°. Effective F number is under condition of F 3.0. Image height is under condition of IH=0.024 mm.

Also, the rest of the conditions are such that air surfaces are four surfaces, ST/TD=0.09, MT/TD=0.04, inclination angle=45°, and $|\phi/\phi_A|$=0.04. Curvature of image is corrected by disposing an air interval between the second lens 66 and the third lens 67.

| Surface | r | d | $n_d$ | $v_d$ |
|---|---|---|---|---|
| 1 | $r_1$ = −1.11 | $d_1$ = 0.60 | $n_1$ = 1.6889 | $v_1$ = 31.1 |
| 2 | $r_2$ = 7.95 | $d_2$ = 0.77 | $n_2$ = 1.8061 | $v_2$ = 40.9 |
| 3 | $r_3$ = −1.24 | $d_3$ = 0.20 | | |
| 4 | $r_4$ = 1.87 | $d_4$ = 1.19 | $n_3$ = 1.5831 | $v_3$ = 59.4 |
| 5 | $r_5$ = −2.18 | $d_5$ = 0.60 | $n_4$ = 1.6889 | $v_4$ = 31.1 |
| 6 | $r_6$ = ∞ | $d_6$ = 0.18 | | |
| 7 | $r_7$ = ∞ | $d_7$ = 0.50 | $n_5$ = 1.5163 | $v_5$ = 64.1 |
| 8 | $r_8$ = ∞ | $d_8$ = 0.50 | $n_6$ = 1.5163 | $v_6$ = 64.1 |
| 9 | $r_9$ = ∞ | $d_9$ = 0.03 | | |
| 10 | $r_{10}$ = ∞(Image Surface) | | | |

As understood from FIGS. 17A to 17C, the image pickup lens unit according to the present embodiment has a preferable aberration correction in visible range of rays. In particular, it is understood from FIG. 17A that a chromatic aberration is more preferably corrected than in the cases of the first embodiment and the second embodiment because two pairs of cemented lenses are used therein. Furthermore, as shown in FIG. 17B, astigmatism is also quire preferably corrected.

Embodiment 5

Figure 18:
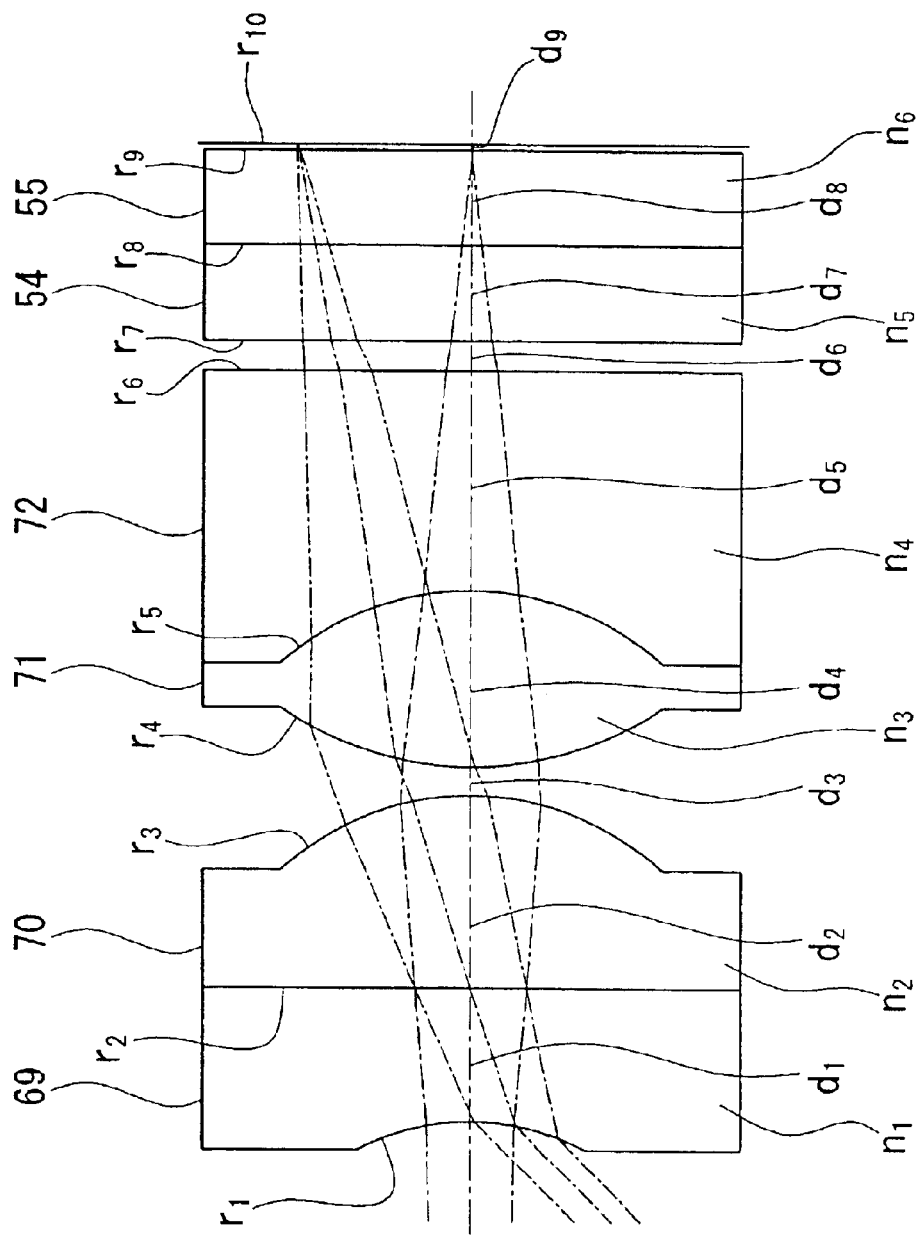
FIG. 18 shows an optical path in a fifth numeral data embodiment for an image pickup lens unit in the first embodiment according to the present invention.

In FIG. 18, an optical path according to a fifth numeral embodiment is shown. FIGS. 19A to 19C show aberrations according to the present embodiment. FIGS. 19A to 19C are described under the same condition as in FIGS. 10A to 10C; therefore, explanations for a horizontal axis and a vertical axis are omitted.

The present embodiment is provided with a first lens 69 having a negative power, a second lens 70 having a positive power, a third lens 71 having a positive power, a fourth lens 72 having a negative power, and filter members 54, 55 in such an order from an object toward the image pickup lens unit. An optical surface of the first lens 69 and an optical surface of the second lens 70 are cemented together. Also, an optical surface of the third lens 71 and an optical surface of the fourth lens 72 are cemented together. An air interval is disposed between the second lens 70 and the third lens 71. Here, an aperture which is not shown in the drawing is formed on an image surface of the first lens 69 by performing a vapor deposition.

The present embodiment is under condition that a focal distance is under condition of objective distance: So=10 mm. Diagonal perspective angle ω is 90°. Effective F number is under condition of F 3.0. Image height is under condition of IH=0.924 mm.

Also, the rest of the conditions are such that air surfaces are six surfaces, ST/TD=0.07, MT/TD=0.03, inclination angle=41°, and $|\phi/\phi_A|$=0.06. Curvature of image is corrected by disposing an air interval between the second lens 70 and the third lens 71.

| Surface | r | d | $n_d$ | $v_d$ |
|---|---|---|---|---|
| 1 | $r_1$ = −1.32 | $d_1$ = 0.70 | $n_1$ = 1.6889 | $v_1$ = 31.1 |
| 2 | $r_2$ = ∞ | $d_2$ = 1.02 | $n_2$ = 1.8061 | $v_2$ = 40.9 |
| 3 | $r_3$ = −1.46 | $d_3$ = 0.15 | | |
| 4 | $r_4$ = 1.74 | $d_4$ = 0.93 | $n_3$ = 1.5831 | $v_3$ = 59.4 |
| 5 | $r_5$ = −1.50 | $d_5$ = 1.15 | $n_4$ = 1.6889 | $v_4$ = 31.1 |
| 6 | $r_6$ = ∞ | $d_6$ = 0.16 | | |
| 7 | $r_7$ = ∞ | $d_7$ = 0.50 | $n_5$ = 1.5163 | $v_5$ = 64.1 |

-continued

| Surface | r | d | $n_d$ | $v_d$ |
|---|---|---|---|---|
| 8 | $r_8 = \infty$ | $d_8 = 0.50$ | $n_6 = 1.5163$ | $v_6 = 64.1$ |
| 9 | $r_9 = \infty$ | $d_9 = 0.03$ | | |
| 10 | $r_{10} = \infty$(Image Surface) | | | |

As understood from FIGS. 19A to 19C, the image pickup lens unit according to the present embodiment has a preferable aberration correction in visible range of rays. In particular, it is understood from FIG. 19A that a chromatic aberration is more preferably corrected than in the cases of the first embodiment and the second embodiment because two pairs of cemented lenses are used therein. Furthermore, as shown in FIG. 19B, astigmatism is also quire preferably corrected.

Embodiment 6

Figure 20:
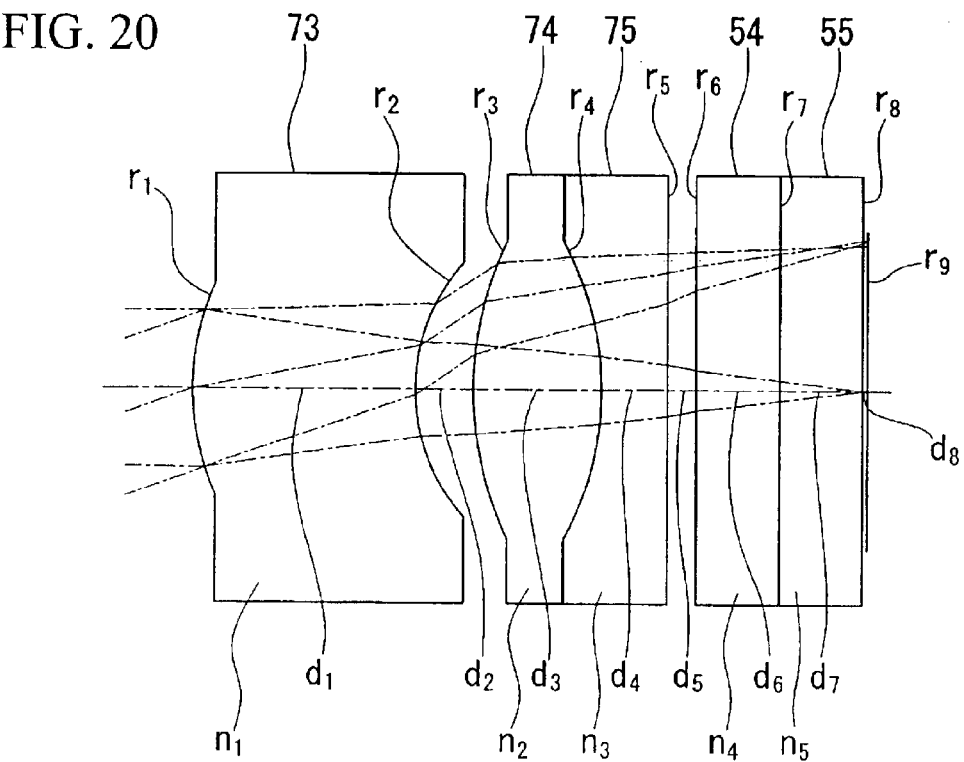
FIG. 20 shows an optical path in a sixth numeral data embodiment for an image pickup lens unit in the first embodiment according to the present invention.

In FIG. 20, an optical path according to a sixth numeral embodiment is shown. FIGS. 21A to 21C show aberrations according to the present embodiment. FIGS. 21A to 21C are described under the same condition as in FIGS. 10A to 10C; therefore, explanations for a horizontal axis and a vertical axis are omitted.

The present embodiment is provided with a first lens 73 having a positive power, a second lens 74 having a positive power, a third lens 75 having a negative power, and filter members 54, 55 in such an order from an object toward the image pickup lens unit. An optical surface of the second lens 74 and an optical surface of the third lens 75 are cemented together. An air interval is disposed between the first lens 73 and the second lens 75. Here, an aperture which is not shown in the drawing is formed on a side surface of the first lens 73 by performing a vapor deposition.

In the present embodiment, a polycarbonate resin member is used for the third lens 75.

The present embodiment is under condition that a focal distance is under defocused condition such as an objective distance So=960 mm. Diagonal perspective angle ω is 40°. Effective F number is under condition of F2.8. Image height is under condition of IH=0.924 mm.

Also, the rest of the conditions are such that air surfaces are six surfaces, ST/TD=0.14, MT/TD=0.09, inclination angle=38°, and $|\phi/\phi_A|$=0.20. Curvature of image is corrected by disposing an air interval between the first lens 73 and the second lens 74.

| Surface | r | d | $n_d$ | $v_d$ |
|---|---|---|---|---|
| 1 | $r_1 = 1.53$ | $d_1 = 1.340$ | $n_1 = 1.8061$ | $v_1 = 40.9$ |
| 2 | $r_2 = 1.15$ | $d_2 = 0.35$ | | |
| 3 | $r_3 = 2.07$ | $d_3 = 0.77$ | $n_2 = 1.8061$ | $v_2 = 40.9$ |
| 4 | $r_4 = -1.88$ | $d_4 = 0.40$ | $n_3 = 1.5839$ | $v_3 = 30.2$ |
| 5 | $r_5 = \infty$ | $d_5 = 0.17$ | | |
| 6 | $r_6 = \infty$ | $d_6 = 0.50$ | $n_4 = 1.5163$ | $v_4 = 64.1$ |
| 7 | $r_7 = \infty$ | $d_7 = 0.50$ | $n_5 = 1.5163$ | $v_5 = 64.1$ |
| 8 | $r_8 = \infty$ | $d_8 = 0.03$ | | |
| 9 | $r_9 = \infty$(Image Surface) | | | |

As understood from FIGS. 21A to 21C, the image pickup lens unit according to the present embodiment has a preferable aberration correction in visible range of rays even though a lens made of a synthetic resin member such as a polycarbonate member having relatively a small refractive index is used. As explained above, according to the present embodiment, it is possible to produce a lens in a low cost by using a lens made of a polycarbonate member as a synthetic resin. Therefore, there is an advantage in that it is possible to manufacture an image pickup lens unit in low cost. Also, there is an advantage in that it is possible to dispose a positioning protruding section for forming an air interval easily by using a synthetic resin mold.

Embodiment 7

Figure 22:
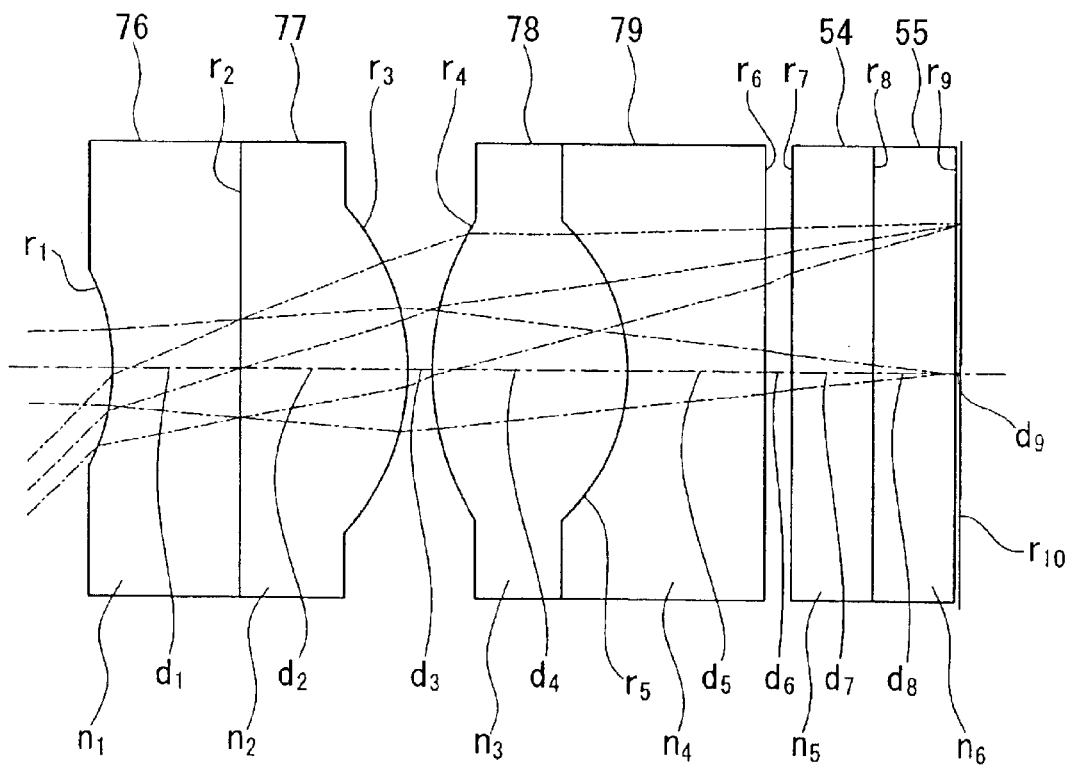
FIG. 22 shows an optical path in a seventh numeral data embodiment for an image pickup lens unit in the first embodiment according to the present invention.

In FIG. 22, an optical path according to a seventh numeral embodiment is shown. FIGS. 23A to 23C show aberrations according to the present embodiment. FIGS. 23A to 23C are described under the same condition as in FIGS. 10A to 10C; therefore, explanations for a horizontal axis and a vertical axis are omitted.

The present embodiment is provided with a first lens 76 having a negative power, a second lens 77 having a positive power, a third lens 78 having a positive power, a fourth lens 79 having a negative power, and filter members 54, 55 in such an order from an object toward the image pickup lens unit. An optical surface of the first lens 76 and an optical surface of the second lens 77 are cemented together. Also, an optical surface of the third lens 78 and an optical surface of the fourth lens 79 are cemented together. An air interval is disposed between the second lens 77 and the third lens 78. Here, an aperture which is not shown in the drawing is formed on an image surface of the first lens 76 by performing a vapor deposition.

In the present embodiment, a synthetic resin member such as a ZEONEX (registered Trademark) is used for the third lens 78. Also, a polycarbonate resin member is used for the fourth lens 79.

The present embodiment is under condition that a focal distance is under condition of objective distance: So=10 mm. Diagonal perspective angle ω is 90°. Effective F number is under condition of F 3.0. Image height is under condition of IH=0.924 mm.

Also, the rest of the conditions are such that air surfaces are six surfaces, ST/TD=0.07, MT/TD=0.03, inclination angle=46°, and $|\phi/\phi_A|$=0.20. Curvature of image is corrected by disposing an air interval between the second lens 77 and the third lens 78.

| Surface | r | d | $n_d$ | $v_d$ |
|---|---|---|---|---|
| 1 | $r_1 = -1.35$ | $d_1 = 0.78$ | $n_1 = 1.6889$ | $v_1 = 31.1$ |
| 2 | $r_2 = \infty$ | $d_2 = 1.02$ | $n_2 = 1.8061$ | $v_2 = 40.9$ |
| 3 | $r_3 = -1.49$ | $d_3 = 0.15$ | | |
| 4 | $r_4 = 1.72$ | $d_4 = 1.19$ | $n_3 = 1.5254$ | $v_3 = 56.2$ |
| 5 | $r_5 = -1.24$ | $d_5 = 0.85$ | $n_4 = 1.5839$ | $v_4 = 30.2$ |
| 6 | $r_6 = \infty$ | $d_6 = 0.16$ | | |
| 7 | $r_4 = \infty$ | $d_7 = 0.50$ | $n_5 = 1.5163$ | $v_5 = 64.1$ |
| 8 | $r_8 = \infty$ | $d_8 = 0.50$ | $n_6 = 1.5163$ | $v_6 = 64.1$ |
| 9 | $r_9 = \infty$ | $d_9 = 0.03$ | | |
| 10 | $r_{10} = \infty$(Image Surface) | | | |

As understood from FIGS. 23A to 23C, the image pickup lens unit according to the present embodiment has a preferable aberration correction in visible range of rays even though two pairs of lens made of a synthetic resin member having relatively a small refractive index are used. In particular, according to FIG. 23A, it is understood that the chromatic aberration is more preferably corrected than in cases of the first embodiment and the second embodiment because two pairs of cemented lenses are used.

According to the present embodiment, there is an advantage in that it is possible to manufacture an image pickup lens unit in low cost because two lenses are made of synthetic resin member which are low cost among four lenses.

Embodiment 8

Figure 24:
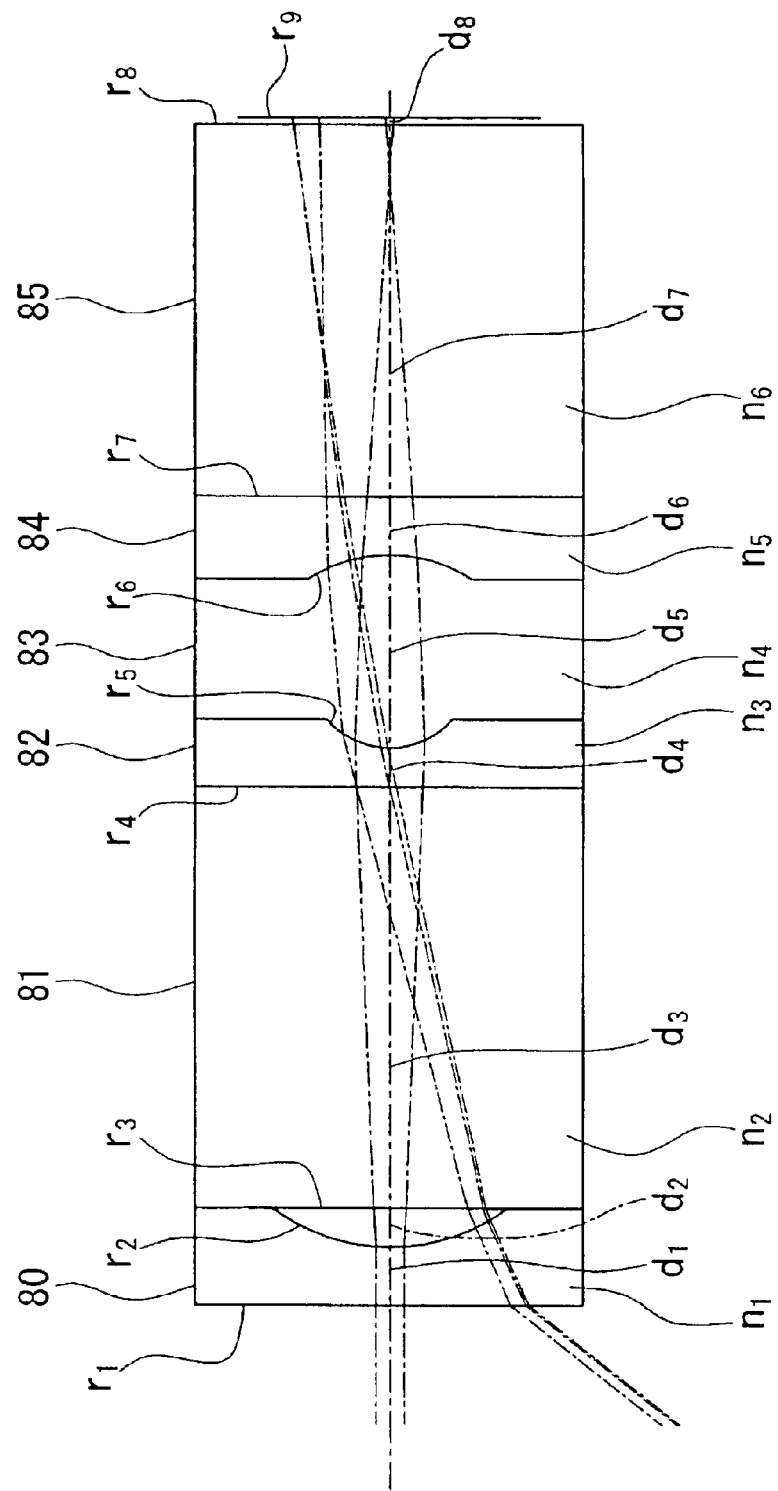
FIG. 24 shows an optical path in an eighth numeral data embodiment for an image pickup lens unit in the first embodiment according to the present invention.

In FIG. 24, an optical path according to an eighth numeral embodiment is shown. FIGS. 25A to 25C show aberrations according to the present embodiment. FIGS. 25A to 25C are described under the same condition as in FIGS. 10A to 10C; therefore, explanations for a horizontal axis and a vertical axis are omitted. In the present embodiment, the data per each wavelength does not disperse so wide that FIG. 25A shows results only for wavelengths such as 656.27 nm, 587.56 nm, and 486.13 nm.

The present embodiment is provided with a first lens 80 having a negative power, a parallel flat board 81, a second lens 82 having a negative power, a third lens 83 having a positive power, a fourth lens 84 having a negative power, and a fifth lens 85 having a positive power in such an order from an object toward the image pickup lens unit. An optical surface of the second lens 82 and an optical surface of the third lens 83 are cemented together. Also, an optical surface of the fourth lens 84 and an optical surface of the fifth lens 85 are cemented together. An air interval is disposed between a concave surface ($r_2$) of the first lens 80 and an a side surface ($r_3$) of the parallel flat board 81 toward an object. Here, an aperture which is not shown in the drawing is formed on a side surface of an image surface of the parallel flat board 81 by performing a vapor deposition.

The present embodiment is under condition that a focal distance is under condition of objective distance: So=∞. Diagonal perspective angle ω is 103°. Effective F number is under condition of F 4.3. Image height is under condition of IH=0.5 mm.

Also, the rest of the conditions are such that air surfaces are four surfaces, ST/TD=0.04, MT/TD=0.03, inclination angle=45°, and $|\phi/\phi_A|$=0.23. Curvature of image is corrected by disposing an air interval between the first lens 80 and the flat parallel board 81.

| Surface | r | d | $n_d$ | $v_d$ |
|---|---|---|---|---|
| 1 | $r_1 = \infty$ | $d_1 = 0.30$ | $n_1 = 1.8830$ | $v_1 = 40.7$ |
| 2 | $r_2 = 1.02$ | $d_2 = 0.20$ | | |
| 3 | $r_3 = \infty$ | $d_3 = 2.20$ | $n_2 = 1.5927$ | $v_2 = 35.3$ |
| 4 | $r_4 = \infty$ | $d_4 = 0.20$ | $n_3 = 1.5927$ | $v_3 = 35.3$ |
| 5 | $r_5 = 0.42$ | $d_5 = 1.00$ | $n_4 = 1.8830$ | $v_4 = 40.7$ |
| 6 | $r_6 = -0.76$ | $d_6 = 0.30$ | $n_5 = 1.5927$ | $v_5 = 35.3$ |
| 7 | $r_7 = 57.74$ | $d_7 = 1.93$ | $n_6 = 1.8830$ | $v_6 = 40.7$ |
| 8 | $r_8 = \infty$ | $d_8 = 0.03$ | | |
| 9 | $r_9 = \infty$(Image Surface) | | | |

As understood from FIGS. 25A to 25C, the image pickup lens unit according to the present embodiment has a preferable aberration correction in visible range of rays.

In the present embodiment, an air lens is formed by disposing an air interval between the first lens 80 having a power and the parallel flat board 81 not having a power.

Embodiment 9

Figure 26:
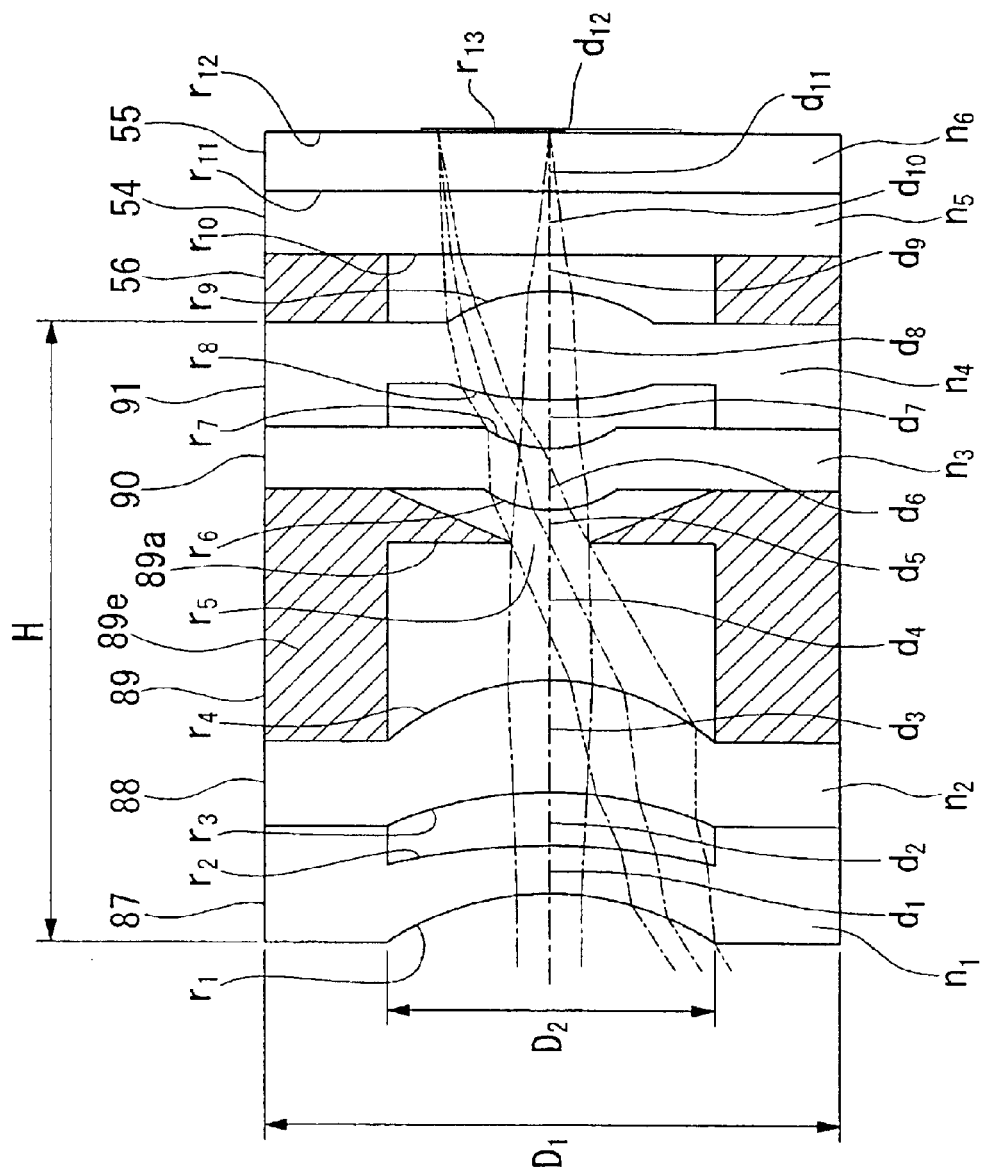
FIG. 26 shows an optical path in a ninth numeral data embodiment for an image pickup lens unit in the first embodiment according to the present invention.

In FIG. 26, an optical path according to a ninth numeral embodiment is shown. FIGS. 27A to 27C show aberrations according to the present embodiment. FIGS. 27A to 27C are described under the same condition as in FIGS. 10A to 10C; therefore, explanations for a horizontal axis and a vertical axis are omitted. Also, amounts which are indicated by H, $D_1$, and $D_2$ are the same as those shown in FIGS. 7A to 7C.

The present embodiment is provided with a first lens 87 having a negative power, a second lens 88 having a positive power, an aperture 89 (sandwiching member), a third lens 90 having a positive power, a fourth lens 91 having a positive power, a spacer 56, and filter members 54, 55. The lenses from the first lens 87 to the fourth lens 91 are cemented together according to the above order of which optical axes must be aligned. The cemented lenses are cut into a prismatic column having a square cross section in the production process.

Positioning protruding sections 87e and 91e are disposed on the first lens 87 and the fourth lens 91. An air interval is formed between the second lens 88 and the third lens 90.

The aperture 89 is provided with a positioning protruding section 89e. The aperture 89 forms a predetermined air interval among the optical elements. The aperture 89 is provided with an aperture section 89a having a light-shielding characteristics in a middle in the optical axis direction. In the present embodiment, an air interval is formed between the second lens 88 and the fourth lens 91, and the aperture section 89a is disposed in the middle of the air interval. The aperture 89 can be manufactured by, for example, performing a molding operation by using a synthetic resin.

The spacer 56 forms an air interval between the fourth lens 91 and the filter member 54.

The present embodiment is under condition that a focal distance is under defocused condition such as objective distance: So=260 mm. Focal distance f is under condition of f=1.47 mm. Diagonal perspective angle ω is 66°. Effective F number is under condition of F 2.8. Image height is under condition of IH=0.924 mm.

Also, the rest of the conditions are such as H=TT=5.14 mm, $D_1$=4.62, and $D_2$=2.62 mm. Therefore, a relationship such as MD/ED=$D_1$/$D_2$=1.76 is effective.

Also, an aspherical surface is a rotationally symmetric aspherical surface which can be defined by a following formula.

$$Z=(y^2/R)/(1+\{1-(1+k)y2/R^2\}^{1/2})+ay^4+by^6+cy^8+dy^{10}+cy^8+dy^{10}+ \quad \text{(Formula 16)}$$

Here, the above formula 16 is effective under condition that Z is an optical axis (axial) in which a progressing direction of a light is a positive direction, and y is in a direction orthogonal to the optical axis. Here, R indicates a paraaxial curvature of radius. A character k indicates a cone constant. Characters a, b, c, d, . . . indicate a fourth dimensional aspherical coefficient, a sixth dimensional aspherical coefficient, an eighth dimensional aspherical coefficient, and a tenth dimensional aspherical coefficient. In the above formula 16, the Z axis becomes an axis for the rotationally symmetrical aspherical surface. Hereinafter, it should be understood that an item regarding the aspherical surface showing no data indicates 0 (zero).

| Surface | r | d | $n_d$ | $v_d$ |
|---|---|---|---|---|
| 1 | $r_1 = -2.30$ | $d_1 = 0.40$ | $n_1 = 1.5256$ | $v_1 = 56.4$ |
| 2 | Aspherical surface [1] | $d_2 = 0.44$ | | |
| 3 | $r_3 = -3.00$ | $d_3 = 0.93$ | $n_2 = 1.5727$ | $v_2 = 33.5$ |
| 4 | Aspherical Surface[2] | $d_4 = 1.14$ | | |
| 5 | Aperture Surface | $d_5 = 0.30$ | | |
| 6 | $r_6 = 1.11$ | $d_6 = 0.48$ | $n_3 = 1.5256$ | $v_3 = 56.4$ |
| 7 | $r_7 = 0.98$ | $d_7 = 0.40$ | | |
| 8 | $r_8 = 2.58$ | $d_8 = 0.91$ | $n_4 = 1.5256$ | $v_4 = 56.4$ |
| 9 | Aspherical Surface[3] | $d_9 = 0.30$ | | |
| 10 | $r_{10} = \infty$ | $d_{10} = 0.50$ | $n_5 = 1.5163$ | $v_5 = 64.1$ |
| 11 | $r_{11} = \infty$ | $d_{11} = 0.50$ | $n_6 = 1.5163$ | $v_6 = 64.1$ |

-continued

| Surface | r | d | $n_d$ | $v_d$ |
|---|---|---|---|---|
| 12 | $r_{12} = \infty$ | $d_{12} = 0.03$ | | |
| 13 | $r_{13} = \infty$(Image Surface) | | | |

Aspherical Surface [1]

Curvature of Radius −8.00
k 0
a −2.14585 × 10⁻²

Aspherical Surface [2]

Curvature of Radius −1.53
k −1.6295
a −2.4759 × 10⁻³−  b 1.2802 × 10⁻³

Aspherical Surface [3]

Curvature of Radius −1.07
k −2.2926 × 10⁻¹
a 2.2341 × 10⁻¹  b 1.5727 × 10⁻²

As understood from FIGS. 27A to 27C, the image pickup lens unit according to the present embodiment has a preferable aberration correction in visible range of rays.

In the present embodiment, TT and MD/ED satisfy the formulae 13 and 15 respectively. As a result, the image pickup lens unit according to the present embodiment has an advantage in that the cutting operation is efficient.

Embodiment 10

Figure 28:
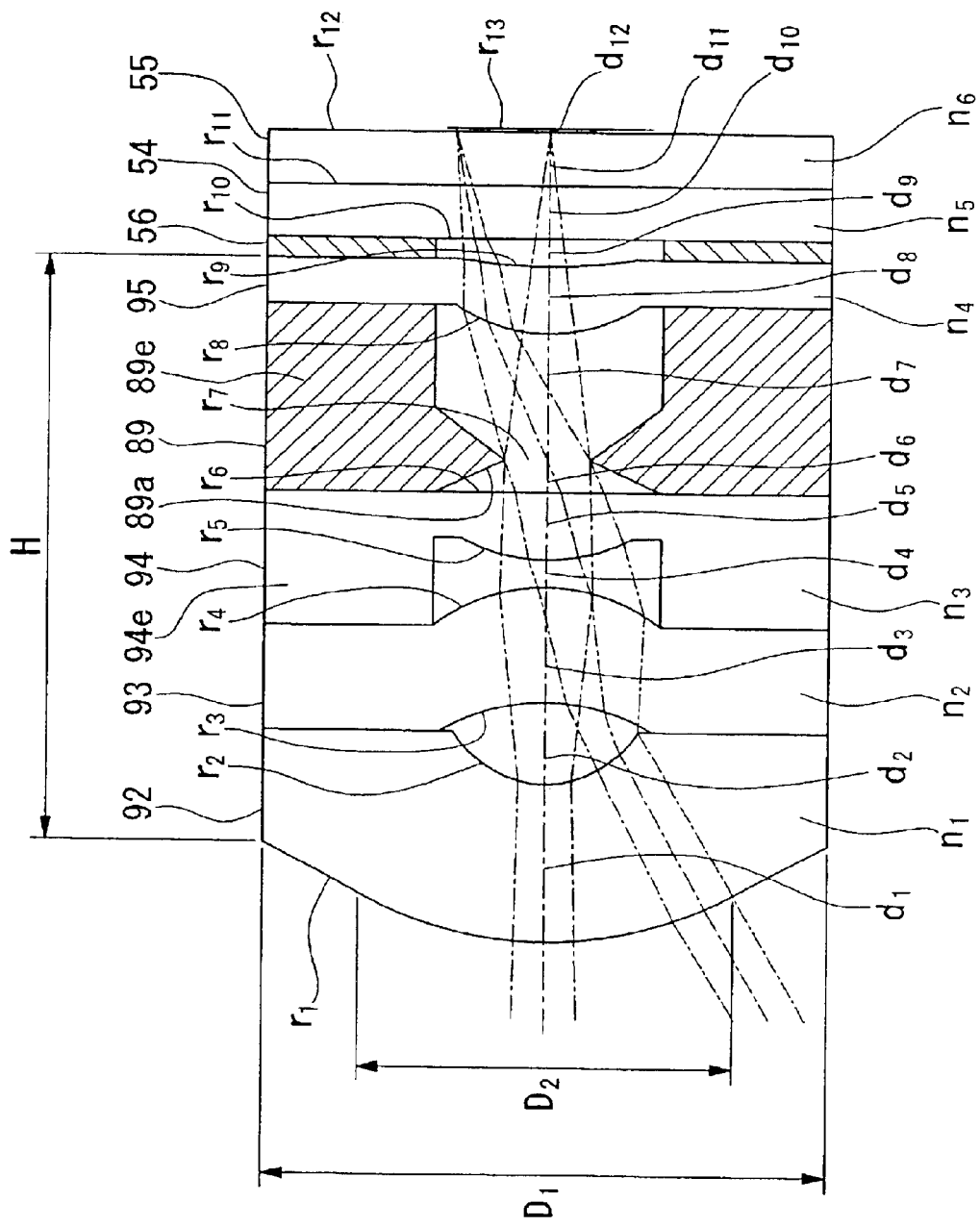
FIG. 28 shows an optical path in a tenth numeral data embodiment for an image pickup lens unit in the first embodiment according to the present invention.
Figure 29:
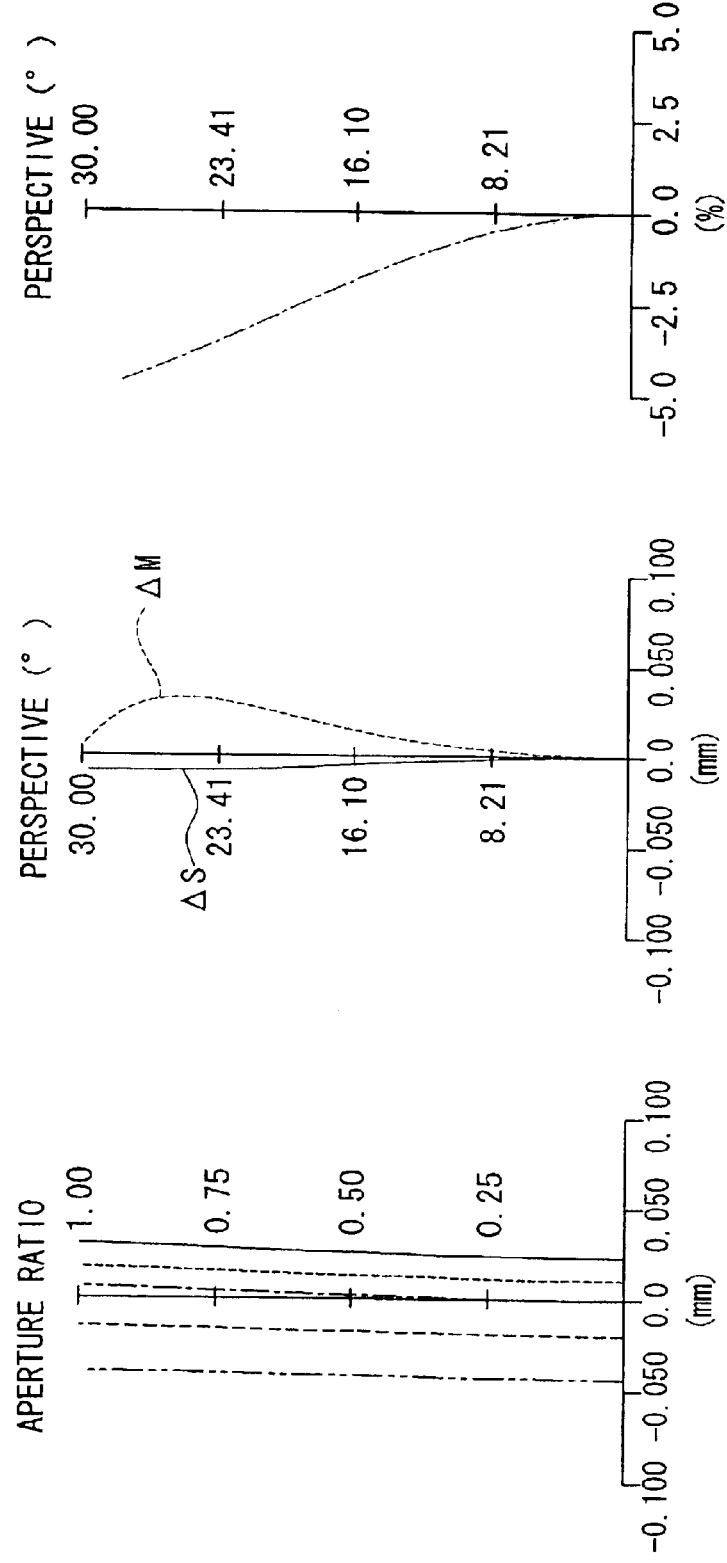
FIGS. 29A to 29C show aberration in a tenth numeral data embodiment.

In FIG. 28, an optical path according to a tenth numeral embodiment is shown. FIGS. 29A to 29C show aberrations according to the present embodiment. FIGS. 29A to 29C are described under the same condition as in FIGS. 10A to 10C; therefore, explanations for a horizontal axis and a vertical axis are omitted. Also, amounts which are indicated by H, $D_1$, and $D_2$ are the same as those shown in FIGS. 7A to 7C.

The present embodiment is provided with a first lens 92 having a negative power, a second lens 93 having a positive power, a third lens 94 having a positive power, an aperture 89, a fourth lens 95 having a positive power, a spacer 56, and filter members 54, 55 in such an order from an object toward the image pickup lens unit. The lenses from the first lens 92 to the fourth lens 95 are cemented together according to the above order of which optical axes must be aligned. The cemented lenses are cut into a prismatic column having a square cross section in the production process.

Positioning protruding section 94e is disposed on the third lens 94. An air interval is formed between the second lens 93 and the third lens 94.

The aperture 89 forms an air interval between the third lens 94 and the fourth lens 95. An aperture section 89a is disposed in the middle of the third lens 94 and the fourth lens 95.

The spacer 56 forms an air interval between the fourth lens 95 and the filter member 54.

The present embodiment is under condition that a focal distance is under defocused condition such as objective distance: So=340 mm. Focal distance f is under condition of f=1.67 mm. Diagonal perspective angle ω is 60°. Effective F number is under condition of F 2.8. Image height is under condition of IH=0.924 mm. Also, the rest of the conditions are such as H=TT=5.80 mm, $D_1$=5.42 mm, and D2=3.62 mm. Therefore, a relationship such as MD/ED=1.50 is effective. Here, following formulae for aspherical surface is the same as indicated in the formula 16 according to the ninth embodiment.

| Surface | r | d | $n_d$ | $v_d$ |
|---|---|---|---|---|
| 1 | $r_1 = 3.80$ | $d_1 = 1.57$ | $n_1 = 1.5256$ | $v_1 = 56.4$ |
| 2 | $r_2 = 1.04$ | $d_2 = 0.81$ | | |
| 3 | $r_3 = -2.06$ | $d_3 = 1.13$ | $n_2 = 1.5256$ | $v_2 = 56.4$ |
| 4 | $r_4 = -1.76$ | $d_4 = 0.30$ | | |
| 5 | $r_5 = 1.75$ | $d_5 = 0.66$ | $n_3 = 1.5256$ | $v_3 = 56.4$ |
| 6 | $r_6 = 132.28$ | $d_6 = 0.30$ | | |
| 7 | Aperture Surface | $d_7 = 1.27$ | | |
| 8 | Aspherical Surface[1] | $d_8 = 0.64$ | $n_4 = 1.5256$ | $v_4 = 56.4$ |
| 9 | $r_9 = 3.88$ | $d_9 = 0.30$ | | |
| 10 | $r_{10} = \infty$ | $d_{10} = 0.50$ | $n_5 = 1.5163$ | $v_5 = 64.1$ |
| 11 | $r_{11} = \infty$ | $d_{11} = 0.50$ | $n_6 = 1.5163$ | $v_6 = 64.1$ |
| 12 | $r_{12} = \infty$ | $d_{12} = 0.03$ | | |
| 13 | $r_{13} = \infty$(Image Surface) | | | |

Aspherical Surface [1]

Curvature of Radius 1.37
k 0
a −1.0771 × 10⁻¹

As understood from FIGS. 29A to 29C, the image pickup lens unit according to the present embodiment has a preferable aberration correction in visible range of rays.

In the present embodiment, TT and MD/ED satisfy the formulae 13 and 15 respectively. As a result, the image pickup lens unit according to the present embodiment has an advantage in that the cutting operation is efficient.

Embodiment 11

Figure 30:
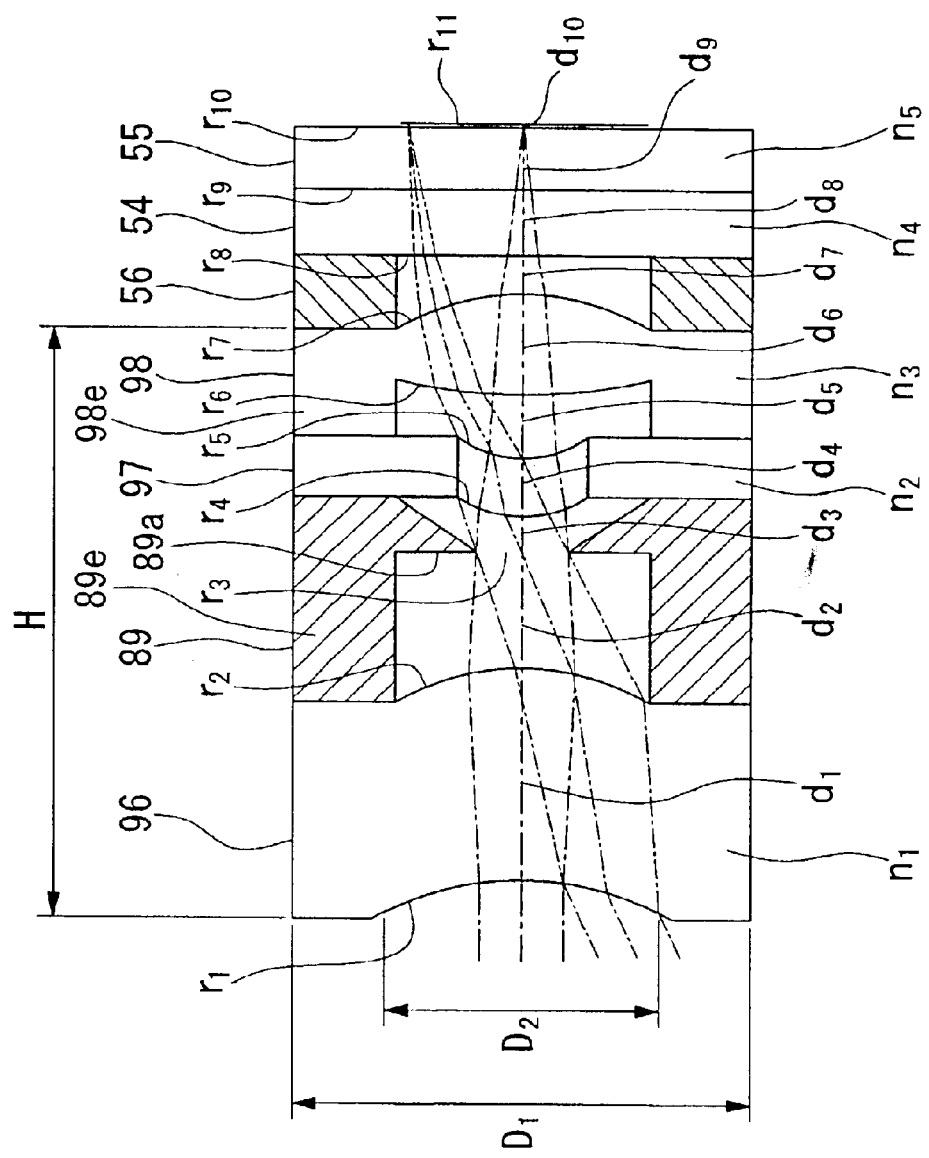
FIG. 30 shows an optical path in an eleventh numeral data embodiment for an image pickup lens unit in the first embodiment according to the resent invention.
Figure 31:
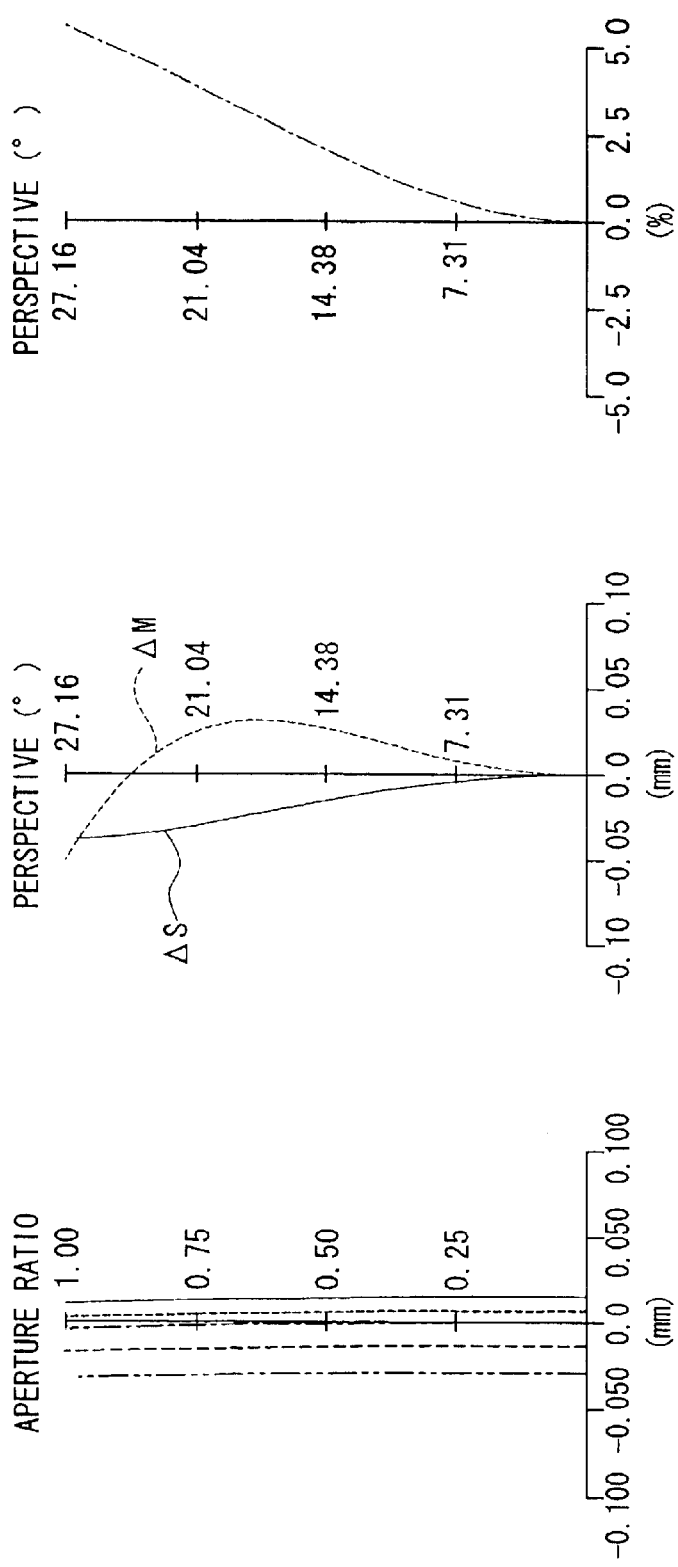
FIGS. 31A to 31C show aberration in an eleventh numeral data embodiment.

In FIG. 30, an optical path according to an eleventh numeral embodiment is shown. FIGS. 31A to 31C show aberrations according to the present embodiment. FIGS. 31A to 31C are described under the same condition as in FIGS. 10A to 10C; therefore, explanations for a horizontal axis and a vertical axis are omitted. Also, amounts which are indicated by H, $D_1$, and $D_2$ are the same as those shown in FIGS. 7A to 7C.

The present embodiment is provided with a first lens 96 having a negative power, an aperture 89, a second lens 97 having a positive power, a third lens 98 having a positive power, a spacer 56, and filter members 54, 55 in such an order from an object toward the image pickup lens unit. The lenses from the first lens 96 to the third lens 98 are cemented together according to the above order of which optical axes must be aligned. The cemented lenses are cut into a prismatic column having a square cross section in the production process.

The aperture 89 forms an air interval between the first lens 96 and the second lens 97. An aperture section 89a is disposed in the middle of the first lens 96 and the second lens 97.

A positioning protruding section 98e is disposed on the third lens 98. An air interval is formed between the second lens 97 and the third-lens 98.

The spacer 56 forms an air interval between the third lens 98 and the filter member 54.

The present embodiment is under condition that a focal distance is under defocused condition such as objective distance: So=440 mm. Focal distance f is under condition of f=1.88 mm. Diagonal perspective angle ω is 50°. Effective F number is under condition of F2.8. Image height is under condition of IH=0.924 mm. Also, the rest of the conditions are such as H=TT=4.67 mm, $D_1$=3.58 mm, and D2=2.18 mm. Therefore, a relationship such as MD/ED=1.64 is effective. Here, following formulae for aspherical surface is the same as indicated in the formula 16 according to the ninth embodiment.

| Surface | r | d | $n_d$ | $v_d$ |
|---|---|---|---|---|
| 1 | $r_1 = -2.42$ | $d_1 = 1.67$ | $n_1 = 1.5256$ | $v_1 = 56.4$ |
| 2 | Aspherical Surface [1] | $d_2 = 0.92$ | | |
| 3 | Aperture Surface | $d_3 = 0.30$ | | |
| 4 | $r_4 = 1.00$ | $d_4 = 0.47$ | $n_2 = 1.5256$ | $v_2 = 56.4$ |
| 5 | $r_5 = 0.88$ | $d_5 = 0.51$ | | |
| 6 | $r_6 = 4.14$ | $d_6 = 0.80$ | $n_3 = 1.5256$ | $v_3 = 56.4$ |
| 7 | Aspherical Surface [2] | $d_7 = 0.30$ | | |
| 8 | $r_8 = \infty$ | $d_8 = 0.50$ | $n_4 = 1.5163$ | $v_4 = 64.1$ |
| 9 | $r_9 = \infty$ | $d_9 = 0.50$ | $n_5 = 1.5163$ | $v_5 = 64.1$ |
| 10 | $r_{10} = \infty$ | $d_{10} = 0.04$ | | |
| 11 | $r_{11} = \infty$ (Image Surface) | | | |

Aspherical Surface [1]

Curvature of Radius  −1.66
k  0
a  $4.1390 \times 10^{-2}$   b  $5.2069 \times 10^{-3}$ Aspherical Surface [2]

Curvature of Radius  −1.29
k  0
a  $1.8343 \times 10^{-1}$   b  $-9.9442 \times 10^{-3}$ As understood from FIGS. 31A to 31C, the image pickup lens unit according to the present embodiment has a preferable aberration correction in visible range of rays.

In the present embodiment, TT and MD/ED satisfy the formulae 13 and 15 respectively. As a result, the image pickup lens unit according to the present embodiment has an advantage in that the cutting operation is efficient.

Figure 32:
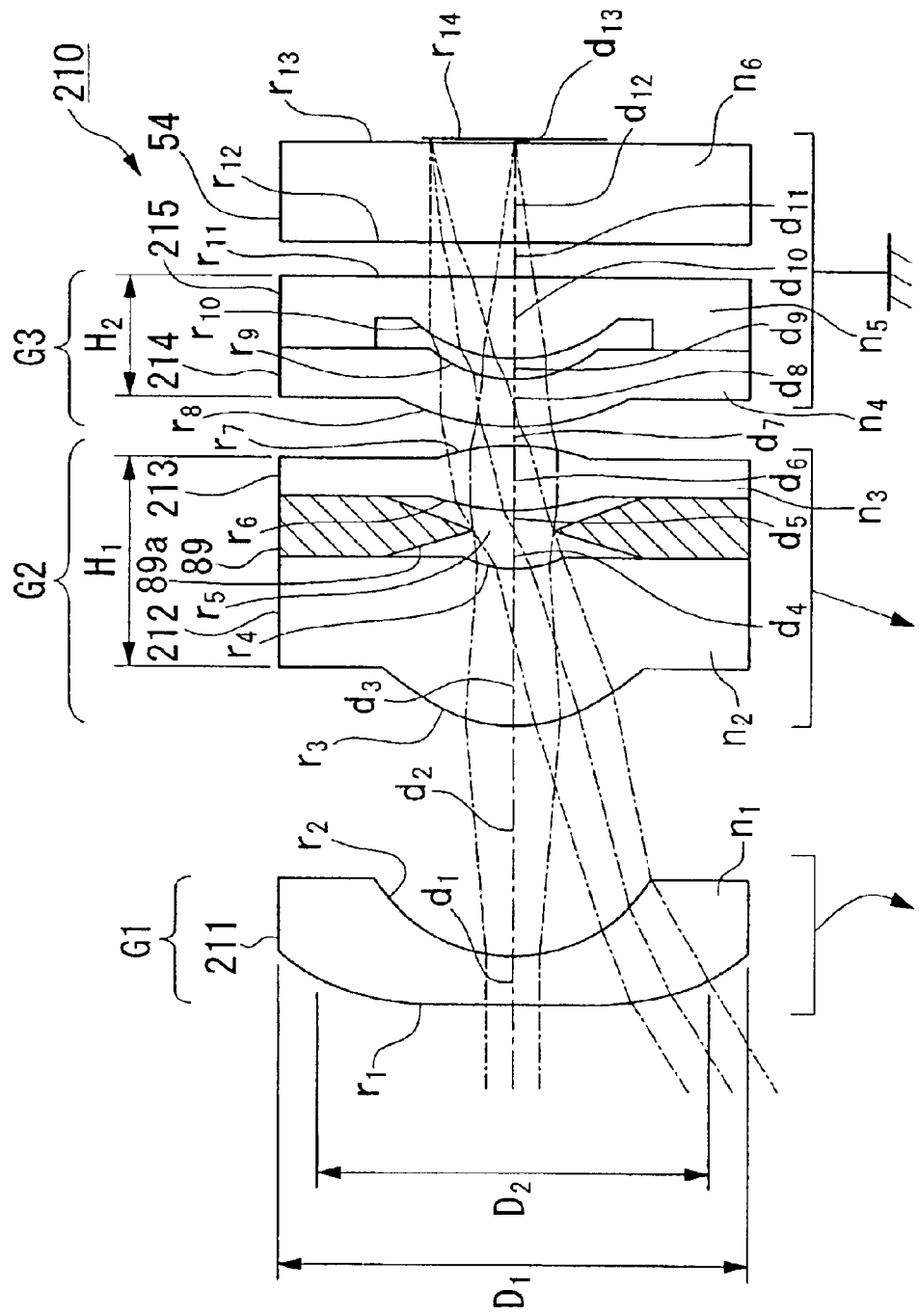
FIG. 32 shows an optical path in a twelfth numeral data embodiment for an image pickup lens unit in a position W in the first embodiment according to the present invention.
Figure 33A:
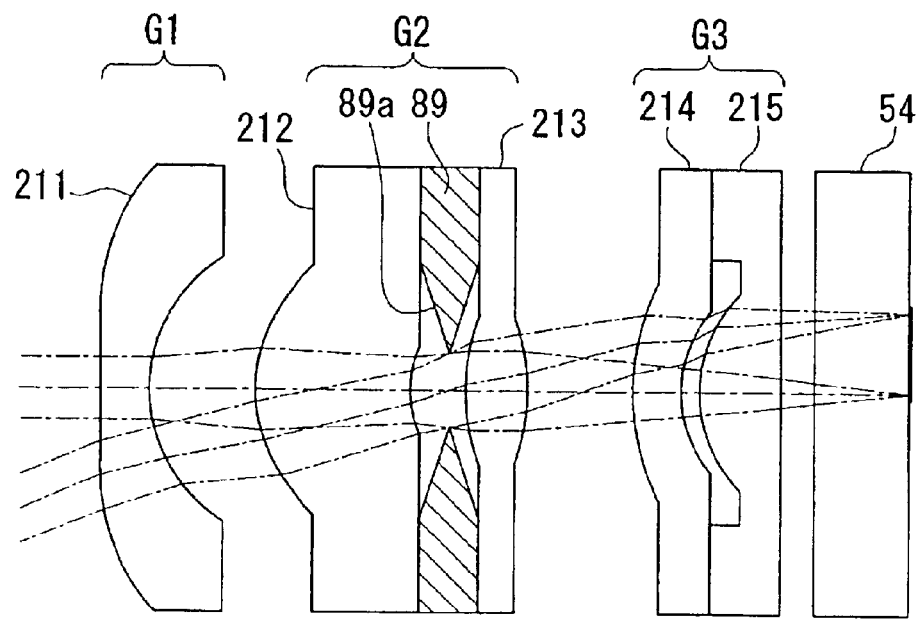
FIGS. 33A and 33B show optical paths in positions S and T in the twelfth numeral data embodiment.
Figure 33B:
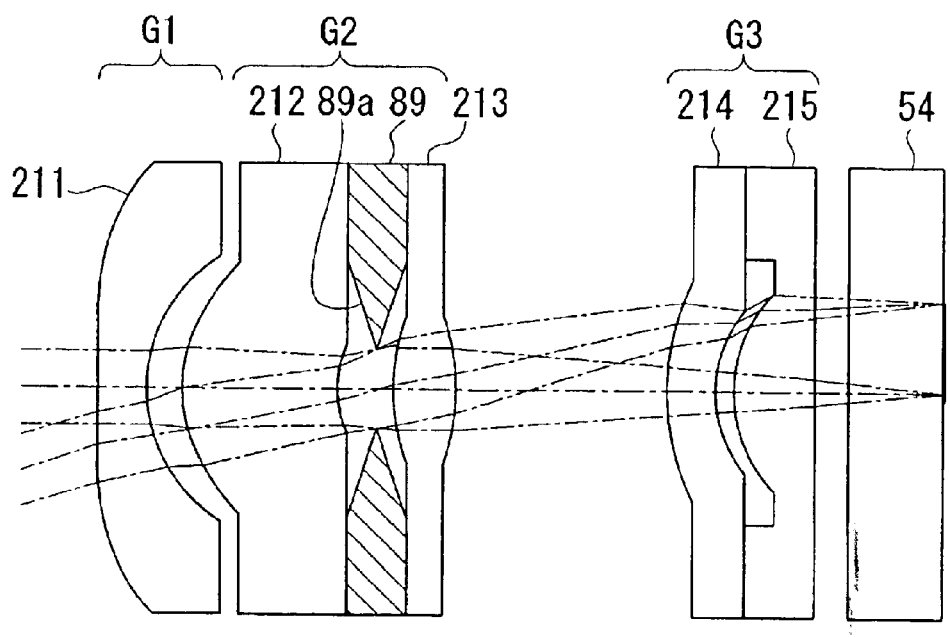

FIG. 32 shows an optical path in a zoom lens system according to a twelfth embodiment of the present invention which is made by using the image pickup lens unit according to the first embodiment of the present invention. FIG. 32 shows an optical path under condition of the widest perspective angle (hereinafter called W). FIG. 33A shows an optical path under condition of the middle perspective angle (hereinafter called S). FIG. 33B shows an optical path under condition of the most telescopic perspective angle (hereinafter called T). FIGS. 33A to 33C show aberrations under W condition. FIGS. 34A to 34C show aberrations under S condition. FIGS. 35A to 35C show aberrations under T condition. FIGS. 33A to 33C, 34A to 34C, and 35A to 35C are described differently from FIGS. 10A to 10C only in that vertical axis for the astigmatism (FIGS. 33B, 34B, and 35B) and the distortion. Therefore, explanations for axes in graphs are omitted. Also, $H_1$ and $H_2$ shown in the drawing is the same as H which is explained with regard to FIGS. 7A to 7C. Also, amount of $D_2$ shown in the drawing is the same as the amount of $D_2$ which is explained with regard to FIGS. 7A to 7C. In the present embodiment, lens groups are cut into a hexagonal column. Here, D1 is equal to a diameter of a cylinder which contacts the regular hexagonal column externally.

The present embodiment is provided with a first lens group G1 having a negative power, a second lens group G2 having a positive power, a third lens group G3 having a positive power, and a filter member 54 in such an order from an object toward the image pickup lens unit. In addition, it is possible to double a zooming size of the picked-up image by moving the first lens group G1 and the second lens group G2.

The first lens group G1 comprises a first lens 211.

The second lens group G2 are formed by cementing a second lens 212 made of a convex-concave lens, an aperture 89, a third lens 213 made from convex-convex lens in such an order from an object toward the image pickup lens unit and cutting the cemented lenses. An air interval is formed by the aperture 89 between the second lens 212 and the third lens 213. An aperture section 89a is formed in the middle of the second lens 212 and the third lens 213.

The third lens group G3 is formed by cementing a forth lens 214 made of a convex-concave lens, a fifth lens 215 made of a concave-flat lens in such an order from an object toward the image pickup lens unit such that an air interval is formed by a positioning protruding section 215e which is provided with the fifth lens 215 and cutting the cemented lenses.

The present embodiment is under condition that a focal distance is under defocused condition such as objective distance: So=900 mm. Focal distance f is under condition of f=1.53 mm (W)~2.19 mm (S)~2.99 mm (T). Diagonal perspective angle ω is 31.2° (W)~22.9° (S)~17.2° (T). Effective F number is under condition of F 2.73 (W)~F3.28 (S)~F3.97 (T). Image height is under condition of IH=0.924 mm.

In addition, $H_1$ and $H_2$ which are TT of the second lens group G2 and the third lens group G3 are under condition of $H_1$=2.17 and $H_2$=1.30. Also, the rest of the conditions are such as $D_1$=4.84 mm, $D_2$=4.00 mm. Therefore, a relationship such as MD/ED=1.21 is effective. Here, following formulae for aspherical surface is the same as indicated in the formula 16 according to the ninth embodiment.

Also, in following parameters, an intersurface intervals are described according to the zooming perspective angle in the above W~S~T manner for simplifying the explanation.

| Surface | r | d | $n_d$ | $v_d$ |
|---|---|---|---|---|
| 1 | Aspherical Surface [1] | $d_1 = 0.50$ | $n_1 = 1.5256$ | $v_1 = 56.4$ |
| 2 | $r_2 = 1.68$ | $d_2 = 2.42\sim1.14\sim0.36$ | | |
| 3 | Aspherical Surface [2] | $d_3 = 1.64$ | $n_2 = 1.5839$ | $v_2 = 30.2$ |
| 4 | $r_4 = 1.21$ | $d_4 = 0.40$ | | |
| 5 | Aperture Surface | $d_5 = 0.20$ | | |
| 6 | $r_6 = 2.28$ | $d_6 = 0.68$ | $n_3 = 1.5256$ | $v_3 = 56.4$ |
| 7 | $r_7 = -2.22$ | $d_7 = 0.20\sim1.12\sim2.26$ | | |
| 8 | Aspherical Surface [3] | $d_8 = 0.50$ | $n_4 = 1.5839$ | $v_4 = 30.2$ |
| 9 | $r_9 = 1.39$ | $d_9 = 0.20$ | | |
| 10 | Aspherical Surface [4] | $d_{10} = 0.86$ | $n_5 = 1.5256$ | $v_5 = 56.4$ |
| 11 | $r_{11} = 21.75$ | $d_{11} = 0.37$ | | |
| 12 | $r_{12} = \infty$ | $d_{12} = 1.00$ | $n_6 = 1.5163$ | $v_6 = 64.1$ |
| 13 | $r_{13} = \infty$ | $d_{13} = 0.03$ | | |
| 14 | $r_{14} = \infty$ (Image Surface) | | | |

Aspherical Surface [1]

Curvature of Radius  76.60
k  $1.1455 \times 10^2$
a  $2.1137 \times 10^{-2}$   b  $-2.2514 \times 10^{-3}$   c  $2.4973 \times 10^{-4}$
d  $-5.3131 \times 10^{-6}$ Aspherical Surface [2]

Curvature of Radius  1.47
k  $-6.5536 \times 10^{-1}$
a  $-9.1048 \times 10^{-3}$   b  $8.0345 \times 10^{-4}$   c  $8.7085 \times 10^{-4}$
d  $-1.8849 \times 10^{-3}$ Aspherical Surface [3]

Curvature of Radius  2.46
k  $-7.2250 \times 10^{-1}$

-continued

| Surface | r | d | $n_d$ | $v_d$ |
|---------|---|---|-------|-------|
| a | $-7.4767 \times 10^{-3}$ | b $2.5093 \times 10^{-2}$ | c $4.1571 \times 10^{-3}$ | |
| d | $-9.1108 \times 10^{-3}$ | | | |

Aspherical Surface [4]

Curvature
of Radius  1.44
k  $-8.6889 \times 10^{-1}$
a  $2.3672 \times 10^{-2}$   b $-3.7883 \times 10^{-3}$   c $-6.9507 \times 10^{-3}$
d  $9.1828 \times 10^{-3}$ As understood from FIGS. 34A to 34C, the zoom lens according to the present embodiment has a preferable aberration correction in visible range of rays.

In the present embodiment, TT and MD/ED in the image pickup lens unit which form the second lens group and the third lens group satisfy the formulae 13 and 15 respectively. As a result, the image pickup lens unit according to the present embodiment has an advantage in that the cutting operation is efficient.

Here, in the explanation for the image pickup lens unit which shows the numeral data in the ninth to eleventh embodiments, the length of TT is calculated under condition that the optical elements and an aperture stop of which optical axes must be aligned are cemented together and cut. However, more importantly, it may be acceptable that other members such as a spacer for a sandwiching member and an optical filter are cemented together with the cemented optical elements and cut together if necessary. In such a case, TT in the numeral data in the ninth to eleventh embodiments satisfies the formula 13.

Second Embodiment

Next, an image pickup device according to the second embodiment of the present invention is explained. The image pickup device according to the present embodiment is provided with the image pickup lens unit according to the first embodiment. The image pickup device according to the present embodiment is explained with reference to specific examples as follows.

Figure 37:
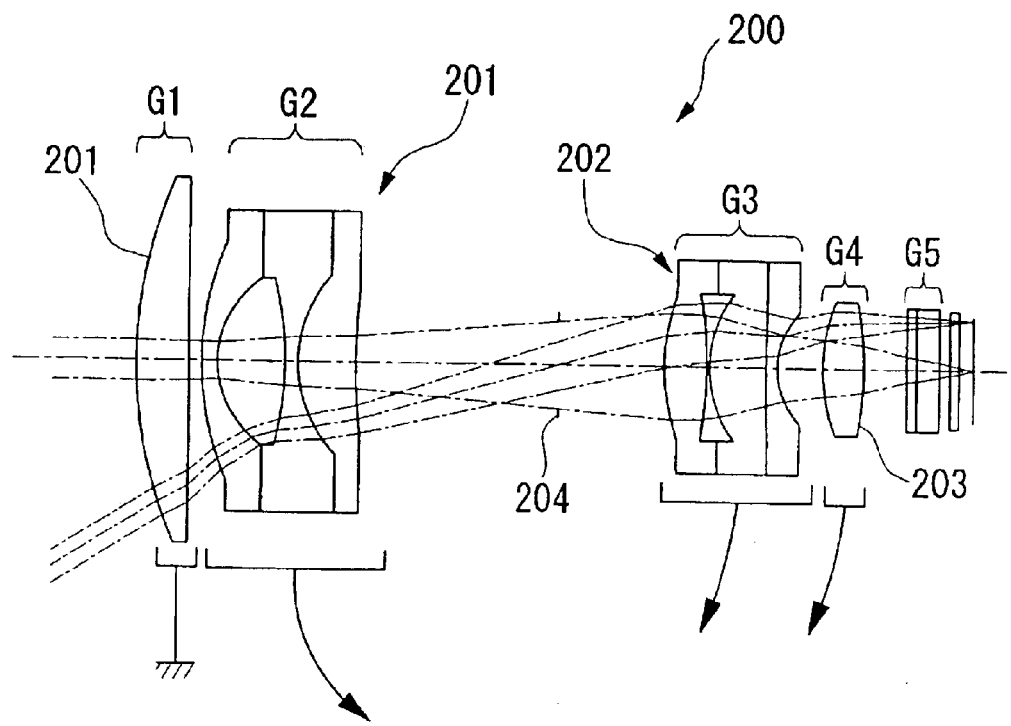
FIG. 37 shows a general structure for an optical system of a zoom lens as an example of an image pickup device according to the second embodiment in the present invention.

FIG. 37 shows a general structure for an optical system of a zoom lens according to the present embodiment as an example of an image pickup device.

A zoom lens 200 is provided with a first group G1 having a positive power, a second group G2 having a negative power, a third group G3 having a positive power, a fourth group G4 having a positive power, and a fifth group G5 including a filter member and the like in such an order from an object toward the image pickup lens unit. These groups are cemented to a lens cylinder which is not shown in the drawing. The second group G2, the third group G3, the fourth group G4, and the fifth group G5 are retained so as to freely move with respect to the first group G1.

The second group G2 and the third group G3 which can move freely are formed by the image pickup lens units 201 and 202 according to the first embodiment of the present invention. In the image pickup lens units 201 and 202, three lenses do not use the lens cylinder, and the lenses neighboring in the optical axis direction are cemented together. In addition, an air interval and an cementing surface are formed therein.

Next, FIGS. 38A to 38C are cross sections in an optical axis direction for showing a general structure of an image pickup unit 900 according to the present embodiment of the present invention.

As shown in FIG. 38A, the image pickup lens unit 900 is provided with an image pickup lens unit 150 and an image pickup elements 901.

In the present embodiment, the image pickup lens unit 150 is formed unitarily by three lenses which are cemented together at the flange sections. All the image pickup lens units according to the first embodiment of the present invention can be used for the image pickup lens unit 150 in the present embodiment.

The image pickup elements 901 has a CCD (charge-coupled device) which is a photoelectric converting device which is formed on a semiconductor wafer and a micro lens 903. In addition, a micro lens array 903 is formed on a surface for receiving a light on the CCD 902.

The image pickup lens unit 150 and a cover glass 904 are cemented and fixed by a bonding agent 906 via a spacer 905.

The spacer 905 can adjust a position and inclination of the image pickup lens unit 150 and an interval with the cover glass 904 by a wedge shape of the spacer 905.

In FIG. 38B, other example for an image pickup lens unit 900' is shown. The image pickup lens unit 900' uses other image pickup lens unit 151 instead of the image pickup lens unit 150. The image pickup lens unit 151 is provided with a plurality of positioning protruding sections 151a on flange sections on the optical element which is disposed in the nearest position to the image pickup lens unit. The space 905 is omitted by the positioning protruding sections 151a. Also, the image pickup lens unit 900' is provided with a CCD 902 and a micro lens array 903 instead of the image pickup elements 901. Also, the image pickup lens unit 900' is provided with an image pickup elements 901 which does not have the cover glass 904.

In FIG. 38C, other example for an image pickup lens unit 900" is shown. The image pickup lens unit 900" uses other image pickup lens unit 152 which is provided with a positioning protruding section 152a on a flange section of the optical element which is disposed in the nearest position to the image pickup lens unit and an image pickup elements 910. Also, an outer peripheral section of the CCD 902 is disposed in array on the flange side surface 152c (side surface).

Such a structure can be manufactured easily by cementing the image pickup lens unit 152 and the optical element arrays together and cutting the cemented image pickup lens unit and the optical element array. That is, such a structure can be manufactured by positioning the cemented optical element array on a semiconductor wafer which is formed in which the CCD 902 is disposed in an array manner, cementing the positioning protruding section 152a on the semiconductor wafer by a bonding agent 906, and cutting the optical element array and the semiconductor wafer simultaneously.

A specific example for an image pickup device according to the present embodiment using the image pickup lens unit 900 is explained as follows.

Figure 39:
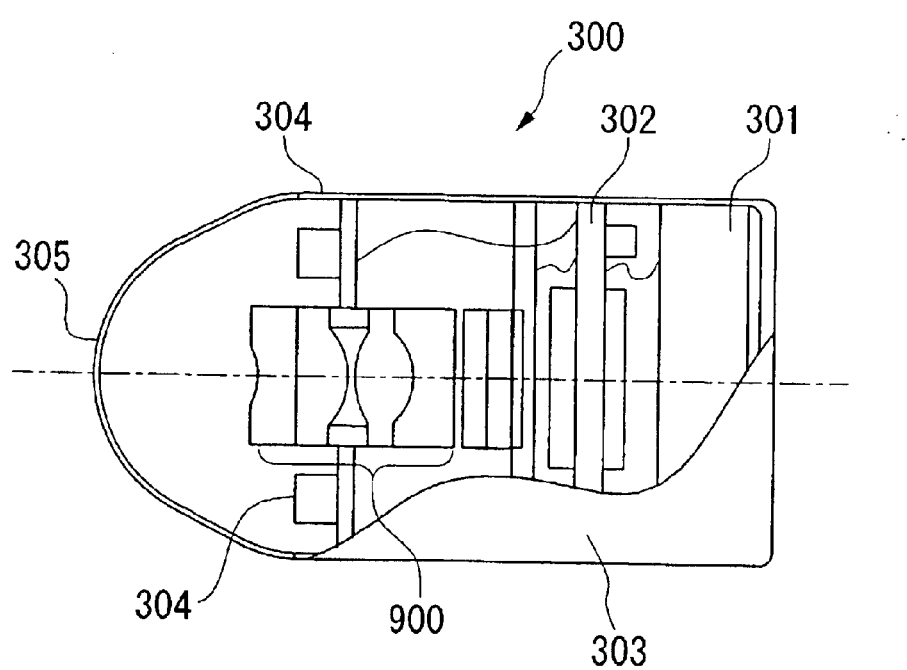
FIG. 39 is a cross section for explaining a general structure of a capsule endoscope which uses the image pickup unit according to the present invention.

In FIG. 39, an example in which the image pickup lens unit 900 is used for a capsule endoscope 300 is shown.

The capsule endoscope 300 is provided with a light source 304, an image pickup lens unit 900, an image processing circuit 302 for processing a signal which is sent from the image pickup lens unit 900, a battery 301 for supplying a power to the above members. Entire capsule endoscope 300 is covered by a cover 303. A transparent window is disposed at a tip of the cover 303. A light is emitted via the transparent window 305. Also, a reflected light is received by the image pickup lens unit 900 via the transparent window 305.

Figure 40A:
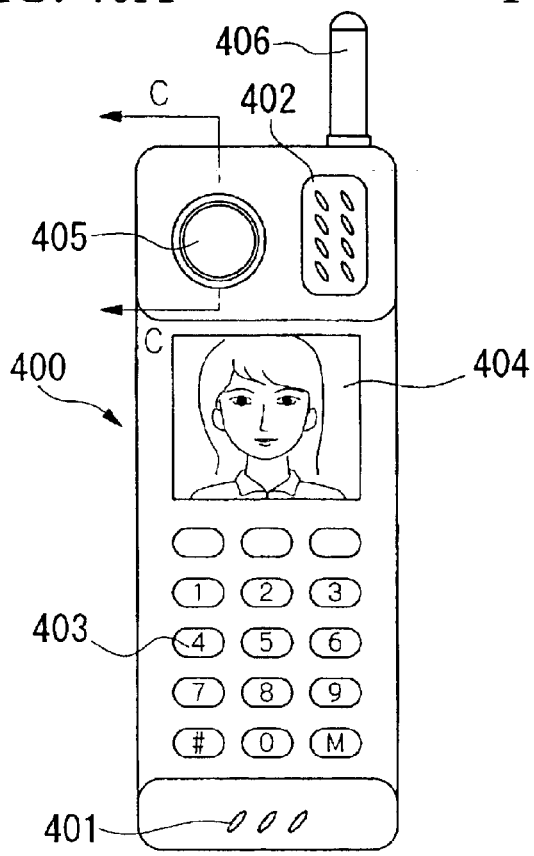
FIG. 40A is a front view for showing a general structure for a mobile terminal which uses the image pickup unit according to the present invention.
Figure 40B:
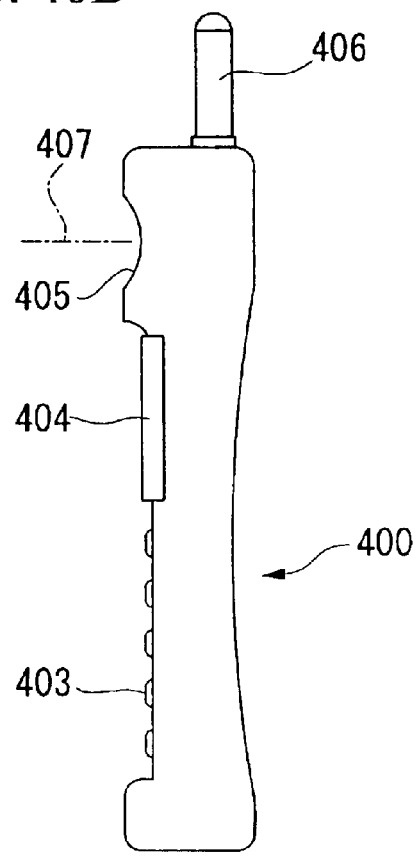
FIG. 40B is a side view therefor.
Figure 40C:
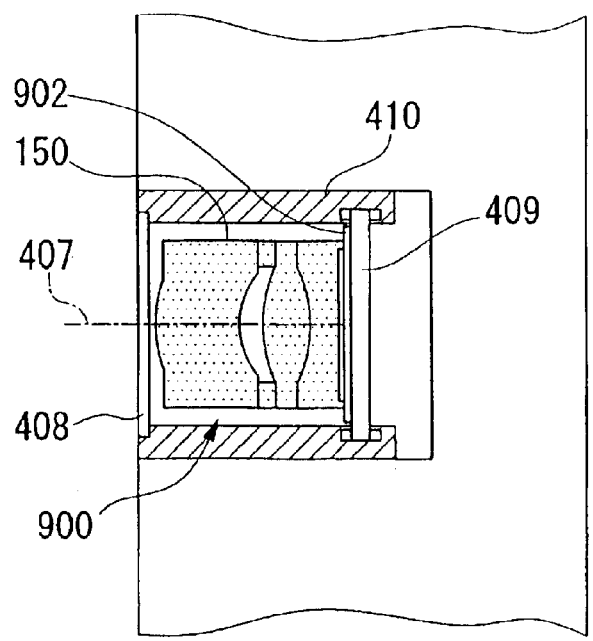
FIG. 40C is a cross section therefor.

Next, in FIGS. 40A to 40C, an example in which the image pickup lens unit 900 is used for a mobile terminal 400 is shown. 40a is a front view. FIG. 40B is a side view. FIG. 40C is a cross section viewed in line C—C shown in FIG. 40A.

The mobile terminal 400 is provided with an image pickup section 405 in which the image pickup lens unit 900 is used, a monitor section 404, input section 403 for inputting a character and a signal by using buttons and dials, a microphone section 401, a speaker section 402, and an antenna for transmitting and receiving a wireless communication information.

As shown in FIG. 40C, a CCD 902 which is included in the image pickup lens unit 900 is fixed and connected to a circuit board 409 which is fixed on a base board cementing section 410 inside of the mobile terminal 400. Also, a cover glass 405 is disposed in a direction toward an image pickup section optical axis 407 so as to be sealed thereinside.

Figure 41:
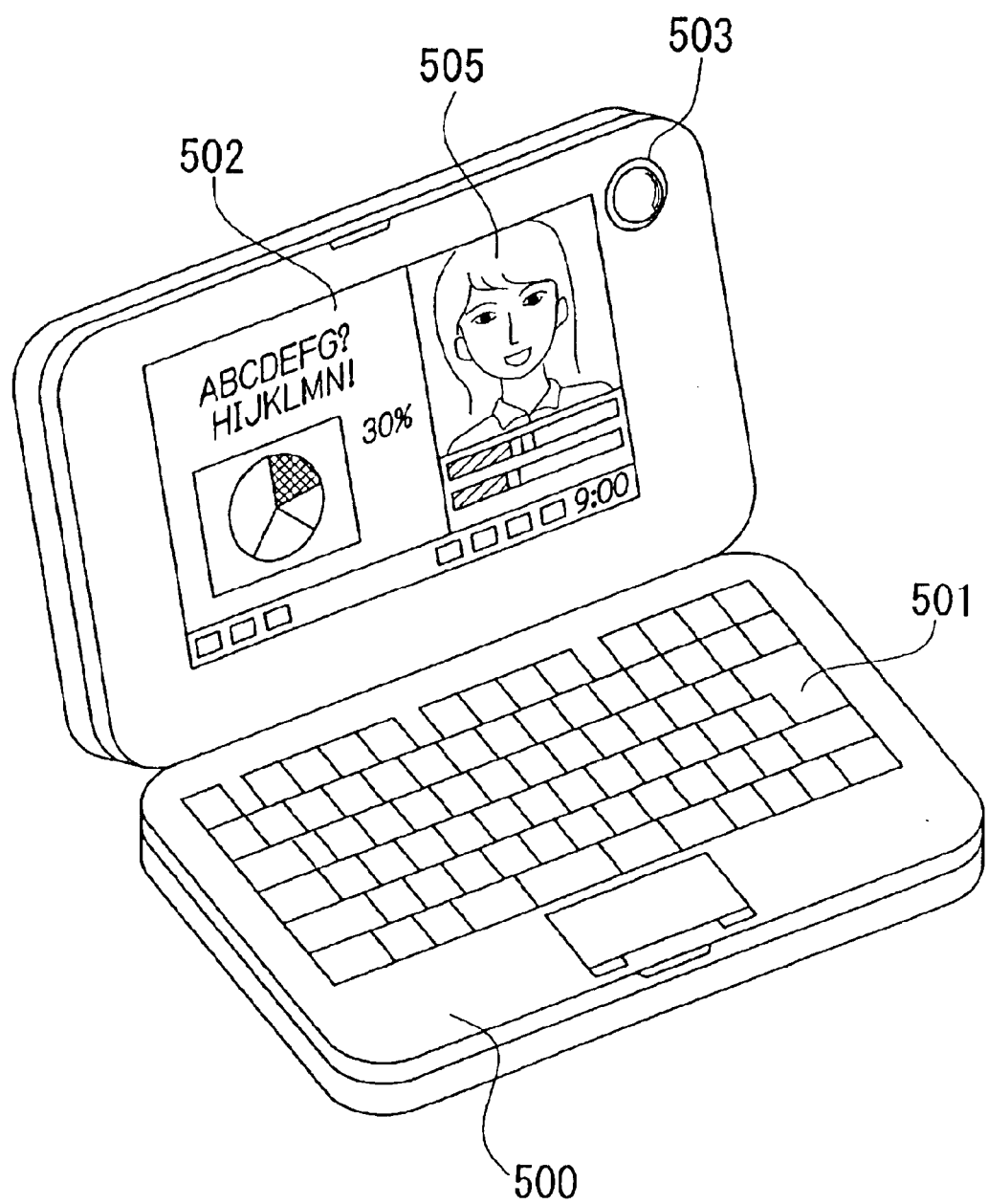
FIG. 41 is a perspective view for showing a general structure of a personal computer which uses the image pickup unit according to the present invention.

Next, in FIG. 41, an example in which the image pickup lens unit 900 is used for a personal computer 500 is shown. FIG. 41 is a perspective view for showing a general structure of a personal computer 500.

A personal computer 500 is provided with a keyboard 501, a monitor section 502 and an image pickup section 503. The monitor section 502 can display an image 505 including images which are picked up by the image pickup section 503. The image pickup section 503 is disposed next to the monitor section 502. The image pickup lens unit 900 (not shown in the drawing) is disposed inside of the image pickup section 503. A structure of the image pickup unit 900 in cross section in the optical axis direction has the same structure shown in FIG. 40C.

Figure 42:
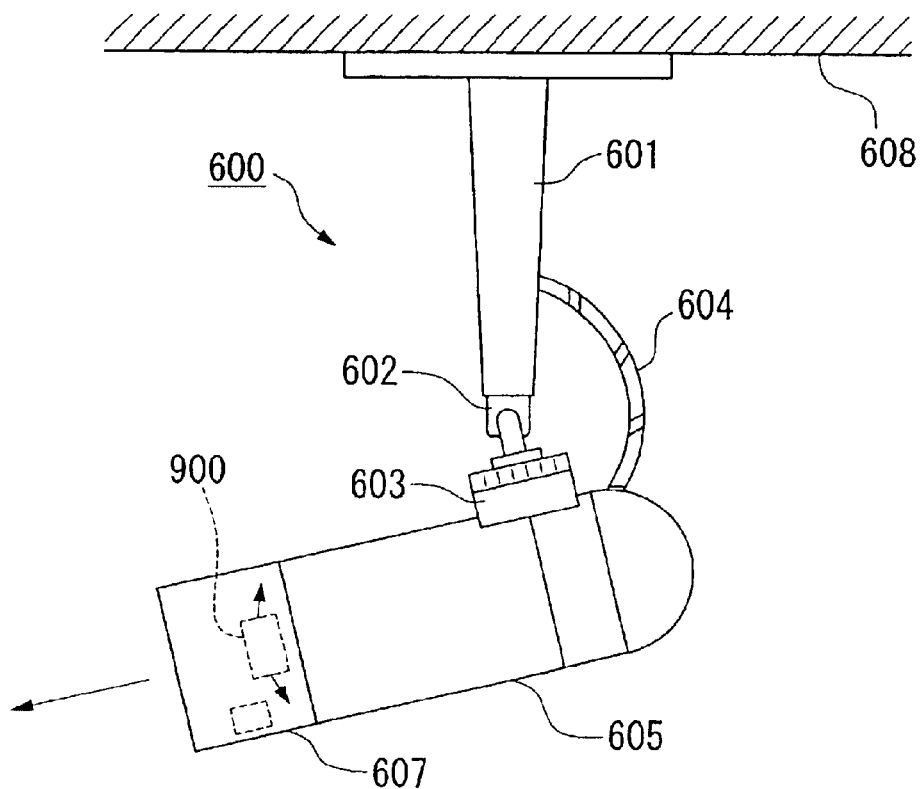
FIG. 42 is a side view for showing a general structure for a monitoring camera which uses the image pickup unit according to the present invention.

Next, in FIG. 42, an example in which the image pickup lens unit 900 is used for a monitoring camera 600 is shown. FIG. 42 is a side view for showing a general structure for a monitoring camera 600.

The monitoring camera 600 is provided with a circuit section 605 and an image pickup section 607 for forming a monitoring camera unit. The monitoring camera 600 is cemented on an cementing section 601 which is fixed on a ceiling 608 via a shaft 602 and a motor 603. The image pickup lens unit 900 is disposed inside of the image pickup section 697 so as to pick up the image in a direction of an arrow shown in the drawing. A structure of the image pickup unit 900 in cross section in the optical axis direction has the same structure shown in FIG. 40C. The image pickup lens unit 900 is fixed inside of the image pickup section 607. It may be acceptable that the base board cementing section 410 (see FIG. 40C) is cemented so as to freely swinge by a rotating structure which is not shown in the drawing.

Figure 43:
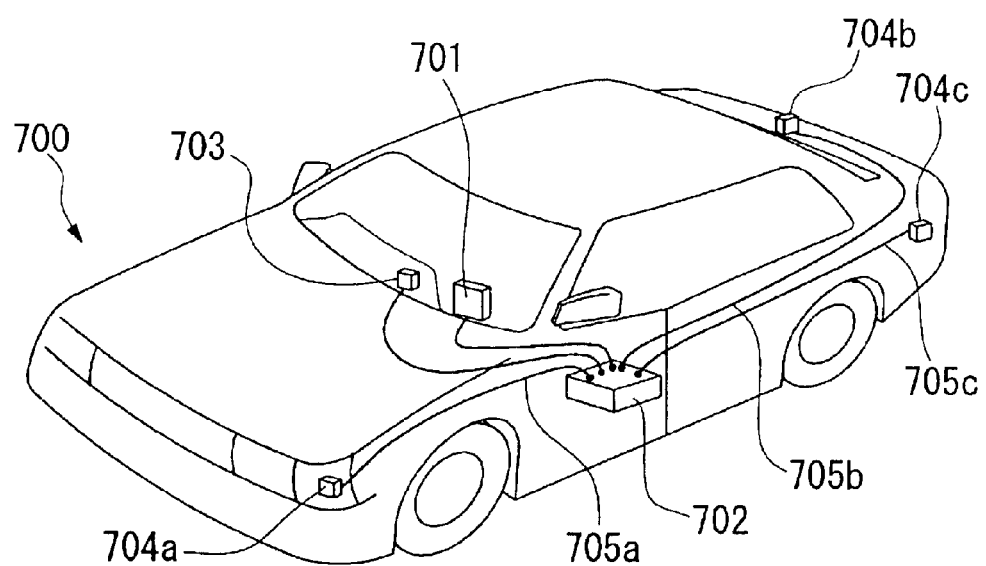
FIG. 43 is a perspective view for showing a general structure of a camera system for an automobile which uses the image pickup unit according to the present invention.

Next, in FIG. 43, an example in which the image pickup lens unit 900 is used for a monitoring system 700 for an automobile is shown. FIG. 43 is a perspective view for showing a general structure of a camera system 700 for an automobile. The monitoring system 700 for an automobile is provided with image pickup sections 704a, 704b, and 704c. The monitoring system 700 for an automobile can display an image in a monitor section 701 which is picked up by the image pickup sections via a signal processing section 702 and a switching controlling section 703. The image pickup sections 704a, 704b, and 704c are connected by optical fibers 705a, 705b, and 705c respectively.

A structure of the image pickup unit 900 in cross section in the optical axis direction has the same structure shown in FIG. 40C. The image pickup lens unit 900 is fixed inside of the image pickup sections 704a, 704b, and 704c.

Any of the image pickup device according to the present embodiment as explained above uses the image pickup lens unit according to the first embodiment of the present invention; therefore, it is possible to realize an equivalent effect and advantage as in the image pickup lens unit 900 according to the first embodiment.

In particular, in the zoom lens 200, the lens groups such as the second group G2 and the third group G3 are unitarily formed without using a lens cylinder; therefore, it is possible to realize a light-weight, small zoom lens.

Also, it is possible to form the image pickup lens unit 900 unitarily with the CCD 902 by a manufacturing method in which members for forming the optical elements are cemented together; therefore, there is an advantage in that the manufacturing process becomes efficient because the manufacturing processes are continuous. Furthermore, by using a method in which the optical elements are cemented together and cut while maintaining the array disposition, there are further advantages in that the production efficiency improves and it is possible to realize a mass-production of a small image pickup lens unit.

As explained above, by the image pickup lens unit according to the present invention, there is an advantage in that it is possible to provide a small image pickup lens unit in a low cost while improving a performance in the optical system by providing an air intervals and forming the optical elements unitarily without forming a lens cylinder structure by a mirror cylinder member.

Also, the image pickup lens unit according to the present invention is used in the image pickup device according to the present invention; therefore, there is an effect equivalent to the effect which is realized by the image pickup lens unit according to the present invention.

An object of the present invention is to provide a small image pickup lens unit and a small image pickup device which can be manufactured in mass-production in a low cost.

What is claimed is:

1. An image pickup lens unit comprising:
   an optical system; and
   a plurality of optical elements which form the optical system, wherein:
   a plurality of optical elements having optical axes which are aligned are mutually cemented;
   side surfaces of the optical elements are disposed in a surface which expands in a direction of the optical axes linearly;
   wherein a formula 1.0<MD/ED<4.0 is satisfied under the condition that a maximum outermost diameter of the image pickup lens unit in a cross section which crosses orthogonally to the optical axes is defined as an MD and a maximum beam effective diameter in an optical system which is formed by a plurality of the optical elements is defined as an ED.

2. An image pickup lens unit according to claim 1 which satisfies a formula TT<20 mm wherein a total cutting length in a direction of optical axes of a plurality of the optical elements is defined as a distance TT.

3. An image pickup lens unit according to claim 1 wherein all optical elements have a side surface which is disposed in a same surface; and
   the same surface indicates a surface which expands linearly in a direction along the optical axis.

4. An image pickup lens unit according to claim 1 which is formed by 10 or fewer optical elements having a power and including at least a positive lens and at least a negative lens which is disposed so as to neighbor the positive lens.

5. An image pickup lens unit according to claim 1 having 10 or fewer air surfaces.

6. An image pickup lens unit according to claim 1 wherein a surface except an optical surface in one of the optical elements is treated so as to absorb a light.

7. An image pickup lens unit according to claim 1 wherein an optical filter having a side surface which is disposed in the same surface as the side surface of the optical elements is cemented to one of the optical elements.

8. An image pickup lens unit according to claim 1 wherein a hood section having a side surface which is disposed in the same surface as the surface of one of the optical elements is cemented to the optical element.

9. An image pickup device which is provided with the image pickup lens unit according to claim 1.

10. An image pickup device according to claim 9 wherein image pickup elements are cemented to an optical element which forms a final surface in the image pickup lens unit.

11. An image pickup device according to claim 10 wherein the image pickup element has a side surface which is disposed in the same surface as the side surface of the optical element.

12. An image pickup unit having at least three optical elements formed by a first optical element, a second optical element, and a third optical element produced by:

preparing a first optical element array in which a plurality of the first optical elements are disposed, a second optical element array in which a plurality of the second optical elements are disposed, and a third optical element array in which a plurality of the third optical elements are disposed;

aligning the optical axis of the first optical element and the optical axis of the third optical element and cementing the first optical element array and the third optical element array in the direction of the optical axes of a plurality of the optical elements;

cutting between the neighboring optical elements in a direction of the optical axes of a plurality of the optical elements; and cementing outer peripheries of each optical elements so as contact with each other wherein conditions ST/TD<0.7 (condition 1) and MT/TD<0.5 (condition 2) are satisfied under the condition that:

TD is defined as a surface interval on the optical axis from a first surface of the optical system which is formed by the optical elements that are cemented together to the last surface of the optical system;

ST is defined as a total length of the air intervals on the optical axis; and

MT is defined as a maximum value of the length of the air intervals on the optical axis.

13. An image pickup lens unit according to claim 12 wherein the optical element arrays are formed by disposing the optical elements two-dimensionally.

14. An image pickup unit according to claim 12 wherein:

the optical element has a flange section which is disposed on an optical surface through which a light passes and on an outer peripheral section on the optical surface;

a protruding section is formed on an outer peripheral section of the flange section;

an interval is formed between the protruding sections which neighbors each other in a direction of the optical axis.

15. An image pickup unit comprising:

an optical system; and a plurality of optical elements which form the optical system, wherein;

a plurality of optical elements are cemented mutually of which optical axes are aligned;

side surfaces of the optical elements are disposed in a surface which expands in a direction of the optical axes linearly, outer peripheries of each optical elements contact with each other on, a cementing surface wherein a condition $0<|\phi/\phi A|<0.5$ is satisfied under the condition that:

$\phi$ is defined as a power in the lens surfaces; and $\phi A$ is defined as a power in an entire optical system in the image pickup lens unit.

* * * * *